United States Patent
Park et al.

(10) Patent No.: US 11,509,442 B2
(45) Date of Patent: Nov. 22, 2022

(54) METHOD FOR TRANSMITTING AND RECEIVING SIGNALS IN WIRELESS COMMUNICATION SYSTEM AND DEVICE THEREFOR

(71) Applicant: LG Electronics Inc., Seoul (KR)

(72) Inventors: Changhwan Park, Seoul (KR); Suckchel Yang, Seoul (KR); Joonkui Ahn, Seoul (KR); Seonwook Kim, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/254,628

(22) PCT Filed: Aug. 9, 2019

(86) PCT No.: PCT/KR2019/010169
§ 371 (c)(1),
(2) Date: Dec. 21, 2020

(87) PCT Pub. No.: WO2020/032750
PCT Pub. Date: Feb. 13, 2020

(65) Prior Publication Data
US 2021/0152318 A1  May 20, 2021

(30) Foreign Application Priority Data

Aug. 9, 2018 (KR) .......................... 10-2018-0093416
Sep. 21, 2018 (KR) .......................... 10-2018-0114490
(Continued)

(51) Int. Cl.
*H04L 5/00* (2006.01)
*H04L 67/12* (2022.01)
*H04W 72/04* (2009.01)
*H04W 74/08* (2009.01)

(52) U.S. Cl.
CPC ............ *H04L 5/0057* (2013.01); *H04L 67/12* (2013.01); *H04W 72/0413* (2013.01); *H04W 74/0833* (2013.01)

(58) Field of Classification Search
CPC .. H04L 5/0057; H04L 67/12; H04W 72/0413; H04W 74/0833
(Continued)

(56) References Cited

U.S. PATENT DOCUMENTS

2010/0098012 A1*  4/2010  Bala .................. H04L 5/0053
                                                                370/329
2019/0230499 A1*  7/2019  Sun .................... H04W 28/04
(Continued)

FOREIGN PATENT DOCUMENTS

WO    WO2017136004    8/2017

OTHER PUBLICATIONS

EP Extended European Search Report in European Appln. No. 19848301.8, dated Jul. 5, 2021, 12 pages.
(Continued)

*Primary Examiner* — Chi Tang P Cheng
(74) *Attorney, Agent, or Firm* — Fish & Richardson P.C.

(57) ABSTRACT

The present invention relates to a method for transmitting and receiving channel quality information in a wireless communication system for supporting a Narrowband Internet of Things (NB-IoT) and a device therefor and, more particularly, the method comprising: transmitting and receiving a random access preamble; transmitting and receiving a random access response on the basis of the random access preamble; and transmitting and receiving channel quality information via a narrowband physical uplink shared channel (NPUSCH) on the basis of the random access response, wherein when the random access preamble is transmitted and received on the basis of a
(Continued)

narrowband physical downlink control channel (NPDCCH) order in a radio resource control (RRC) connected state, the channel quality information is measured on the basis of a UE-specific search space (USS) set in the RRC connected state.

14 Claims, 23 Drawing Sheets

(30) Foreign Application Priority Data

| | | |
|---|---|---|
| Sep. 25, 2018 | (KR) | 10-2018-0114554 |
| Sep. 27, 2018 | (KR) | 10-2018-0115383 |
| Nov. 2, 2018 | (KR) | 10-2018-0134002 |
| Feb. 15, 2019 | (KR) | 10-2019-0017870 |

(58) Field of Classification Search
  USPC .......................................................... 370/329
  See application file for complete search history.

(56) References Cited

U.S. PATENT DOCUMENTS

| | | | |
|---|---|---|---|
| 2019/0305899 A1* | 10/2019 | Rico Alvarino | H04L 1/0047 |
| 2020/0128589 A1* | 4/2020 | Wu | H04W 72/042 |
| 2021/0282169 A1* | 9/2021 | Zhang | H04W 72/1268 |

OTHER PUBLICATIONS

Ericsson, "NB-IoT downlink channel quality determination and report," R4-1806754, Presented at 3GPP TSG-RAN WG4 Meeting #87, Busan, Korea (Republic of), May 21-25, 2018, 7 pages.

Huawei & HiSilicon, "Introduction of DL channel quality reporting in MSG3," R2-1807869, Presented at 3GPP TSG-RAN WG2 Meeting #102, Busan, Korea, May 21-25, 2018, 10 pages.

Qualcomm Incorporated, "Considerations for DL quality reporting in msg3 for NB-IoT," R1-1804897, Presented at 3GPP TSG RAN WG1 Meeting #92bis, Sanya, China, Apr. 16-20, 2018, 5 pages.

3rd Generation Partnership Project; Technical Specification Group Radio Access Network, "Evolved Universal Terrestrial Radio Access (E-UTRA); Physical layer procedures (Release 13)," 3GPP TS 36.213, V13.10.0, dated Jun. 2018, 46 pages.

LG Electronics, "MIB-NB skipping and System information acquisition latency Enhancement," R1-1719882, 3GPP TSG RAN WG1 Meeting 91, Reno, USA, dated Nov. 27-Dec. 1, 2017, 18 pages.

PCT International Search Report and Written Opinion in International Appln. No. PCT/KR2019/010169, dated Dec. 10, 2019, 18 pages (with English translation).

WI rapporteur (Ericsson), "RAN1 agreements for Rel-13 NB-IoT," Rl-165977, 3GPP TSG-RAN WG1 Meeting #85, Nanjing, China, dated May 22-26, 2016, 35 pages.

* cited by examiner (a) Preamble symbol group (b) Preamble transmission

METHOD FOR TRANSMITTING AND RECEIVING SIGNALS IN WIRELESS COMMUNICATION SYSTEM AND DEVICE THEREFOR

CROSS-REFERENCE TO RELATED APPLICATIONS

This application is a National Stage application under 35 U.S.C. § 371 of International Application No. PCT/KR2019/010169, filed on Aug. 9, 2019, which claims the benefit of Korean Application No. 10-2019-0017870, filed on Feb. 15, 2019, Korean Application No. 10-2018-0134002, filed on Nov. 2, 2018, Korean Application No. 10-2018-0115383, filed on Sep. 27, 2018, Korean Application No. 10-2018-0114554, filed on Sep. 25, 2018, Korean Application No. 10-2018-0114490, filed on Sep. 21, 2018, and Korean Application No. 10-2018-0093416, filed on Aug. 9, 2018. The disclosures of the prior applications are incorporated by reference in their entirety.

TECHNICAL FIELD

The present disclosure relates to a wireless communication system, and more particularly, to a method and apparatus for transmitting and receiving downlink (channel) quality information.

BACKGROUND ART

Mobile communication systems were developed to provide voice services while ensuring mobility of users. However, mobile communication systems have been extended to data services as well as voice services, and more advanced communication systems are needed as the explosive increase in traffic now leads to resource shortages and users demand higher speed services.

Requirements of the next generation mobile communication systems are to support accommodation of explosive data traffics, dramatic increases in throughputs per user, accommodation of significantly increased number of connected devices, very low end-to-end latency, and high energy efficiency. To this end, various technologies such as Dual Connectivity, massive multiple input multiple output (massive MIMO), in-band full duplex, non-orthogonal multiple access (NOMA), support of super wideband, and device networking are under research.

DISCLOSURE

Technical Problem

An aspect of the present disclosure is to provide a method and apparatus for efficiently transmitting and receiving downlink (channel) quality information.

Another aspect of the present disclosure is to provide a method and apparatus for efficiently transmitting and receiving downlink (channel) quality information in a random access procedure.

Another aspect of the present disclosure is to provide a method and apparatus for efficiently transmitting and receiving downlink (channel) quality information in a radio resource control (RRC) connected state.

Another aspect of the present disclosure is to provide a method and apparatus for efficiently transmitting and receiving downlink (channel) quality information about a physical downlink control channel (PDCCH) and/or a physical downlink shared channel (PDSCH).

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of transmitting channel quality information to a base station (BS) by a user equipment (UE) in a wireless communication system supporting narrowband Internet of things (NB-IoT) includes transmitting a random access preamble to the BS, receiving a random access response from the BS, and transmitting the channel quality information to the BS through a narrowband physical uplink shared channel (NPUSCH) based on the random access response. When the random access preamble is transmitted based on a narrowband physical downlink control channel (NPDCCH) order in a radio resource control (RRC) connected state, the channel quality information is measured based on a UE-specific search space (USS) configured in the RRC connected state.

In another aspect of the present disclosure, a UE configured to transmit channel quality information to a BS in a wireless communication system supporting NB-IoT includes a radio frequency (RF) transceiver, and a processor operatively coupled to the RF transceiver. The processor is configured to transmit a random access preamble to the BS, receive a random access response from the BS, and transmit the channel quality information to the BS through a narrowband physical uplink shared channel (NPUSCH) based on the random access response, by controlling the RF transceiver. When the random access preamble is transmitted based on an NPDCCH order in an RRC connected state, the channel quality information is measured based on a USS configured in the RRC connected state.

In another aspect of the present disclosure, an apparatus for a UE configured to operate in a wireless communication system supporting NB-IoT includes a memory including instructions, and a processor operatively coupled to the memory. The processor is configured to perform specific operations by executing the instructions. The specific operations include transmitting a random access preamble to a BS, receiving a random access response from the BS, and transmitting channel quality information to the BS on an NPUSCH based on the random access response. When the random access preamble is transmitted based on an NPDCCH order in an RRC connected state, the channel quality information is measured based on a USS configured in the RRC connected state.

Further, the channel quality information may be determined based on a maximum repetition number configured for the USS.

The channel quality information may be determined based on a repetition number required to detect a hypothetical physical downlink control channel at a specific block error rate (BLER).

Further, the specific BLER may be 1%.

When the random access preamble is transmitted in an RRC idle state, the channel quality information may be measured based on a common search space (CSS) used to receive the random access response.

Further, the channel quality information may be determined based on a maximum repetition number configured for the CSS.

The channel quality information may be measured for a non-anchor carrier.

Advantageous Effects

According to the present disclosure, downlink (channel) quality information may be efficiently transmitted and received.

Further, according to the present disclosure, downlink (channel) quality information may be efficiently transmitted and received in a random access procedure.

Further, according to the present disclosure, downlink (channel) quality information may be efficiently transmitted and received in a radio resource control (RRC) connected state.

Further, according to the present disclosure, downlink (channel) quality information about a physical downlink control channel (PDCCH) and/or a physical downlink shared channel (PDSCH) may be efficiently transmitted and received.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE

Figure 1:
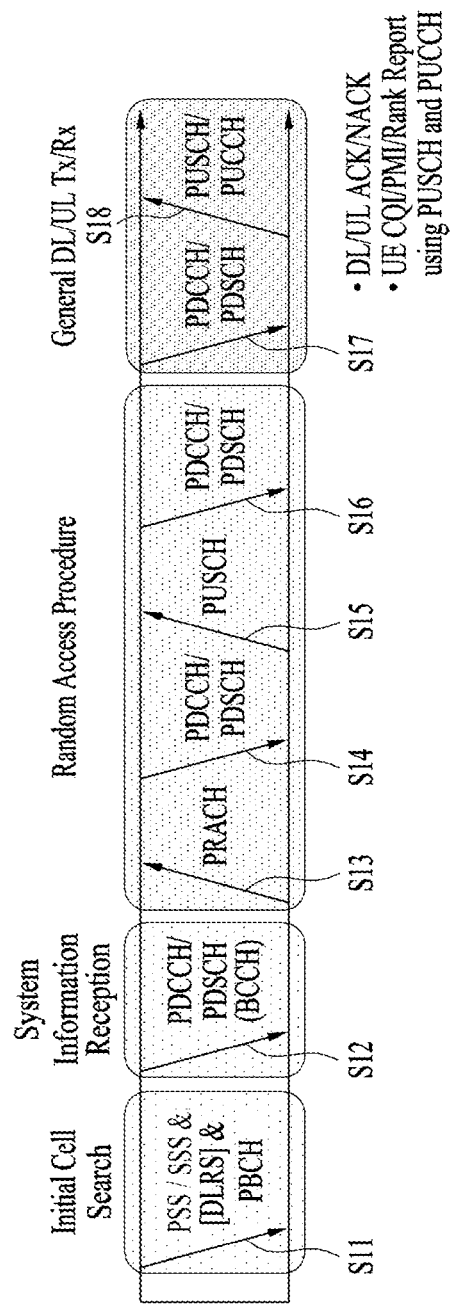
FIG. 1 is a diagram illustrating physical channels and a general signal transmission procedure in a $3^{rd}$ generation partnership project (3GPP) system.

In the following description, downlink (DL) refers to communication from a base station (BS) to a user equipment (UE), and uplink (UL) refers to communication from the UE to the BS. In the case of DL, a transmitter may be a part of the BS, and a receiver may be a part of the UE. In the case of UL, a transmitter may be a part of the UE, and a receiver may be a part of the BS.

The technology described herein is applicable to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented as radio technology such as universal terrestrial radio access (UTRA) or CDMA2000. The TDMA may be implemented as radio technology such as global system for mobile communications (GSM), general packet radio service (GPRS), or enhanced data rates for GSM evolution (EDGE). The OFDMA may be implemented as radio technology such as the Institute of Electrical and Electronics Engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). The 3rd generation partnership project (3GPP) long term evolution (LTE) is a part of an evolved UMTS (E-UMTS) using the E-UTRA. LTE-advance (LTE-A) or LTE-A pro is an evolved version of the 3GPP LTE. 3GPP new radio or new radio access technology (3GPP NR) or 5G is an evolved version of the 3GPP LTE, LTE-A, or LTE-A pro.

Although the present disclosure is described based on 3GPP communication systems (e.g., LTE-A, NR, etc.) for clarity of description, the spirit of the present disclosure is not limited thereto. The LTE refers to the technology beyond 3GPP technical specification (TS) 36.xxx Release 8. In particular, the LTE technology beyond 3GPP TS 36.xxx Release 10 is referred to as the LTE-A, and the LTE technology beyond 3GPP TS 36.xxx Release 13 is referred to as the LTE-A pro. The 3GPP 5G means the technology beyond TS 36.xxx Release 15 and 3GPP NR refers to the technology beyond 3GPP TS 38.xxx Release 15. The LTE/NR may be called '3GPP system'. Herein, "xxx" refers to a standard specification number. The LTE/NR may be commonly referred to as '3GPP system'. Details of the background, terminology, abbreviations, etc. used herein may be found in documents published before the present disclosure. For example, the following documents may be referenced.

3GPP LTE 36.211: Physical channels and modulation 36.212: Multiplexing and channel coding 36.213: Physical layer procedures 36.300: Overall description 36.304: User Equipment (UE) procedures in idle mode 36.331: Radio Resource Control (RRC)

3GPP NR 38.211: Physical channels and modulation
38.212: Multiplexing and channel coding
38.213: Physical layer procedures for control
38.214: Physical layer procedures for data
38.300: NR and NG-RAN Overall Description
38.304: User Equipment (UE) procedures in Idle mode and RRC Inactive state
36.331: Radio Resource Control (RRC) protocol specification Evolved UMTS terrestrial radio access network (E-UTRAN), LTE, LTE-A, LTE-A pro, and 5$^{th}$ generation (5G) systems may be generically called an LTE system. A next generation radio access network (NG-RAN) may be referred to as an NR system. A UE may be fixed or mobile. The term UE is interchangeably used with other terms such as terminal, mobile station (MS), user terminal (UT), subscriber station (SS), mobile terminal (MT), and wireless device. A BS is generally a fixed station communicating with a UE. The term BS is interchangeably used with other terms such as evolved Node B (eNB), general Node B (gNB), base transceiver system (BTS), and access point (AP).

A. Physical Channels and Frame Structures

Physical Channels and General Signal Transmission

FIG. 1 is a diagram illustrating physical channels and a general signal transmission procedure in a 3GPP system. In a wireless communication system, a UE receives information from a BS on DL and transmits information to the BS on UL. The information transmitted and received between the UE and the BS includes data and various types of control information. There are many physical channels according to the types/uses of information transmitted and received between BS and the UE.

When a UE is powered on or enters a new cell, the UE performs initial cell search including acquisition of synchronization with a BS (S11). For the initial cell search, the UE synchronizes its timing with the BS and acquires information such as a cell identifier (ID) by receiving a primary synchronization signal (PSS) and a secondary synchronization signal (SSS) from the BS. The UE may further acquire information broadcast in the cell by receiving a physical broadcast channel (PBCH) from the BS. During the initial cell search, the UE may further monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) corresponding to the PDCCH (S12).

Subsequently, to complete the connection to the BS, the UE may perform a random access procedure (see FIG. 2 and a related description) with the BS (S13 to S16). Specifically, the UE may transmit a random access preamble on a physical random access channel (PRACH) (S13) and may receive a PDCCH and a random access response (RAR) to the preamble on a PDSCH corresponding to the PDCCH (S14). The UE may then transmit a physical uplink shared channel (PUSCH) by using scheduling information included in the RAR (S15), and perform a contention resolution procedure including reception of a PDCCH and a PDSCH corresponding to the PDCCH (S16).

After the above procedure, the UE may receive a PDCCH and/or a PDSCH from the BS (S17) and transmit a PUSCH and/or a physical uplink control channel (PUCCH) to the BS (S18) in a general UL/DL signal transmission procedure. Control information that the UE transmits to the BS is generically called uplink control information (UCI). The UCI includes a hybrid automatic repeat and request acknowledgement/negative acknowledgement (HARQ ACK/NACK), a scheduling request (SR), and channel state information (CSI). The CSI includes a channel quality indicator (CQI), a precoding matrix indicator (PMI), a rank indication (RI), and so on. In general, UCI is transmitted on the PUCCH. However, if control information and data should be transmitted simultaneously, the control information may be transmitted on the PUSCH. In addition, the UE may transmit the UCI aperiodically on the PUSCH, upon receipt of a request/command from a network.

Figure 2:
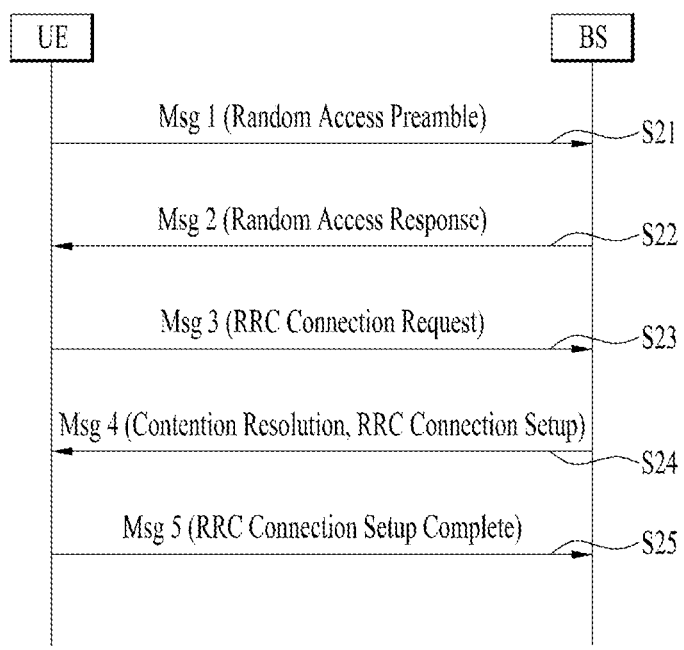
FIG. 2 is a diagram illustrating a random access procedure.

FIG. 2 is a diagram illustrating a random access procedure.

The random access procedure is performed during initial access in RRC idle mode (or RRC_IDLE state), during initial access after radio link failure (RLF), during handover requiring the random access procedure, or upon generation of UL/DL data requiring the random access procedure in RRC connected mode (or RRC_CONNECTED state). The random access procedure may also be referred to as a random access channel (RACH) procedure. Some RRC messages such as an RRC Connection Request message, a Cell Update message, and a URA Update message are also transmitted in the random access procedure. Logical channels, common control channel (CCCH), dedicated control channel (DCCH), and dedicated traffic channel (DTCH) may be mapped to a transport channel RACH. The transport channel RACH is mapped to a physical channel PRACH. When the medium access control (MAC) layer of a UE indicates PRACH transmission to the physical layer of the UE, the physical layer of the UE selects one access slot and one signature and transmits a PRACH preamble on UL. The random access procedure is contention-based or contention-free.

Referring to FIG. 2, a UE receives random access information in system information from a BS and stores the random access information. Subsequently, when random access is required, the UE transmits a random access preamble (message 1 or Msg1) to the BS (S21). The random access preamble may also be referred to as an RACH preamble or a PRACH preamble. Upon receipt of the random access preamble from the UE, the BS transmits an RAR (message 2 or Msg2) to the UE (S22). Specifically, DL scheduling information for the RAR may be cyclic redundancy check (CRC)-masked with a random access RNTI (RA-RNTI) and transmitted on an L1/L2 control channel (PDCCH). Upon receipt of the DL scheduling signal masked with the RA-RNTI, the UE may receive the RAR on a PDSCH and decode the RAR. The UE then checks whether the RAR includes RAR information directed to the UE. The UE may determine whether the RAR includes the random access preamble ID (RAID) of the transmitted preamble to check whether the RAR includes RAR information directed to the UE. The RAR includes a timing advance (TA) which is timing offset information for synchronization, radio resource allocation information for UL, and a temporary ID (e.g., temporary cell RNTI (C-RNTI)) for UE identification. Upon receipt of the RAR, the UE performs a UL transmission (message 3 or Msg3) including an RRC Connection Request message on a UL shared channel according to the radio resource allocation information included in the RAR (S23). After receiving the UL transmission from the UE, the BS transmits a message for contention resolution (message 4 or Msg4) to the UE (S24). The message for contention resolution may be referred to as a contention resolution message and include an RRC Connection Setup message. After receiving the contention resolution message from the BS, the UE completes the connection setup and then transmits a Connection Setup Complete message (message 5 or Msg5) to the BS (S25).

In a contention-free random access (CFRA) procedure, before the UE transmits the random access preamble (S21), the BS may allocate a contention-free random access preamble to the UE. The contention-free random access preamble may be allocated by a handover command or dedicated signaling such as a PDCCH. When the contention-free random access preamble is allocated to the UE, the UE may transmit the allocated contention-free random access preamble to the BS in a similar manner to in step S21. Upon receipt of the contention-free random access preamble from the UE, the BS may transmit an RAR to the UE in a similar manner to in step S22.

Radio Frame Structures

Figure 3:
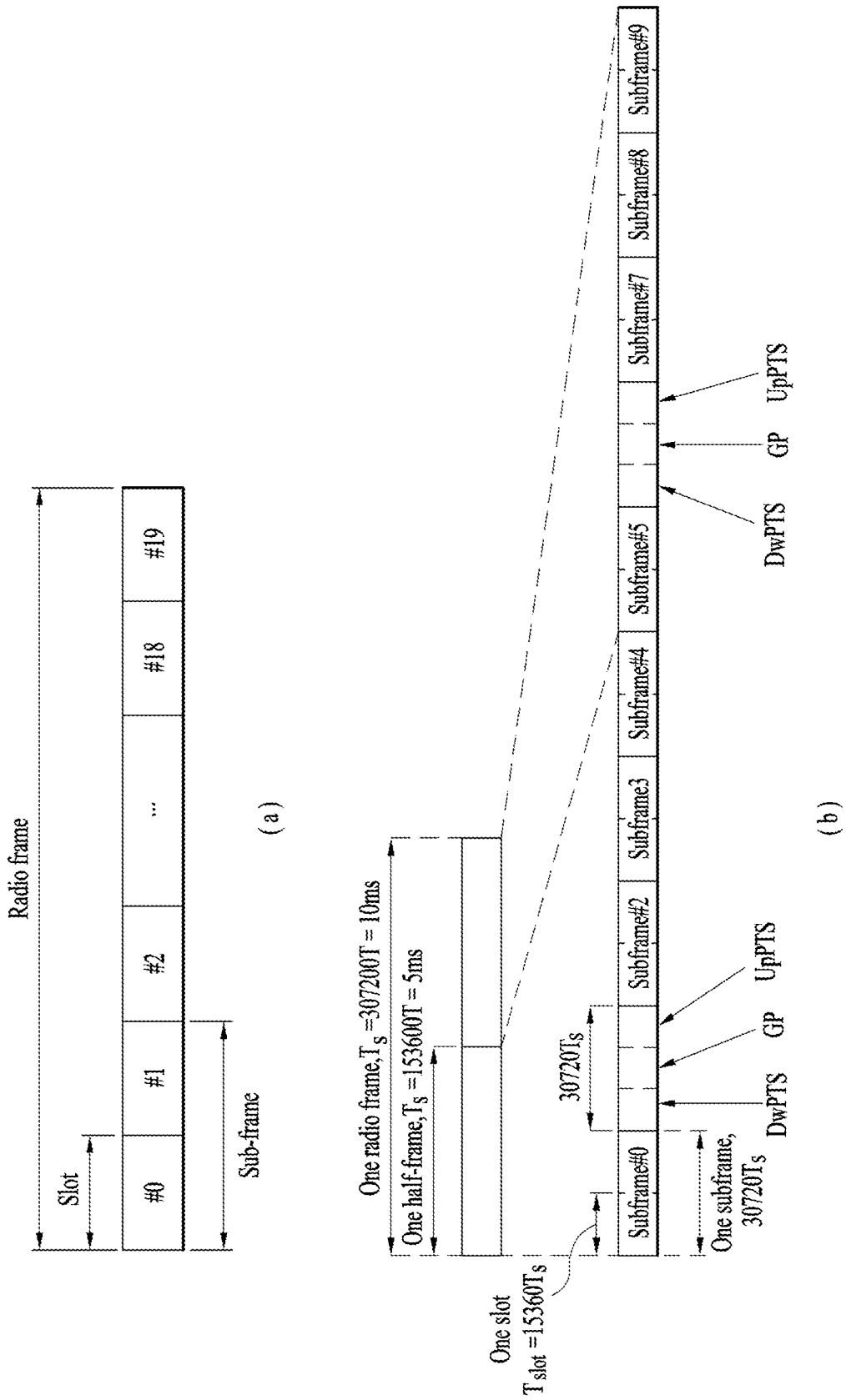
FIG. 3 is a diagram illustrating long term evolution (LTE) radio frame structures.

FIG. 3 illustrates LTE radio frame structures. LTE supports frame type 1 for frequency division duplex (FDD), frame type 2 for time division duplex (TDD), and frame type 3 for an unlicensed cell (UCell). Up to 31 secondary cells (SCells) may be aggregated in addition to a primary cell (PCell). Unless otherwise specified, operations described in the disclosure may be applied independently on a cell basis. In multi-cell aggregation, different frame structures may be used for different cells. Further, time resources (e.g., a subframe, a slot, and a subslot) within a frame structure may be generically referred to as a time unit (TU).

FIG. 3(a) illustrates frame type 1. A DL radio frame is defined by 10 1-ms subframes (SFs). A subframe includes 14 or 12 symbols according to a cyclic prefix (CP). In a normal CP case, a subframe includes 14 symbols, and in an extended CP case, a subframe includes 12 symbols. Depending on multiple access schemes, a symbol may be an OFDM(A) symbol or an SC-FDM(A) symbol. For example, a symbol may refer to an OFDM(A) symbol on DL and an SC-FDM(A) symbol on UL. An OFDM(A) symbol may be referred to as a cyclic prefix-OFDMA(A) (CP-OFDM(A)) symbol, and an SC-FMD(A) symbol may be referred to as a discrete Fourier transform-spread-OFDM(A) (DFT-s-OFDM(A)) symbol.

FIG. 3(b) illustrates frame type 2. Frame type 2 includes two half frames. A half frame includes 4 (or 5) general subframes and 1 (or 0) special subframe. According to a UL-DL configuration, a general subframe is used for UL or DL. A subframe includes two slots.

The above-described radio frame structures are merely exemplary, and the number of subframes in a radio frame, the number of slots in a subframe, and the number of symbols in a slot may vary.

Figure 4:
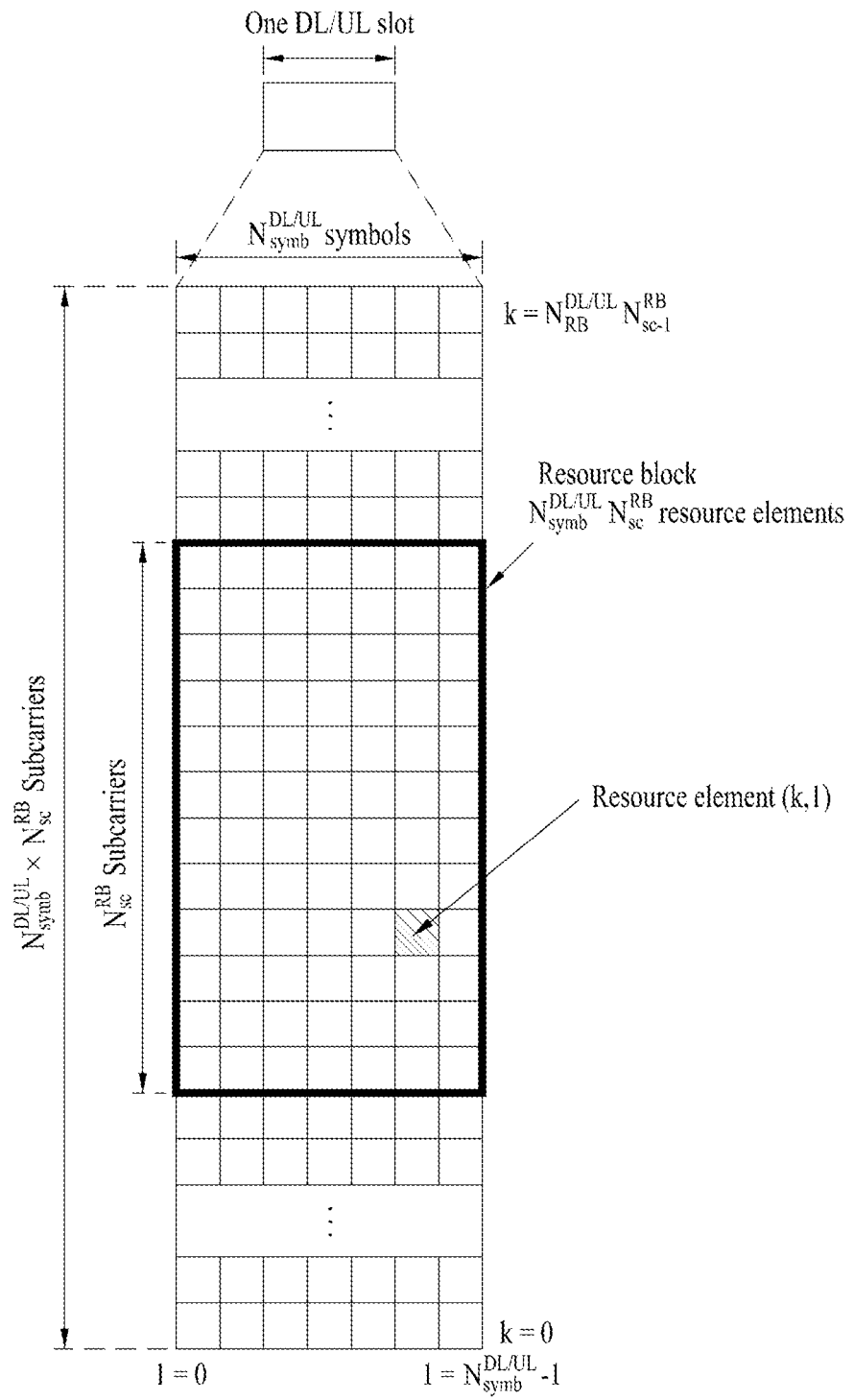
FIG. 4 is a diagram illustrating a slot structure in an LTE frame.

FIG. 4 is a diagram illustrating a slot structure in an LTE frame.

Referring to FIG. 4, a slot includes a plurality of symbols in the time domain by a plurality of resource blocks (RBs) in the frequency domain. A symbol may refer to a symbol duration. A slot structure may be represented as a resource grid including $N^{DL/UL}_{RB} \times N^{RB}_{sc}$ subcarriers and $N^{DL/UL}_{symb}$ symbols. $N^{DL}_{RB}$ represents the number of RBs in a DL slot, and $N^{UL}_{RB}$ represents the number of RBs in a UL slot. $N^{DL}_{RB}$ and $N^{UL}_{RB}$ are dependent on a DL bandwidth and a UL bandwidth, respectively. $N^{DL}_{symb}$ represents the number of symbols in the DL slot, and $N^{UL}_{symb}$ represents the number of symbols in the UL slot. $N^{RB}_{sc}$ represents the number of subcarriers in one RB. The number of symbols in a slot may vary according to a subcarrier spacing (SCS) and a CP length. For example, one slot includes 7 symbols in the normal CP case, whereas one slot includes 6 symbols in the extended CP case.

An RB is defined as $N^{DL/UL}_{symb}$ (e.g., 7) consecutive symbols in the time domain by $N^{RB}_{sc}$ (e.g., 12) consecutive subcarriers in the frequency domain. The RB may be a physical resource block (PRB) or a virtual resource block (VRB), and PRBs may be mapped to VRBs in a one-to-one correspondence. Two RBs each being located in one of the two slots of a subframe may be referred to as an RB pair. The two RBs of an RB pair may have the same RB number (or RB index). A resource including one symbol by one subcarrier is referred to as a resource element (RE) or tone. Each RE of a resource grid may be uniquely identified by an index pair (k, 1) in a slot where k is a frequency-domain index ranging from 0 to $N^{DL/UL}_{RB} \times N^{RB}_{sc} - 1$ and 1 is a time-domain index ranging from 0 to $N^{DL/UL}_{symb} - 1$.

Up to three (or four) OFDM(A) symbols at the beginning of the first slot of a subframe correspond to a control region. The remaining OFDM(A) symbols correspond to a data region in which a PDSCH is allocated, and a basic resource unit of the data region is an RB. DL control channels include physical control format indicator channel (PCFICH), PDCCH, physical hybrid-ARQ indicator channel (PHICH), and so on. The PCFICH is transmitted in the first OFDM symbol of a subframe, conveying information about the number of OFDM symbols used for transmission of control channels in the subframe. The PHICH is a response to a UL transmission, conveying an HARQ ACK/NACK signal. Control information delivered on the PDCCH is called downlink control information (DCI). The DCI includes UL resource allocation information, DL resource control information, or a UL transmit power control command for any UE group.

A subframe includes two 0.5-ms slots. Each slot includes a plurality of symbols, each corresponding to one SC-FDMA symbol. An RB is a resource allocation unit corresponding to 12 subcarriers in the frequency domain by one slot in the time domain. An LTE UL subframe is divided largely into a control region and a data region. The data region is communication resources used for each UE to transmit data such as voice, packets, and so on, including a PUSCH. The control region is communication resources used for each UE to transmit a DL channel quality report, an ACK/NACK for a DL signal, a UL scheduling request, and so on, including a PUCCH. A sounding reference signal (SRS) is transmitted in the last SC-FDMA symbol of a subframe in the time domain.

Figure 5:
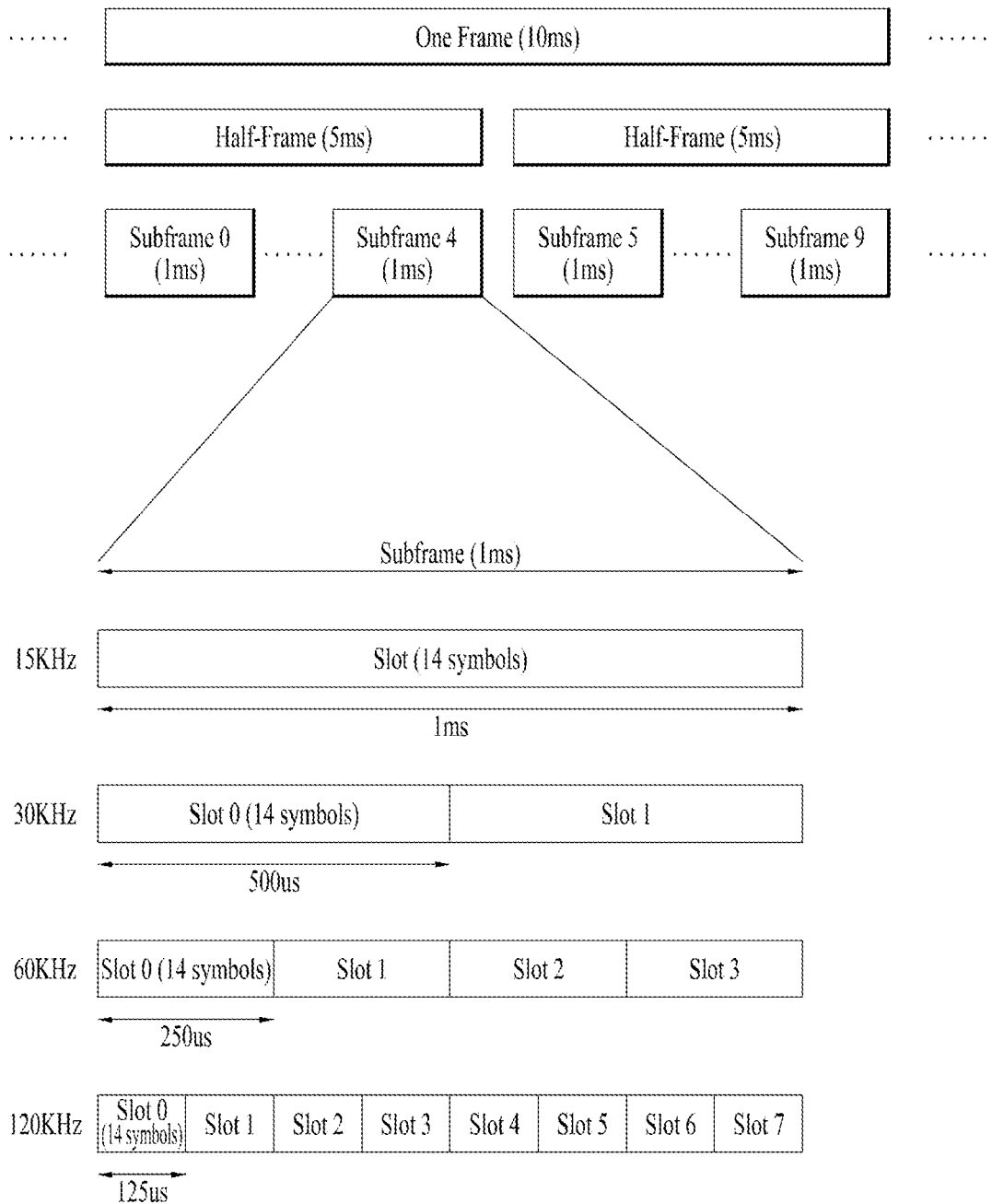
FIG. 5 is a diagram illustrating a radio frame structure in a new radio access technology (NR) system.

FIG. 5 illustrates a radio frame structure used in an NR system.

In NR, UL and DL transmissions are configured in frames. Each radio frame has a length of 10 ms and is divided into two 5-ms half frames (HFs). Each half frame is divided into five 1-ms subframes. A subframe is divided into one or more slots, and the number of slots in a subframe depends on an SCS. Each slot includes 12 or 14 OFDM(A) symbols according to a CP. When a normal CP is used, each slot includes 14 OFDM symbols. When an extended CP is used, each slot includes 12 OFDM symbols. A symbol may include an OFDM symbol (CP-OFDM symbol) and an SC-FDMA symbol (or DFT-s-OFDM symbol).

Table 1 exemplarily illustrates that the number of symbols per slot, the number of slots per frame, and the number of slots per subframe vary according to SCSs in the normal CP case.

TABLE 1

| SCS (15 × 2^μ) | $N_{symb}^{slot}$ | $N_{slot}^{frame,\mu}$ | $N_{slot}^{subframe,\mu}$ |
|---|---|---|---|
| 15 KHz (μ = 0) | 14 | 10 | 1 |
| 30 KHz (μ = 1) | 14 | 20 | 2 |
| 60 KHz (μ = 2) | 14 | 40 | 4 |
| 120 KHz (μ = 3) | 14 | 80 | 8 |
| 240 KHz (μ = 4) | 14 | 160 | 16 |

* $N_{symb}^{slot}$: number of symbols in a slot
* $N_{slot}^{frame,\mu}$: number of slots in a frame
* $N_{slot}^{subframe,\mu}$: number of slots in a subframe Table 2 illustrates that the number of symbols per slot, the number of slots per frame, and the number of slots per subframe vary according to SCSs in the extended CP case.

TABLE 2

| SCS (15 × 2^μ) | $N_{symb}^{slot}$ | $N_{slot}^{frame,\mu}$ | $N_{slot}^{subframe,\mu}$ |
|---|---|---|---|
| 60 KHz (μ = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a TU) including the same number of symbols may be configured differently for the aggregated cells.

Figure 6:
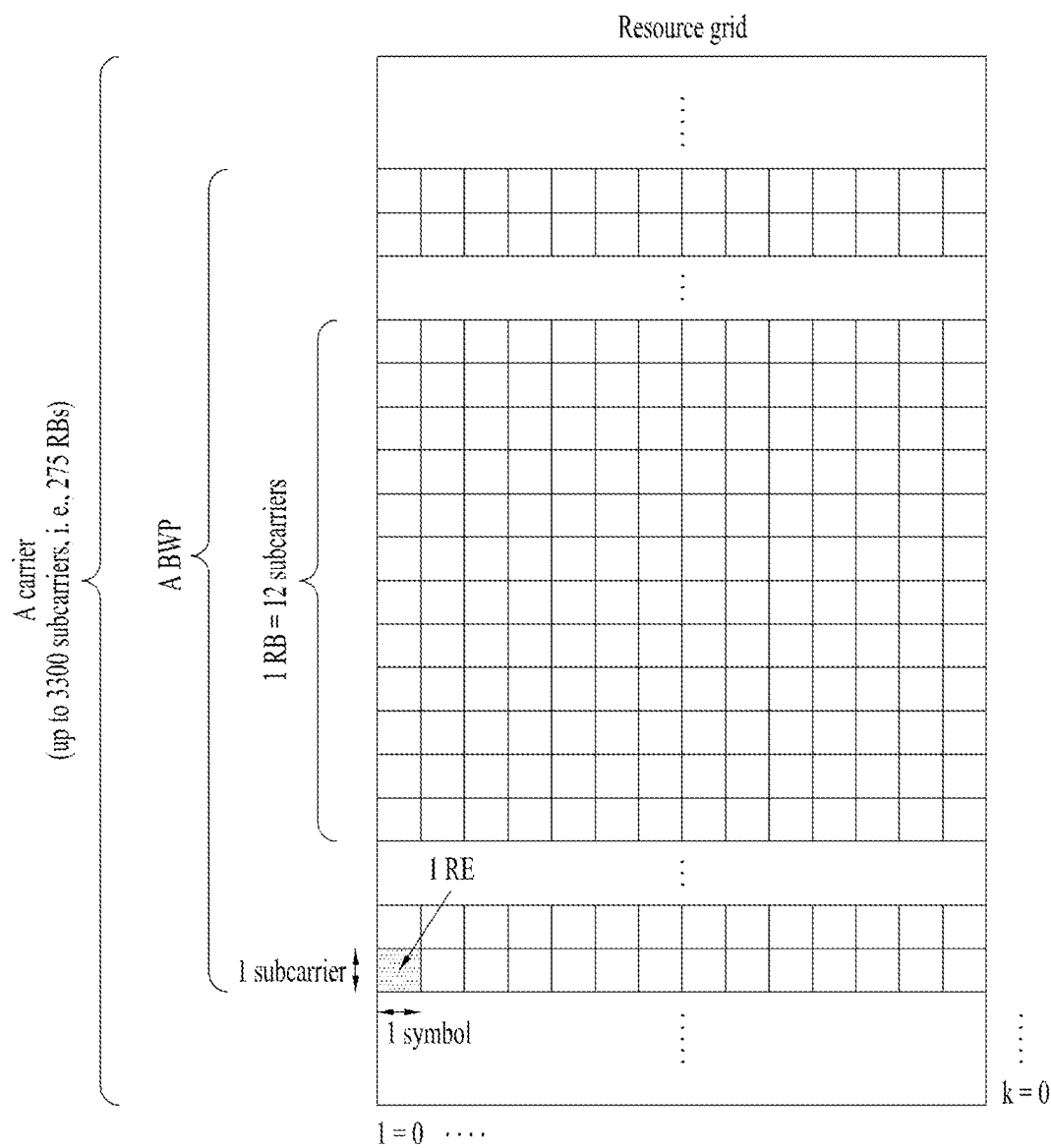
FIG. 6 is a diagram illustrating a slot structure in an NR frame.

FIG. 6 illustrates a slot structure of an NR frame.

A slot includes a plurality of symbols in the time domain. For example, one slot includes 14 symbols in the normal CP case and 12 symbols in the extended CP case. A carrier includes a plurality of subcarriers in the frequency domain. An RB may be defined by a plurality of (e.g., 12) consecutive subcarriers in the frequency domain. A bandwidth part (BWP) may be defined by a plurality of consecutive (P)RBs in the frequency domain and correspond to one numerology (e.g., SCS, CP length, and so on). A carrier may include up to N (e.g., 5) BWPs. Data communication may be conducted in an active BWP, and only one BWP may be activated for one UE. Each element of a resource grid may be referred to as an RE, to which one complex symbol may be mapped.

B. UL and DL Channels

DL Channels

A BS transmits related signals on DL channels to a UE, and the UE receives the related signals on the DL channels from the BS.

(1) Physical Downlink Shared Channel (PDSCH)

The PDSCH delivers DL data (e.g., a DL shared channel transport block (DL-SCH TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a demodulation reference signal (DMRS) to resources, and transmitted through a corresponding antenna port.

(2) Physical Downlink Control Channel (PDCCH)

The PDCCH delivers DCI and adopts QPSK as a modulation scheme. One PDCCH includes 1, 2, 4, 8, or 16 control channel elements (CCEs) according to its aggregation level (AL). One CCE includes 6 resource element groups (REGs), each REG being defined by one OFDM symbol by one (P)RB. The PDCCH is transmitted in a control resource set (CORESET). A CORESET is defined as a set of REGs with a given numerology (e.g., an SCS, a CP length, or the like). A plurality of CORESETs for one UE may overlap with each other in the time/frequency domain. A CORESET may be configured by system information (e.g., a master information block (MIB)) or UE-specific higher-layer signaling (e.g., RRC signaling). Specifically, the number of RBs and the number of symbols (3 at maximum) in the CORESET may be configured by higher-layer signaling.

The UE acquires DCI delivered on the PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

controlResourceSetID: A set of control resources related to the search space set.

monitoringSlotPeriodiciAndOffset: A PDCCH monitoring periodicity (in slots) and a PDCCH monitoring offset (in slots).

monitoringSymbolsWithinSlot: A PDCCH monitoring pattern (e.g., the first symbol(s) in a CORESET) in a PDCCH monitoring slot.

nrofCandidates: The number of PDCCH candidates (one of 0, 1, 2, 3, 4, 5, 6, and 8) for each AL={1, 2, 4, 8, 16}.

Table 3 lists exemplary features of each search space type.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI (s) | |
| | UE Specific | C-RNTI, or MCS-C-RNTI, or CS-RNTI (s) | User specific PDSCH decoding |

Table 4 lists exemplary DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB (s) and OFDM symbol (s) where UE may assume no transmission is intended for the UE |

TABLE 4-continued

| DCI format | Usage |
|---|---|
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to a UE, and DCI format 2_1 is used to deliver DL preemption information to a UE. DCI format 2_0 and/or DCI format 2_1 may be delivered to a corresponding group of UEs on a group common PDCCH which is a PDCCH directed to a group of UEs.

UL Channels

A UE transmits related signals on UL channels to a BS, and the BS receives the related signals on the UL channels from the UE.

(1) Physical Uplink Shared Channel (PUSCH)

The PUSCH delivers UL data (e.g., UL shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be scheduled dynamically by a UL grant in DCI, or semi-statically by higher-layer signaling (e.g., RRC signaling) (and/or layer 1 (L1) signaling such as a PDCCH) (configured grant). The PUSCH transmission may be performed in a codebook-based or non-codebook-based manner.

(2) Physical Uplink Control Channel (PUCCH)

The PUCCH delivers UCI, an HARQ ACK, and/or an SR and is classified as a short PUCCH or a long PUCCH according to the transmission duration of the PUCCH. Table 5 lists exemplary PUCCH formats.

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

C. Machine Type Communication (MTC)

MTC, which is a type of data communication involving one or more machines, may be applied to machine-to-machine (M2M) or Internet of things (IoT). A machine refers to an entity that does not require direct human manipulation or intervention. For example, machines include a smart meter equipped with a mobile communication module, a vending machine, a portable terminal having an MTC function, and so on. For example, services such as meter reading, water level measurement, use of surveillance cameras, and inventory reporting of vending machines may be provided through MTC. MTC has the features of a small amount of transmission data and intermittent UL/DL data transmissions/receptions. Therefore, it is efficient to lower the unit cost of MTC devices and reduce battery consumption in correspondence with low data rates. An MTC device generally has low mobility, and thus MTC is conducted in a channel environment which hardly changes.

The 3GPP has applied MTC since release 10, and MTC may be implemented to satisfy the requirements of low cost and low complexity, coverage enhancement, and low power consumption. For example, 3GPP Release 12 added features for low-cost MTC devices and thus defined UE category 0. A UE category is an indicator indicating the amount of data that a UE may process in a communication modem. A UE of UE category 0 may reduce baseband/radio frequency (RF) complexity by using a reduced peak data rate, a half-duplex operation with relaxed RF requirements, and a single reception (Rx) antenna. In 3GPP Release 12, enhanced MTC (eMTC) was introduced, and the price and power consumption of MTC UEs were further lowered by operating the MTC UEs only at 1.08 MHz (that is, 6 RBs), a minimum frequency bandwidth supported in legacy LTE.

While the present disclosure is described mainly in the context of features related to eMTC, the present disclosure is equally applicable to MTC, eMTC, and MTC applied to 5G (or NR) unless otherwise specified. For the convenience of description, MTC, eMTC, and MTC applied to 5G (or NR) are generically referred to as MTC herein.

Figure 7:
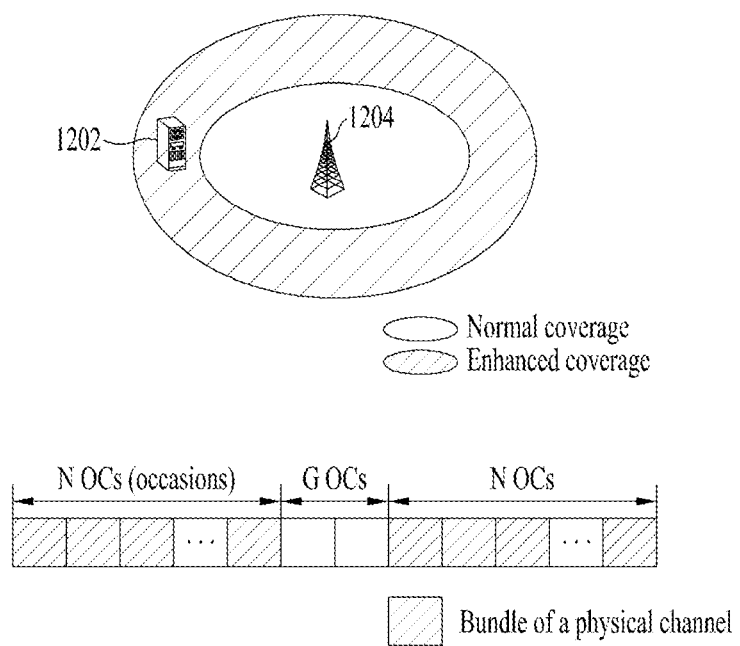
FIG. 7 is a diagram illustrating cell coverage enhancement in machine type communication (MTC)

FIG. 7 illustrates cell coverage enhancement in MTC. Coverage enhancement may also be expressed as coverage extension, and a technique for coverage enhancement described in relation to MTC may be applied to NB-IoT and 5G (or NR) in the same/similar manner.

For cell extension or cell enhancement (CE) of a BS 1204 to an MTC device 1202, various CE techniques are under discussion. For example, for CE, the BS/UE may transmit/receive one physical channel/signal in a plurality of occasions (a bundle of physical channels). The physical channel/signal may be repeatedly transmitted/received according to a predefined rule during a bundle interval. A receiver may increase the decoding success rate of the physical channel/signal by decoding some or all of the physical channel/signal bundle. An occasion may mean resources (e.g., time/frequency) in which a physical channel/signal may be transmitted/received. An occasion for a physical channel/signal may include a subframe, a slot, or a symbol set in the time domain. The symbol set may include one or more consecutive OFDM-based symbols. An OFDM-based symbol may include an OFDM(A) symbol and a DFT-s-OFDM(A) (i.e., SC-FDM(A)) symbol. The occasion for a physical channel/signal may include a frequency band or an RB set in the frequency domain. For example, a PBCH, a PRACH, an MTC PDCCH (MPDCCH), a PDSCH, a PUCCH, and a PUSCH may be repeatedly transmitted/received.

MTC supports an operation mode for CE, and a mode supporting repeated transmissions/receptions of a signal for CE may be referred to as a CE mode. The number of repeated transmissions/receptions of a signal for CE may be referred to as a CE level. Table 6 illustrates exemplary CE modes/levels supported in MTC.

TABLE 6

| Mode | Level | Description |
|---|---|---|
| Mode A | Level 1 | No repetition for PRACH |
| | Level 2 | Small Number of Repetition for PRACH |
| Mode B | Level 3 | Medium Number of Repetition for PRACH |
| | Level 4 | Large Number of Repetition for PRACH |

A first mode (e.g., CE Mode A) is defined for small CE, supporting full mobility and CSI feedback, in which no repetition or a small number of repetitions are performed. A first-mode operation may be identical to the operation range of UE category 1. A second mode (e.g., CE Mode B) is defined for UEs in an extremely poor coverage condition, supporting CSI feedback and limited mobility, in which a large number of repeated transmissions are defined. The second mode provides up to 15 dB of CE with respect to the range of UE category 1. Each level of MTC is defined differently for a random access procedure (or RACH procedure) and a paging procedure.

Figure 8:
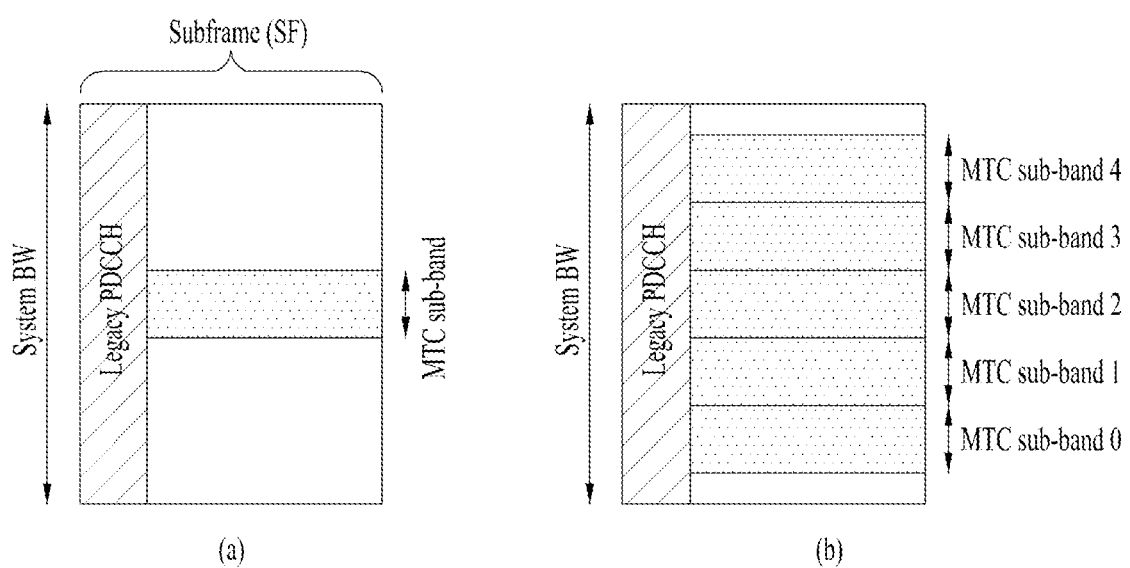
FIG. 8 is a diagram illustrating MTC signal bands.

FIG. 8 illustrates MTC signal bands.

Referring to FIG. 8, to reduce the unit cost of MTC UEs, MTC may be conducted only in a specific band (or channel band) (MTC subband or narrowband (NB)) of the system bandwidth of a cell, regardless of the system bandwidth of the cell. For example, an MTC UE may perform a UL/DL operation only in a 1.08-MHz frequency band. 1.0 MHz corresponds to six consecutive PRBs in the LTE system, and is defined to enable MTC UEs to follow the same cell search and random access procedures as LTE UEs. FIG. 8(a) illustrates an MTC subband configured at the center of a cell (e.g., center 6 PRBs), and FIG. 8(b) illustrates a plurality of MTC subbands configured within a cell. The plurality of MTC subbands may be configured contiguously/non-contiguously in the frequency domain. Physical channels/signals for MTC may be transmitted and received in one MTC subband. In the NR system, an MTC subband may be defined in consideration of a frequency range and an SCS. In the NR system, for example, the size of an MTC subband may be defined as X consecutive PRBs (i.e., $0.18*X*(2^\mu)$ MHz bandwidth) (see Table 1 for $\mu$). X may be set to 20 according to the size of a synchronization signal/physical broadcast channel (SS/PBCH) block. In the NR system, MTC may operate in at least one BWP. A plurality of MTC subbands may be configured in a BWP.

Figure 9:
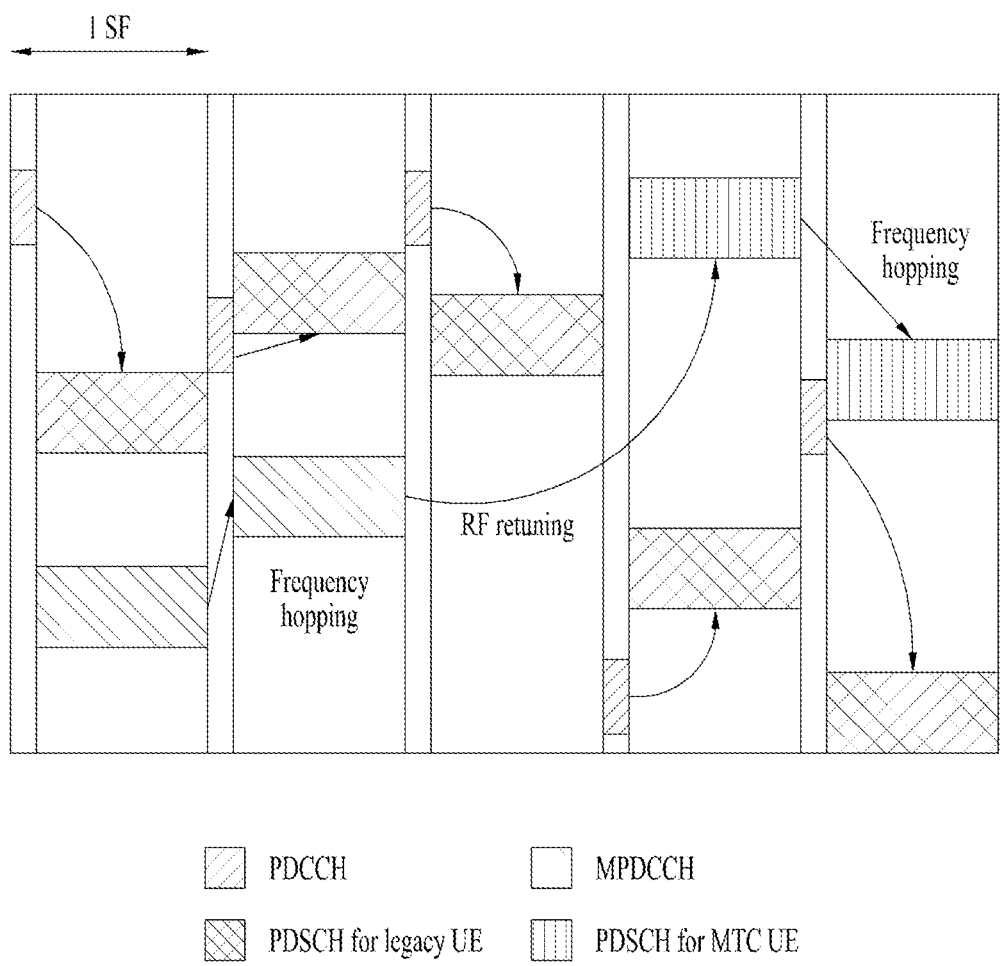
FIG. 9 is a diagram illustrating scheduling in legacy LTE and MTC.

FIG. 9 illustrates scheduling in legacy LTE and MTC.

Referring to FIG. 9, a PDSCH is scheduled by a PDCCH in legacy LTE. Specifically, the PDCCH may be transmitted in the first N OFDM symbols in a subframe (N=1 to 3), and the PDSCH scheduled by the PDCCH is transmitted in the same subframe. In MTC, a PDSCH is scheduled by an MPDCCH. Accordingly, an MTC UE may monitor MPDCCH candidates in a search space within a subframe. The monitoring includes blind decoding of the MPDCCH candidates. The MPDCCH delivers DCI, and the DCI includes UL or DL scheduling information. The MPDCCH is multiplexed with the PDSCH in FDM in a subframe. The MPDCCH is repeatedly transmitted in up to 256 subframes, and the DCI carried in the MPDCCH includes information about an MPDCCH repetition number. In DL scheduling, when the repeated transmissions of the MPDCCH end in subframe #N, transmission of the PDSCH scheduled by the MPDCCH starts in subframe #N+2. The PDSCH may be repeatedly transmitted in up to 2048 subframes. The MPDCCH and the PDSCH may be transmitted in different MTC subbands. In UL scheduling, when the repeated transmissions of the MPDCCH end in subframe #N, transmission of a PUSCH scheduled by the MPDCCH starts in subframe #N+4. For example, when the PDSCH is repeatedly transmitted in 32 subframes, the PDSCH may be transmitted in the first 16 subframes in a first MTC subband, and in the remaining 16 subframes in a second MTC subband. MTC operates in a half-duplex mode. MTC HARQ retransmission is adaptive and asynchronous.

D. Narrowband Internet of Things (NB-IoT)

NB-IoT is a narrowband Internet of things technology supporting a low-power wide area network through an existing wireless communication system (e.g., LTE or NR). Further, NB-IoT may refer to a system supporting low complexity and low power consumption in a narrowband (NB). Since an NB-IoT system uses the same OFDM parameters as those of an existing system, such as an SCS, there is no need to allocate an additional band separately for the NB-IoT system. For example, one PRB of an existing system band may be allocated for NB-IoT. Considering that an NB-IoT UE perceives a single PRB as a carrier, PRB and carrier may be interpreted as the same meaning in the description of NB-IoT.

NB-IoT may operate in a multi-carrier mode. In NB-IoT, a carrier may be defined as an anchor type carrier (i.e., anchor carrier or anchor PRB) or a non-anchor type carrier (i.e., non-anchor carrier or non-anchor PRB). From the perspective of a BS, the anchor carrier may mean a carrier carrying a narrowband PSS (NPSS), a narrowband SSS (NSSS), and a narrowband PBCH (NPBCH) for initial access, and a narrowband PDSCH (NPDSCH) for a narrowband system information block (N-SIB). That is, in NB-IoT, a carrier for initial access may be referred to as an anchor carrier, and the other carrier(s) may be referred to as non-anchor carrier(s). One or more anchor carriers may exist in the system.

While NB-IoT is described mainly in the context of being applied to the legacy LTE system in the present disclosure, the description may be extended to a next-generation system (e.g., NR system). In the present disclosure, the description of NB-IoT may be extended to MTC serving a similar technical purpose (e.g., low-power, low-cost, and CE). The term NB-IoT may be replaced with other equivalent terms such as NB-LTE, NB-IoT enhancement, enhanced NB-IoT, further enhanced NB-IoT, and NB-NR.

NB-IoT DL physical channels include NPBCH, NPDSCH, and NPDCCH, and NB-IoT DL physical signals include NPSS, NSSS, and narrowband RS (NRS).

A different NB-IoT frame structure may be configured according to an SCS. For example, the NB-IoT system may support a 15 kHz SCS and a 3.75 kHz SCS. NB-IoT may be considered for any other SCS (e.g., 30 kHz) with different time/frequency units, not limited to the 15 kHz SCS and the 3.75 kHz SCS. While the NB-IoT frame structure based on the LTE system frame structure has been described herein for the convenience of description, the present disclosure is not limited thereto. Obviously, methods described in the present disclosure may be extended to NB-IoT based on a frame structure of the next-generation system (e.g., NR system).

An NB-IoT frame structure for the 15 kHz SCS may be configured to be identical to the frame structure of the above-described legacy system (i.e., LTE system). That is, a 10-ms NB-IoT frame may include 10 1-ms NB-IoT subframes, each including two 0.5-ms NB-IoT slots. Each 0.5-ms NB-IoT slot may include 7 OFDM symbols.

For the 3.75 kHz SCS, a 10-ms NB-IoT frame includes 5 2-ms NB-IoT subframes, each including 7 OFDM symbols and one guard period (GP). A 2-ms NB-IoT subframe may also be referred to as an NB-IoT slot or an NB-IoT resource unit (RU).

NB-IoT DL physical resources may be configured based on the configuration of physical resources in another wireless communication system (e.g., LTE or NR), except that an NR system bandwidth is a certain number of RBs (e.g., one RB, i.e., 180 kHz). For example, when the NB-IoT DL supports only the 15 kHz SCS, the NB-IoT DL physical resources may be configured as the resource area of one RB (i.e., one PRB) in the frequency domain, to which the resource grid of the LTE system illustrated in FIG. 4 is limited, as described above. Likewise, for NB-IoT UL physical resources, the system bandwidth may be limited to one RB.

Figure 10:
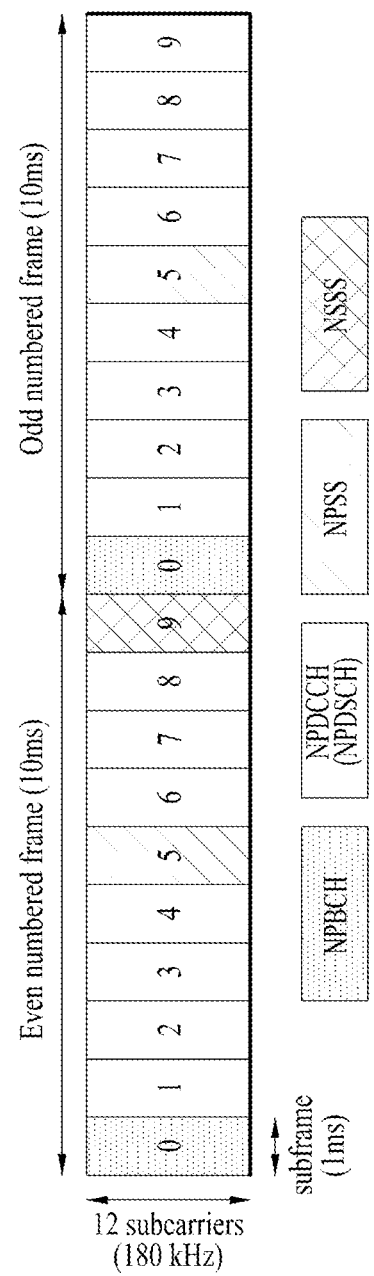
FIG. 10 is a diagram illustrating transmission of narrowband Internet of things (NB-IoT) downlink physical channels/signals.

FIG. 10 illustrates transmission of NB-IoT DL physical channels/signals. An NB-IoT DL physical channel/signal is transmitted in one PRB and supports the 15 kHz SCS/multi-tone transmission.

Referring to FIG. 10, the NPSS is transmitted in the sixth subframe of every frame, and the NSSS is transmitted in the last (e.g., tenth) subframe of every even-numbered frame. A UE may acquire frequency, symbol, and frame synchronization using the synchronization signals (NPSS and NSSS) and search 504 physical cell IDs (PCIDs) (i.e., BS IDs). The NPBCH is transmitted in the first subframe of every frame, carrying an NB-MIB. The NRS is provided as an RS for DL physical channel demodulation and generated in the same manner as in LTE. However, an NB-PCID (NCell ID or NB-IoT BS ID) is used as an initialization value for generation of an NRS sequence. The NRS is transmitted through one or two antenna ports. The NPDCCH and the NPDSCH may be transmitted in the remaining subframes except for the subframes carrying the NPSS, the NSSS, and the NPBCH. The NPDCCH and the NPDSCH may not be transmitted in the same subframe. The NPDCCH carries DCI, and the DCI supports three types of DCI formats. DCI format N0 includes NPUSCH scheduling information, and DCI formats N1 and N2 include NPDSCH scheduling information. The NPDCCH may be transmitted up to 2048 times, for CE. The NPDSCH is used to transmit data (e.g., TB) of a transport channel such as a DL-SCH and a paging channel (PCH). A maximum TB size (TBS) is 680 bits, and a TB may be repeatedly transmitted up to 2048 times, for CE.

NB-IoT UL physical channels include narrowband PRACH (NPRACH) and NPUSCH, and support single-tone transmission and multi-tone transmission. Single-tone transmission is supported for the SCSs of 3.5 kHz and 15 kHz, and multi-tone transmission is supported only for the 15 kHz SCS.

SC-FDMA may be applied to NB-IoT UL based on the SCS of 15 kHz or 3.75 kHz. Multi-tone transmission and single-tone transmission may be supported for the NB-IoT UL. For example, multi-tone transmission is supported only for the 15 kHz SCS, and single-tone transmission may be supported for the SCSs of 15 kHz and 3.75 kHz.

As mentioned in relation to the NB-IoT DL, the physical channels of the NB-IoT system may have names added with "N (Narrowband)" to distinguish them from the channels of the existing systems. For example, the NB-IoT UL physical channels may include NPRACH, NPUSCH, and so on, and the NB-IoT UL physical signals may include narrowband DMRS (NDMRS).

The NPUSCH may be configured in NPUSCH format 1 or NPUSCH format 2. For example, NPUSCH format 1 may be used to carry (or deliver) a UL-SCH, and NPUSCH format 2 may be used to transmit UCI such as an HARQ ACK.

Characteristically, the UL channel of the NB-IoT system, NPRACH may be repeatedly transmitted, for CE. In this case, frequency hopping may be applied to the repeated transmissions.

E. Network Access and Communication Procedure

A UE may perform a network access procedure to perform the procedures and/or methods described/proposed in the present disclosure. For example, the UE may receive system information and configuration information required to perform the described/proposed procedures and/or methods and store the received information in a memory, during network (BS) access. The configuration information required for the present disclosure may be received by higher-layer signaling (e.g., RRC layer signaling, MAC-layer signaling, or the like).

Figure 11:
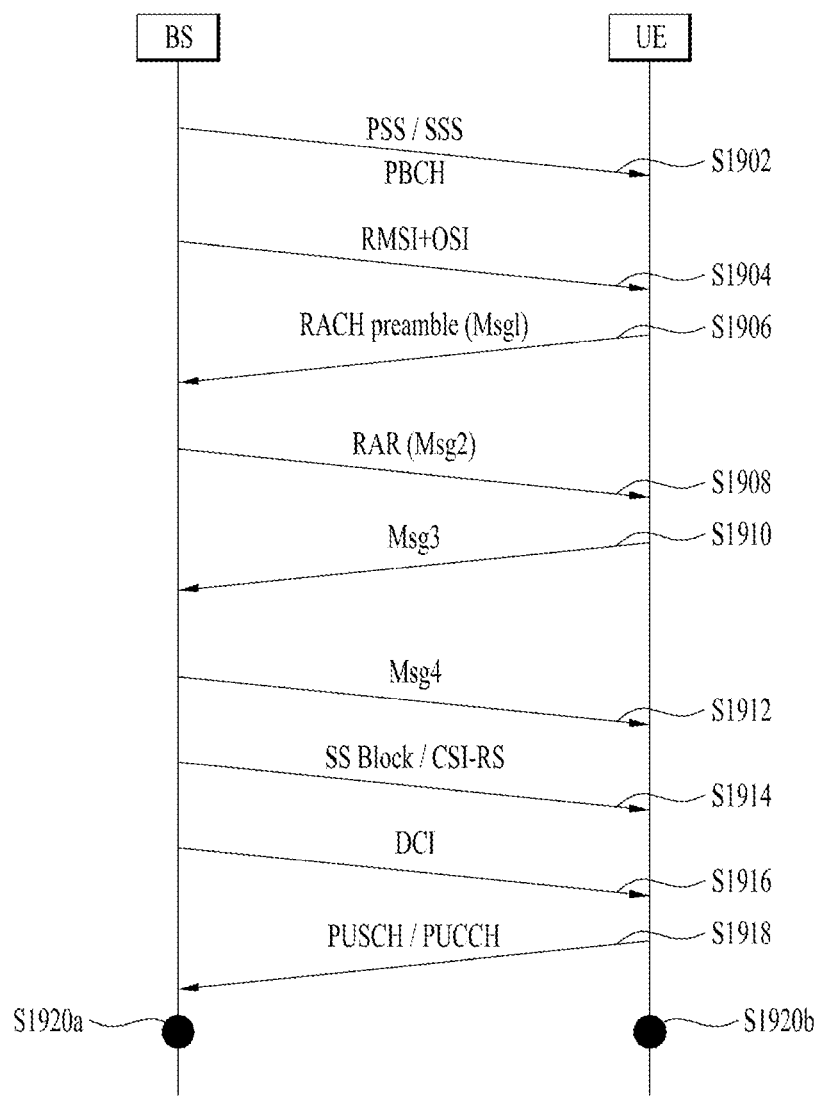
FIG. 11 is a diagram illustrating a signal flow for an initial network access procedure and a subsequent communication procedure in an NR system.

FIG. 11 is a diagram illustrating a signal flow for an initial network access procedure and a subsequent communication procedure in the NR system. In NR, a physical channel and an RS may be transmitted by beamforming. When beamforming-based signal transmission is supported, a beam management process may be involved to align beams between a BS and a UE. Further, signals proposed in the present disclosure may be transmitted/received by beamforming. In RRC idle mode, beam alignment may be performed based on an SSB, whereas in RRC connected mode, beam alignment may be performed based on a CSI-RS (in DL) and an SRS (in UL). On the contrary, when beamforming-based signal transmission is not supported, an operation related to a beam may be skipped in the description of the present disclosure.

Referring to FIG. 11, a BS may periodically transmit an SSB (S1902). The SSB includes a PSS, an SSS, and a PBCH. The SSB may be transmitted by beam sweeping. The PBCH includes an MIB, and the MIB may include scheduling information for remaining minimum system information (RMSI). Subsequently, the BS may transmit the RMSI and other system information (OSI) (S1904). The RMSI may include information (e.g., PRACH configuration information) required for a UE to initially access the BS. After detecting SSBs, the UE identifies the best SSB. The UE may then transmit an RACH preamble (message 1 or Msg1) to the BS in PRACH resources linked/corresponding to the index (i.e., beam) of the best SSB (S1906). The beam direction of the RACH preamble is associated with the PRACH resources. The association between the PRACH resources (and/or the RACH preamble) and the SSB (index) may be configured by system information (e.g., RMSI). As part of the random access procedure (or RACH procedure), the BS may transmit an RAR (Msg2) in response to the RACH preamble (S1908). The UE may transmit Msg3 (e.g., RRC Connection Request) based on a UL grant included in the RAR (S1910), and the BS may transmit a contention resolution message (Msg4) (S1920). Msg4 may include an RRC Connection Setup message.

When an RRC connection is established between the BS and the UE in the random access procedure (or RACH procedure), a subsequent beam alignment may be performed based on an SSB/CSI-RS (in DL) and an SRS (in UL). For example, the UE may receive an SSB/CSI-RS (S1914). The SSB/CSI-RS may be used for the UE to generate a beam/CSI report. The BS may request a beam/CSI report to the UE by DCI (S1916). In this case, the UE may generate a beam/CSI report based on the SSB/CSI-RS, and transmit the generated beam/CSI report to the BS on a PUSCH/PUCCH (S1918). The beam/CSI report may include a beam measurement result, information about a preferred beam, and so on. The BS and the UE may switch a beam based on the beam/CSI report (S1920a and S1920b).

Subsequently, the UE and the BS may perform the above-described/proposed procedures and/or methods. For example, the UE and the BS may process information stored in the memory and transmit a radio signal or process a received radio signal and store the processed signal in the memory according to a proposal of the present disclosure, based on the configuration information obtained in the network access procedure (e.g., the system information acquisition procedure, the RRC connection procedure through an RACH, and so on). The radio signal may include at least one of a PDCCH, a PDSCH, or an RS for DL, and at least one of a PUCCH, a PUSCH, or an SRS for UL.

Basically, the above description may be applied commonly to MTC and NB-IoT. The difference between MTC and NB-IoT will further be described below.

MTC Network Access Procedure

An MTC network access procedure will be further described in the context of LTE. The following description may be extended to NR as well. In FIG. 1 and/or FIG. 11, a PDCCH is replaced by an MPDCCH (e.g., see FIG. 9 and the related description).

In LTE, an MIB includes 10 reserved bits. In MTC, 5 most significant bits (MSBs) out of the 10 reserved bits of the MIB are used to indicate scheduling information for system information block for bandwidth reduced device (SIB1-BR). The 5 MSBs are used to indicate the repetition number and TBS of the SIB1-BR. The SIB1-BR is transmitted on a PDSCH. The SIB1-BR may be kept unchanged in 512 radio frames (5120 ms) to allow combining of multiple subframes. The SIB1-BR delivers similar information to that of SIB1 in LTE.

An MTC random access procedure (or RACH procedure) is basically identical to the LTE random access procedure (or RACH procedure) (e.g., see FIG. 2 and the related description), except that the former is performed based on a CE level. For example, whether the PRACH is repeatedly transmitted and/or the repetition number of the PRACH may vary with CE levels, for PRACH CE. As described with reference to Table 6, a mode supporting repeated transmissions of a signal for CE is referred to as a CE mode, and the repetition number of the signal for CE is referred to as a CE level. For example, as illustrated in Table 6, the first mode (e.g., CE Mode A) is a mode for small CE supporting full mobility and CSI feedback, in which no repetition or a small number of repetitions may be set. The second mode (e.g., CE Mode B) is a mode for a UE in an extremely poor coverage condition, supporting CSI feedback and limited mobility, in which a large repetition number may be set.

The BS broadcasts system information including a plurality of (e.g., three) reference signal received power (RSRP) thresholds, and the UE may determine a CE level by comparing the RSRP thresholds with an RSRP measurement. The following information may be independently configured on a CE level basis by system information.

PRACH resource information: the periodicity/offset of PRACH occasions, and PRACH frequency resources Preamble Group: Preamble set allocated for each CE level Repetition number per preamble attempt and maximum number of preamble attempts RAR window time: the length of a time period during which RAR reception is expected (e.g., in subframes)

Contention resolution window time: the length of a time period during which a contention resolution message is expected to be received The UE may select PRACH resources corresponding to its CE level and then perform a PRACH transmission in the selected PRACH resources. A PRACH waveform used in MTC is identical to a PRACH waveform used in LTE (e.g., OFDM and Zadoff-Chu sequence). Signals/messages transmitted after the PRACH may also be repeatedly transmitted, and their repetition numbers may be independently set according to CE modes/levels.

NB-IoT Network Access Procedure

A NB-IoT network access procedure will be further described in the context of LTE. The following description may be extended to NR as well. In FIGS. 1 and 11, PSS, SSS, and PBCH are replaced with NPSS, NSSS, and NPBCH in NB-IoT, respectively. For details of the NPSS, the NSSS and the NPBCH, refer to FIG. 10. Further, PDCCH, PDSCH, PUSCH, and PRACH are replaced with NPDCCH, NPDSCH, NPUSCH, and NPRACH, respectively in FIG. 1 and/or FIG. 11.

The NB-IoT random access procedure (or RACH procedure) is basically identical to the LTE random access procedure (or RACH procedure) (e.g., see FIG. 2 and the related description), differing in the following. First, RACH preamble formats are different. In LTE, a preamble is based on a code/sequence (e.g., Zadoff-Chu sequence), whereas in NB-IoT, a preamble is a subcarrier. Second, the NB-IoT random access procedure (or RACH procedure) is performed based on a CE level. Therefore, different PRACH resources are allocated for different CE levels. Third, since SR resource are not configured in NB-IoT, a UL resource allocation request is transmitted in the random access process (or RACH procedure) in NB-IoT.

Figure 12:
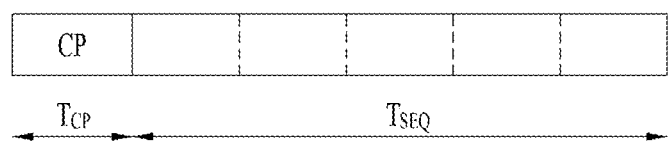
FIG. 12 is a diagram illustrating transmission of a preamble on an NB-IoT random access channel (RACH)
Figure 12:
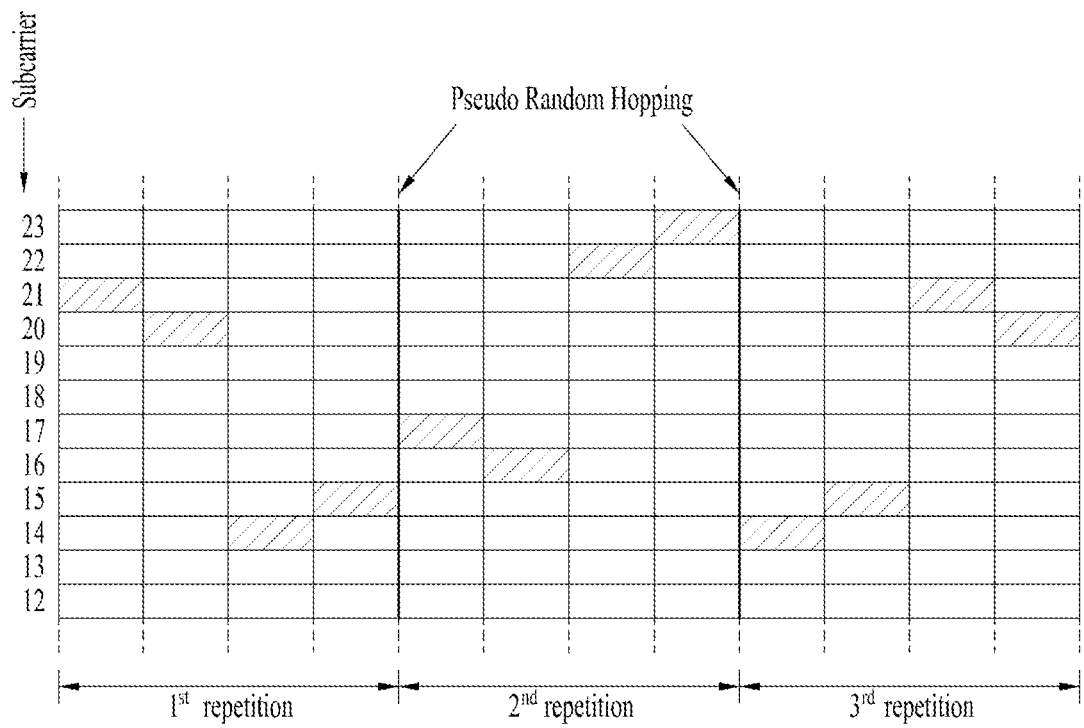

FIG. 12 illustrates preamble transmission on the NB-IoT RACH.

Referring to FIG. 12, an NPRACH preamble includes four symbol groups, each including a CP and a plurality of (e.g., 5) SC-FDMA symbols. In NR, SC-FDMA symbol may be replaced with OFDM symbol or DFT-s-OFDM symbol. For the NPRACH, only single-tone transmission with the 3.75 kHz SCS is supported, and CPs of 66.7 μs and 266.67 μs in length are provided to support different cell radii. Frequency hopping takes place in each symbol group, in the following hopping pattern. Subcarriers carrying the first symbol group are determined pseudo-randomly. 1-subcarrier hop, 6-subcarrier hop, and 1-subcarrier hop take place respectively in the second, third, and fourth symbol groups. In the case of repeated transmissions, the frequency hopping procedure is repeatedly applied, and the NPRACH preamble may be repeatedly transmitted {1, 2, 4, 8, 16, 32, 64, 128} times, for CE. NPRACH resources may be configured on a CE level basis. The UE may select NPRACH resources based on a CE level determined according to a DL measurement result (e.g., RSRP), and transmit the RACH preamble in the selected NPRACH resources. The NPRACH may be transmitted on an anchor carrier, or a non-anchor carrier configured with the NPRACH resources.

F. Proposed Methods of the Present Disclosure

The present disclosure makes proposals in relation to a procedure of reporting a DL signal/channel quality in a random access procedure.

In general, a UE does not measure a channel quality in a random access procedure (or when DCI triggers CFRA in the RRC_CONNECTED state, CQI reporting in Msg3 may be indicated). Therefore, a BS performs DL scheduling in a conservative manner until before an RRC connection is established. A system supporting CE (e.g., MTC and NB-IoT) or a non-bandwidth reduced and low complexity (non-BL) UE (or legacy LTE UE) supporting a CE mode is characterized by repeated transmissions, and thus conservative DL scheduling even in the random access procedure may result in waste of too much resources.

In view of its nature (main services being metering and reporting), a system such as MTC and NB-IoT is expected to be inoperative for long in the RRC connected mode (or RRC_CONNECTED state). Accordingly, reporting downlink (channel) quality information (DQI) as early as possible before the RRC connected mode may be favorable to the network and the UE in terms of resource use efficiency and power saving. In this context, the present disclosure proposes an early DQI reporting method for efficiently helping with DL scheduling of a BS in a random access procedure. To minimize modifications to the legacy random access procedure, the present disclosure relates to a method and procedure for a network to provide, through system information and the Msg2 step, information which is required for a CQI report in Msg3.

Considering that the present disclosure will bring the greatest effect to a system characterized by repeated transmissions such as NB-IoT and MTC (or a BL/CE UE and a CE-mode UE), the present disclosure will be described in the context of NB-IoT and MTC, for convenience. That is, proposed techniques of the present disclosure may also be applied to a system in which repeated transmissions are not performed or a general communication system. Besides, when the proposed methods are operatively almost the same between NB-IoT and MTC, the present disclosure is described mainly in the context of NB-IoT, for convenience. However, the present disclosure is also applicable to a UE requiring a reduced bandwidth, low complexity, or CE (e.g., an MTC UE or a BL/CE UE) and a related system, not limited to NB-IoT.

The above descriptions (of the 3GPP system, the frame structures, the MTC/NB-IoT system, and so on) may be applied in combination with the proposed methods of the present disclosure described below or used to clarify the technical features of the proposed methods of the present disclosure.

Abbreviations
ACK/NACK: Acknowledgement/Negative-Acknowledgement
AL: Aggregation Level
BER: Bit Error Rate
BLER: Block Error Rate
CE: Coverage Enhancement(or Coverage Extension)
BL/CE: Bandwidth reduced Low cost/Coverage Enhanced or Extended
CBRA: Contention Based Random Access
CCE: Control Channel Element
CE: Coverage Extension or Enhancement
CFRA: Contention Free Random Access
CQI: Channel Quality Information
CRS: Common or Cell-specific Reference Signal
CSI: Channel State Information
CSS: Common Search Space
DCA: Downlink Control Information
DMRS: DeModulation Reference Signal
DQI: Downlink (channel) Quality Information
DQI-RS: DQI-Reference reSource
ECCE: Enhanced Control Channel Element
EDT: Early Data Transmission
eMTC: enhanced Machine Type Communication
HARQ: Hybrid Automatic Repeat reQuest
MAC: Medium Access Control
MCS: Modulation and Coding Scheme
MTC: Machine Type Communication
NB: NarrowBand
NRS: Narrowband Reference Signal
PMI: Precoding Matrix indicator
PRB: Physical Resource Block
QAM: Quadrature Amplitude Modulation
R: Repetition number
RAR: Random Access Response
Preconfigured Uplink Resource
RB: Resource Block
RE: Resource Element
RI: Rank Indicator
RLM: Radio Link Monitoring
RRC: Radio Resource Control
RSRP: Reference Signal Received Power
RSRQ: Reference Signal Received Quality
RSSI: Received. Signal Strength Indicator
SIB: System Information Block
SNR: Signal-to-Noise Ratio
SPS: Semi-Persistent Scheduling
TA: Timing Advance
TBS: Transport Block Size
TM: Transmission Mode
UCI: Uplink Control Information
USS: UE-specific Search Space
Random Access Procedure The random access procedure is generally performed in six steps.

(RA-0) A BS (e.g., eNB, gNB, network, or the like) broadcasts (or transmits) information about resources to be used for random access.

The BS broadcasts a configuration of DL resources and UL resources used for a UE (e.g., terminal or the like) to the UE by system information (e.g., see step S12 of FIG. 1 or step S1904 of FIG. 11) during initial network access. After acquiring DL synchronization, the UE checks a random access-related configuration in the broadcast information from the BS and attempts to access by transmitting Msg1 (e.g., see step S13 of FIG. 1 or step S1906 of FIG. 11). Msg1 may also be referred to as a random access preamble, an RACH preamble, or a PRACH preamble.

In the MTC and NB-IoT systems, a different available Msg1 time/frequency/sequence may be defined for the UE according to the CE level of the UE. Besides, resources available in steps (RA-1), (RA-2), (RA-3), and (RA-4) may be configured differently for each CE level. The CE level is determined according to a RSRP threshold broadcast in system information by the BS, and the UE selects a CE level by comparing an RSRP value measured in DL by the UE with the RSRP threshold broadcast by the BS. In MTC, CE modes are additionally defined, including CE Mode A and CE Mode B (e.g., see Table 6 and the related description). Once the UE enters the RRC_CONNECTED state, the BS may configure a CE mode. However, the UE operates on the assumption of CE Mode A for CE levels 0 and 1 and CE Mode B for CE levels 2 and 3 in the initial random access procedure.

(RA-1) The UE Transmits Msg1 to the BS.

The UE first determines its CE level and transmits the preamble (Msg1) (e.g., the random access preamble, the RACH preamble, or the PRACH preamble) in Msg1 resources configured for the CE level (e.g., see step S13 of FIG. 1 or step S1906 of FIG. 11). An RA-RNTI value is defined according to the time/frequency resources in which Msg1 is transmitted, and the Msg1 preamble selected by the UE is used as a random access preamble identifier (RAP-ID).

(RA-2) The BS Transmits a Response to the Detected Msg1 to the UE as Msg2.

Msg2 transmitted by the BS is referred to as a random access response (RAR), and the RAR is included in/transmitted through an (N)PDSCH. The (N)PDSCH is scheduled by an (N)PDCCH or an MPDCCH (e.g., see step S14 of FIG. 1 or step S1908 of FIG. 11). Therefore, the UE monitors the (N)PDCCH or the MPDCCH after transmitting Msg1. Information required for attempting to detect the (N)PDCCH or the MPDCCH, such as information about time/frequency resources (e.g., an NB or an NB-IoT carrier), information about a maximum repetition number, and information about frequency hopping, etc., is obtained from the information broadcast in step (RA-0). Since the (N)PDCCH or the MPDCCH that the UE attempts to detect has been scrambled with the RA-RNTI value in step (RA-1), UEs which have transmitted Msg1 in the same time/frequency resources may detect the same (N)PDCCH or MPDCCH ((N)PDCCH or MPDCCH scrambled with the same RA-RNTI). When the UE successfully detects the (N)PDCCH or MPDCCH, the UE acquires RAR information by detecting an (N)PDSCH indicated by corresponding DCI. The RAR may include information about a plurality of Msg1s which are detected by the BS in step (RA-1), and the plurality of Msg1s are distinguished by RA-RNTIs. That is, the UE searches, in the (N)PDSCH, the RA-RNTI value corresponding to the Msg1 preamble that was used in step (RA-1), and acquires RAR information corresponding to the RA-RNTI. The RAR information includes a configuration for Msg3 to be transmitted in step (RA-3) by the UE and a TA value estimated in step (RA-1). The configuration for Msg3 transmitted in step (RA-3) may be a UL grant. In MTC, the RAR also includes information about the frequency resources (NB) of an MPDCCH to be monitored in step (RA-4).

(RA-3) The UE Transmits Msg3 to the BS as Indicated by Msg2.

The UE transmits an (N)PUSCH in Msg3 as indicated by the UL grant acquired in step (RA-2) (e.g., see step S15 of FIG. 1 or step S1910 of FIG. 11). The UE may include its ID (e.g., an SAE temporary mobile subscriber identity (S-TMSI)) in Msg3, for contention resolution in step (RA-4).

(RA-4) The BS Detects Msg3 and Transmits Msg4 to the UE in Response to Msg3.

The UE attempts to detect Msg4 in response to Msg3 transmitted in step (RA-3) (e.g., see step S16 of FIG. 1 or step S1912 of FIG. 11). As in step (RA-2), the UE attempts to first detect an (N)PDCCH or an MPDCCH. An RNTI used for scrambling the (N)PDCCH or the MPDCCH may be a temporary cell RNTI (TC-RNTI) received in the RAR in step (RA-2). The detected (N)PDCCH or MPDCCH may include a UL grant indicating Msg3 retransmission or may be a DL grant that schedules an (N)PDSCH including a response to Msg3. That is, upon detection of the UL grant, the UE may perform step (RA-3) again as indicated by the UL grant, and upon detection of the DL grant, the UE may detect the (N)PDSCH as indicated by the DL grant and thus check the response to Msg3.

F.1 Measurement Report During Random Access Procedure

The UE may report information regarding DQI to the BS in step (RA-1) or step (RA-3) in the random access procedure, and differently depending on the reporting step. That is, the UE may transmit (or report) Msg1 (a preamble) and/or Msg3 including the information regarding DQI to the BS.

First, in the case of DQI reporting in step (RA-1), different Msg1 resources (time and/or frequency and/or preamble) available to the UE may be configured according to DQI in step (RA-0). That is, the resources of Msg1 transmitted by the UE may first be selected according to the CE level, and then resources of a level corresponding to the DQI among one or more levels subdivided according to DQIs from the corresponding resources may be configured. In other words, the resources of Msg1 transmitted by the UE may be configured in 2 steps (according to a CE level in the first step and then according to DQI in the second step). The DQI included in Msg1 represents high or low relative to a specific value among various DQI levels proposed below, and an offset level of the DQI based on the corresponding value may be transmitted to the BS in Msg3 or in other resources at another time.

This is because the CE level selected by the UE is set only based on an RSRP, the CE level may represent only information about a signal strength. For example, it may occur that despite a high signal strength, a signal/channel quality may be low due to interference between adjacent cells and a high spatial correlation between multiple antennas of the BS. This means that even when the CE level is low (the RSRP is relatively high), the UE may have poor (N)PDCCH/MPDCCH or (N)PDSCH reception performance in step (RA-2) or step (RA-4). That is, since the reception performance of the UE is more closely related to the signal/channel quality than the signal strength, the resources of Msg1 may further be classified according to a DL channel within the same CE level, for the purpose of notifying the signal/channel quality to the BS in advance. The BS may efficiently perform DL scheduling by acquiring the channel quality information from the detected resources of Msg1.

In another method, the UE may provide DQI in step (RA-3) so that the BS may use the DQI for DL scheduling in step (RA-4). Other methods may be considered according to the type of a random access procedure.

The methods will be described below in greater detail.

F.1.1 Measurement Report During Contention-Based Random Access (CBRA) Procedure

As described above, the UE may report DQI in step (RA-3), and the DQI may be related to the reception performance of the (N)PDCCH/MPDCCH and/or the reception performance of the (N)PDSCH in step (RA-4).

That is, the reported DQI may include the following information. The following information is only classified for the convenience of description, and the DQI may include all or part of the following information.

(1) Reference Signal Received Quality (RSRQ)

An RSRQ is a value representing the channel quality of an actual DL RS, as a reference metric that may be directly or indirectly used for DL scheduling of a BS. Unlike a general CQI, an RSRQ does not require a configuration such as a specific reference MCS, PMI, or RI. Therefore, the RSRQ may be obtained with lower complexity than CQI estimation, and after receiving the DQI, the BS does not request a constraint related to a transmission mode (TM) to be used for DL scheduling to the UE. The RSRQ may be used as a more suitable DQI, particularly in a situation in which the reference MCS and PMI are not configured in the random access procedure.

A. RSRQ value of (NB-IoT) carrier or narrowband (NB) in which Msg2 has been received.

A one-level difference between reported logical values may be a value obtained by dividing an RSRQ range unequally.

i. Average RSRQ of hopped frequency, when Msg2 hops in frequency (e.g. NB).

ii. Or an RSRQ value measured in specific frequency resources (center 6 RBs carrying a PSS/SSS, a frequency resource with the lowest/highest of the indexes of frequency hopping resources, or a value indicated in step (RA-0)).

The frequency resources may also be applied when the DQI includes not an RSRQ bus information about the reception performance of a specific channel (e.g., the (N)PDCCH/MPDCCH or the (N)PDSCH) (e.g., a condition for satisfying a specific block error rate (BLER), such as a repetition number or an aggregation level (AL)).

iii. Or information about a frequency resource with the highest RSRQ or the RSRQ of each frequency resource iv. Or the RSRQ of frequency resources to be used for (N)PDCCH/MPDCCH monitoring in step (RA-4)

v. Or the RSRQ of frequency resources to be used for (N)PDSCH reception in step (RA-4)

vi. Or the RSRQ of a frequency resource overlapped between frequency resources used for (N)PDCCH/MPDCCH monitoring and frequency resources used for Msg2 reception in step (RA-4)

vii. Or the RSRQ of a frequency resource overlapped between frequency resources used for (N)PDSCH reception in step (RA-4) and frequency resources used for Msg2 reception viii. The RSRQ of each frequency resource (e.g., NB) is derived from an RSRP and a received signal strength indicator (RSSI). The RSSI may be the average of the RSSIs of specific frequency resources or acquired frequency resources, and the RSRP may be the RSRP of each frequency resource. On the contrary, on the assumption that RSSI information including noise and interference may be different for each frequency resource, the RSSI may be the RSSI of each frequency resource.

(2) Information about (N)PDCCH, MPDCCH, or (N)PDSCH Reception in Msg2

A. The repetition number R and/or AL of the (N)PDCCH/MPDCCH or the (N)PDSCH when the (N)PDCCH/MPDCCH or the (N)PDSCH has been successfully received.

A maximum repetition number Rmax of the (N)PDCCH/MPDCCH or the (N)PDSCH is obtained in step (RA-0), and the UE may successfully detect the (N)PDCCH/MPDCCH or the (N)PDSCH with a repetition number R less than the maximum repetition number Rmax. Therefore, the repetition number R may be used to represent the DQI of the UE. When aggregation is applied (to the (N)PDCCH/MPDCCH), information about an AL at which the (N)PDCCH/MPDCCH has been successfully received and detected may also be used. According to the number of bits used for a quality report (e.g., the repetition number R and/or the AL) in Msg3, a reporting range and/or the representation unit of the reported repetition number R and/or AL may be configured differently.

i. The lower bound of the representation range may be set to a specific value X, not 1. This is because a value lower than X means that the channel quality is already sufficiently good, and thus more detailed information may not be required. In other words, when the actual R value is less than X, a logical value mapped to the lower bound (or a minimum value except for a value reserved to maintain backward compatibility with the legacy system) may be reported.

ii. The upper bound of the representation range may be limited to aR (an actual repetition number that the BS has used for the (N)PDCCH/MPDCCH or (N)PDSCH transmission, which may be less than or equal to Rmax and indicated by DCI). Alternatively, the upper bound of the representation range may be limited to Rmax or a value that is K times (e.g., twice) larger than Rmax. The reason for allowing a value greater than Rmax is that a repetition number available for scheduling of the (N)PDCCH/MPDCCH or (N)PDSCH in Msg4 (e.g., the maximum repetition number Rmax) may be different from a repetition number for Msg2.

iii. Representation units may not be uniformly set within the allowed representation range. That is, the unit/interval of R and/or an AL represented by one unit in a low range of reported logical values may be different from the unit/interval of R and/or an AL represented by one unit in a high range of reported logical values. This is because an inaccurate value (quantization error) at a low R value and/or AL has no significant effect on scheduling in step RA-4, but a one-step difference at a high R value and/or AL may lead to a very different repetition number applied to actual DL scheduling in step (RA-4).

The above proposed DQI representation may be applied to and cover all of the cases proposed below in which an R value or an AL is included in the DQI. Further, when an R value or an AL is selectively included in the DQI, it is necessary to define a reference AL and a reference R value to obtain an R value and an AL, respectively. That is, there may be a need for a reference AL that the UE may assume in deriving an R value satisfying a specific performance requirement for the (N)PDCCH/MPDCCH. Likewise, in the case of deriving an AL, a reference R value that may be assumed by the UE may be required. Each of the reference AL and R values may be derived from the maximum repetition number Rmax of the Msg2 MPDCCH, configured independently by the BS, or derived from the AL and/and R values actually applied to the Msg2 MPDCCH transmission. For example, the DQI may selectively include an AL. In a more specific example, when the R value satisfies a specific performance requirement, the DQI may include the AL together with the R value. In another example, when R is a value (e.g., 1) that satisfies a specific performance requirement, the DQI information includes the R value without the AL, and the reference AL (e.g., 24) may be assumed as the AL. In this example, when the repetition number R of the (N)PDCCH/MPDCCH or (N)PDSCH at the time of successful reception of the (N)PDCCH/MPDCCH or (N)PDSCH satisfies a specific performance requirement (e.g., 1), the reference AL may be derived from R (e.g., 1).

The DQI is reported as the repetition number R and/or AL of the (N)PDCCH/MPDCCH or (N)PDSCH which the UE has successfully received in Msg2, because the value of R is too small to calculate a CQI on the assumption of an RSRQ and a channel in a specific format (e.g., (N)PDCCH, MPDCCH, or PDSCH), and thus an RS should be received for an additional time to measure an RSRQ or a CQI. That is, when the UE has succeeded in receiving and detecting Msg2 in time resources less than a specific value (configured by the BS or defined in the standard), reporting indirectly to the BS that the DL channel quality is sufficiently good rather than measuring an RSRQ or a CQI may be profitable in terms of power saving. To this end, the BS may reserve specific DQI value(s) to be received for such a report. That is, when the R value and/or the AL is sufficiently small, the UE may selectively report an R value and/or an AL from among the reserved states. When the reserved states are not defined separately, a specific DQI value (a value indicating a good channel quality) may be reported.

(3) Information about Reception Performance of (N)PDCCH/MPDCCH in Msg4

A. The UE may acquire frequency resources (e.g., an (NB-IoT) carrier or NB) available or likely to be used in step (RA-0) and/or step (RA-4). After all, since the first step in which the DQI transmitted in Msg3 may be used is to schedule the (N)PDCCH/MPDCCH for step (RA-4), the DQI of the frequency resources that may be used in step (RA-4) may be preferably reported. However, accurate information about frequency resources to be used for MPDCCH monitoring in step (RA-4) may be indicated by the RAR of the Msg2 PDSCH in a system such as MTC, the remaining time until the Msg3 transmission after acquisition of the accurate information may not be sufficient for calculating the DQI of the frequency resources. Therefore, the following methods may be considered.

i. The DQI of each frequency resource likely to be used in step (RA-4) may be calculated based on the information acquired in step (RA-0), and only DQI corresponding to the information acquired from the RAR (e.g., a frequency resource to be monitored in step (RA-4)) may be reported.

ii. If frequency hopping is applied, frequency resources that have been used for hopping before a time X from the Msg3 transmission may be excluded from DQI measurement and reporting. Alternatively, when X is less than a specific value, DQI reporting may be skipped, or the maximum of reportable DQI values may be limited to a specific value according to X.

iii. Msg2 includes the (N)PDCCH/MPDCCH and the (N)PDSCH. DQI reference resources used for DQI measurement may be limited to the (N)PDCCH/MPDCCH, and further to resources within a time Y at the start of the (N)PDCCH/MPDCCH transmission (or at the start of a configured Msg2 monitoring period). This may be done to lower the processing power of the UE as much as possible. Alternatively, if the processing power of the UE is sufficient, even though the UE has succeeded in detecting the (N)PDCCH/MPDCCH before Rmax, the UE may be configured to additionally receive a longer period/more resources (less than Rmax) and measure DQI. Further, a time/frequency in which the (N)PDSCH is received may also be included in the DQI reference resources (a hypothetical resource that may be used for DQI measurement or transmission of a channel related to the DQI). Particularly in a situation where although the Msg2 (N)PDCCH/MPDCCH frequency resources are not fully included in the Msg4 (N)PDCCH/MPDCCH frequency resources, the (N)PDSCH frequency resources may be partially included in the Msg4 (N)PDCCH/MPDCCH resources, the need for the DQI reference resource extension (to include even the (N)PDSCH resources) may be pressing.

B. As in the above proposal, channel quality information measured in multiple frequency resources may be reported in the following methods.

i. The channel quality information may all be reported on a frequency resource basis.

ii. Alternatively, the average or representative value of the measured values of the respective frequency resources may be reported as the channel quality information. (An RSSI may be an average value, whereas an RSRP may be measured independently on an NB basis. When an RSRQ or reception performance-related information is reported, noise information may be calculated based on the average value, and quality information may be calculated based on the value measured on an NB basis.)

iii. Or DQI differences (e.g., expressed as delta values or offsets from the average or representative value) together with the average or representative value of the measured values of the respective frequency resources may be reported for the remaining or all frequency resources.

iv. Or DQI difference of a specific frequency resource (e.g., expressed as a delta value or offset from the average or representative value) among DQI reference resources, together with the average or representative value of the measured values of the respective frequency resources may be reported for the remaining or all frequency resources.

v. Or only DQI corresponding to the information acquired from the RAR (frequency resources to be monitored in step (RA-4) or a specific frequency resource indicated for reporting by the standard or system information (e.g., an anchor carrier, center 6 RBs carrying a PSS/SSS, frequency resources used for Msg2, or a frequency resource closest to the frequency resources used for Msg2 among frequency resources to be used for Msg4) may be reported.

vi. Or the average value of the measured values of the respective frequency resources may be reported.

vii. Or among the measured values of the respective frequency resources, the channel qualities and indexes of the best N frequency resources may be reported (N may be configured by system information or indicated by Msg2).

viii. Or among the measured values of the respective frequency resources, the channel qualities and indexes of the poorest N frequency resources may be reported (N may be configured by system information or indicated by Msg2).

C. Based on the information acquired before step (RA-3) process, the following may be performed.

i. The channel quality information measured as in the above proposal may include a (UE-preferred) minimum R value and/or a minimum AL from which a BLER of Z % (e.g., 1%) may be expected with respect to a specific reference DCI format (e.g., the DCI format of the (N)PDCCH/MPDCCCH expected in Msg4) and/or port information about an RS (e.g., DMRS) and/or a resource allocation type (e.g., distributed or localized) and/or an (N)CCE/ECCE index. For the reference DCI format, assumption of a specific DMRS port may be allowed.

ii. When the (UE-preferred) R value of the Msg4 (N)PDCCH/MPDCCH in step (RA-4) is reported, R may be represented as information about a ratio to Rmax to be used in step (RA-4), which has been obtained before step (RA-3). That is, in regards to the logical value range of reported DQI, an actual R value may be interpreted differently according to Rmax to be used in step (RA-4), which has been obtained in step (RA-3). In the above proposal, the units of the logical values may not be uniformly distributed in an actual representation range of R.

Similarly to the description in (2), when a repetition number R or an AL is selectively included in DQI, it is necessary to define a reference AL and a reference R value in obtaining the R value and the AL, respectively. That is, a reference AL value that may be assumed by the UE may be required in deriving an R value that satisfies a specific performance requirement for the (N)PDCCH/MPDCCH. Likewise, a reference R value that may be assumed by the UE may be required in deriving an AL. Each of the reference AL and R values may be derived from Rmax of the Msg2 MPDCCH, configured independently by the BS, or derived from an AL and/or an R value actually applied to the Msg2 MPDCCH transmission. For example, the DQI may selectively include an AL. In a more specific example, when R is a value (e.g., 1) that satisfies a specific performance requirement, the DQI may include an AL together with an R value. In another example, when R is a value (e.g., 1) that satisfies a specific performance requirement, the DQI may include an R value without an AL, and the reference AL (e.g., 24) may be assumed as the AL. In this example, if R of the (N)PDCCH/MPDCCH or the (N)PDSCH at the time of successfully receiving the (N)PDCCH/MPDCCH or the (N)PDSCH at the UE is a value (e.g., 1) satisfying a specific performance requirement, the reference AL may be derived from the R value (e.g., 1).

(4) Information about Reception Performance of N(PDSCH) in Msg4

A. In step (RA-0), the UE may acquire frequency resources (e.g., an (NB-IoT) carrier or NB) available or likely to be used in step (RA-4). In MTC, a frequency resource, NB in which the Msg4 PDSCH may be scheduled within the LTE system bandwidth is indicated by the Msg4 MPDCCH. In both NB-IoT and MTC, because (N)PDSCH scheduling information (e.g., an MCS, a TBS, resource allocation, and a repetition number) is indicated by a DL grant, the DQI transmitted in Msg3 may also be used in the Msg4 (N)PDSCH scheduling. Accordingly, the DQI transmitted in Msg3 may include the following information.

i. The DQI of each frequency resource likely to be used in step (RA-4) may be calculated based on the information acquired in step (RA-0), and when additional information (e.g., a frequency resource to be monitored in step (RA-4)) is acquired from the RAR, only the DQI of the frequency resource may be reported.

ii. If frequency hopping is applied, frequency resources that have been used for hopping before a time X from the Msg3 transmission may be excluded from DQI measurement and reporting. Alternatively, when X is less than a specific value, DQI reporting may be skipped, or the maximum of reportable DQI values may be limited to a specific value according to X.

iii. Msg2 includes the (N)PDCCH/MPDCCH and the (N)PDSCH. DQI reference resources used for DQI measurement may be limited to the (N)PDCCH/MPDCCH, and further to resources within a time Y at the start of the (N)PDCCH/MPDCCH transmission (or at the start of a configured Msg2 monitoring period). This may be done to lower the processing power of the UE as much as possible. Alternatively, if the processing power of the UE is sufficient, even though the UE has succeeded in detecting the (N)PDCCH/MPDCCH before Rmax, the UE may be configured to additionally receive a longer period/more resources (less than Rmax) and measure DQI. Further, a time/frequency in which the (N)PDSCH is received may also be included in the DQI reference resources. Particularly when the Msg2 (N)PDCCH/MPDCCH frequency resources do not hop or only frequency resources less than a specific ratio to the LTE system bandwidth are used, the need for the DQI reference resource extension (to include even the (N)PDSCH resources) may be pressing.

B. As in the above proposal, channel quality information measured in multiple frequency resources may be reported in the following methods.

i. The channel quality information may all be reported on a frequency resource basis.

ii. Alternatively, the average or representative value of the measured values of the respective frequency resources may be reported as the channel quality information. (An RSSI may be an average value, whereas an RSRP may be measured independently on an NB basis. When an RSRQ or reception performance-related information is reported, noise information may be calculated based on the average value, and quality information may be calculated based on the value measured on an NB basis.)

iii. Or DQI differences (e.g., expressed as delta values or offsets from the average or representative value) together with the average or representative value of the measured values of the respective frequency resources may be reported for the remaining or all frequency resources.

iv. Or only DQI corresponding to the information acquired from the RAR (frequency resources to be monitored in step (RA-4) or a specific frequency resource indicated for reporting by the standard or system information (e.g., an anchor carrier, center 6 RBs carrying a PSS/SSS, frequency resources used for Msg2, or a frequency resource closest to the frequency resources used for Msg2 among frequency resources to be used for Msg4) may be reported.

v. Or the average value of the measured values of the respective frequency resources may be reported.

vi. Or among the measured values of the respective frequency resources, the channel qualities and indexes of the best N frequency resources may be reported (N may be configured by system information or indicated by Msg2).

vii. Or among the measured values of the respective frequency resources, the channel qualities and indexes of the poorest N frequency resources may be reported (N may be configured by system information or indicated by Msg2).

C. Based on the information acquired before step (RA-3), the following may be performed.

i. The channel quality information measured as in the above proposal may include a minimum repetition number R (UE-preferred) and/or a minimum AL and/or RS (e.g., CRS or DMRS) port information and/or a resource allocation type (e.g., distributed or localized) and/or a PMI and/or frequency resource information (e.g., an NB or RB index requiring the smallest amount of resources (i.e., a small repetition number R and/or a low AL), from which a BLER of Z % (e.g., 1%) may be expected with respect to a specific reference format (e.g., a TBS and/or an MSC and/or a repetition number and/or a DMRS port of the (N)PDCCH/MPDCCCH expected in Msg4, which may be predefined in the standard or configured by system information or Msg2). When the specific reference format is not designated or information corresponding to a CQI, such as an MCS is not specified for the reference format, a CQI and/or an RI may be included in the DQI.

1. When a CQI is estimated based on channel information estimated from the CRS, precoding information (e.g., the correlation between the CRS and the DMRS, such as DMRS port information or a PMI) that the UE will assume may be given in advance.

ii. When the (UE-preferred) R value of the Msg4 (N)PDCCH/MPDCCH of step (RA-4) is reported, R may be represented as information about a ratio to the maximum repetition number Rmax to be used in step (RA-4), which has been obtained before step (RA-3). That is, in regards to the logical value range of reported DQI, an actual R value may be interpreted differently according to Rmax to be used in step (RA-4), which has been obtained in step (RA-3). In the above proposal, the units of the logical values may not be uniformly distributed in an actual representation range of R.

D. In the above proposal, when the DQI includes information related to (N)PDSCH reception performance, the UE may estimate the DQI, assuming a specific TM. For example, the UE may always assume a fallback TM (e.g., TM1 or TM2) as the TM used in the random access procedure or may derive a fallback TM or a reference TM according to the number of transmission (Tx) antennas (e.g., the number of CRS antenna ports) of the BS. Then, the UE may measure the DQI based on the TM. Further, the BS may directly indicate a reference TM available for DQI measurement.

In the above proposal, when the UE fails in receiving the response (Msg4) to Msg3 or retransmits Msg3, the DQI may be treated as follows.

(1) When Msg3 is retransmitted, the following operations may be performed.

A. When the DQI is channel-encoded together with data of Msg3 in the physical layer, the DQI used in the previous transmission is continuously transmitted.

B. When the DQI is channel-encoded (e.g., in the form of UCI) independently of the data of Msg3 in the physical layer, the DQI used in the previous transmission may be maintained or updated. When the DQI is updated, reporting of a value equal to or less than the previous reported DQI may not be allowed (e.g., when a DL channel state is better with a lower DQI).

(2) When retransmission starts from Msg1, the following operations may be performed A. When the time resources (the maximum repetition number Rmax for Msg2 or Msg4) and/or frequency resources (e.g., (NB-IoT) carrier or NB) of Msg2 and/or Msg4 associated with Msg1 used in the retransmission are changed, DQI may be newly measured.

B. Otherwise, reporting of a value equal to or less than the previous reported DQI may not be allowed. Further, reporting of a value equal to or larger than the previous reported DQI without DQI re-measurement may be allowed (e.g., when a DL channel state is poorer with a higher DQI).

In all of the above proposals, when a repetition number R and an AL are used as values representing DQI, the DQI may include the repetition number R and the AL, separately, in combination, or as modified in a similar concept of a code rate.

In the proposals, the MPDCCHs transmitted in Msg2 and Msg4 are transmitted through DMRS ports, not CRS ports in MTC. In this case, the UE has difficulty in predicting MPDCCH performance using the CRS. That is, it may be difficult to derive, from the CRS, a specific condition that an MPDCCH decoding failure probability is equal to or less than a specific value. Then, a reference channel from which performance is derived may be defined as a channel other than the MPDCCH, while DQI measurement based on the CRS is allowed. For example, a reference channel used for RLM (e.g., a PDCCH format based on which out-of-sync is checked or a PDCCH format based on which in-sync is checked), a third PDCCH format, or a PDSCH format based on the assumption of a specific TM may be defined, and information based on the CRS, from which reception performance may be predicted based on the above-enumerated channel may be defined as DQI. The TM may be given as TM1 or TM2 according to the number of CRS ports.

F.1.2 Measurement Report During Contention-Free Random Access (CFRA) Procedure

To report DQI in a CFRA procedure, all of the methods proposed in section G.1.1 (Measurement Report During Contention-Based Random Access (CBRA) Procedure') may be applied. CFRA is for a case in which a BS has allocated resources of Msg1 (e.g., time and/or frequency and/or preamble resources for Msg1) UE-specifically to a UE. For example, CFRA takes place mainly for updating TA information about a UE in the RRC_CONNECTED state. That is, when DL scheduling is required for the UE in a situation the BS has not received a UL transmission from the UE for a specific time or longer or has not performed UL scheduling, CFRA may be used to update a UL TA and thus reduce performance degradation caused by timing misalignment in reception of a feedback (e.g., ACK/NACK) and/or CSI for a later-scheduled DL transmission on a PUCCH and/or an (N)PUSCH. This means that the BS plans to perform DL scheduling for the UE after the CFRA procedure, and reception of DQI in Msg3 even in the CFRA procedure at the BS may help to minimize the performance degradation of later DL scheduling.

However, the CFRA procedure may be different from the CBRA procedure in that DQI reference resources may be added or redefined because the UE has already registered to the cell and acquired UE-dedicated information additionally by an RRC message. For example, the BS may additionally configure reference resources (e.g., different from DQI reference resources used in CBRA) in which the UE will measure DQI to be reported, for the UE in the random access procedure. The DQI reference resources may be configured by RRC signaling or DCI triggering Msg1. Alternatively, specific resources of DQI reference resource set configured by RRC signaling may be indicated as the DQI reference resources by DCI. In this case, the DQI may be reported in Msg3 (or the first (N)PUSCH transmitted after Msg2) in the form of UCI, not a MAC message.

When the DQI includes information related to (N)PDSCH reception performance, the UE may estimate the DQI by assuming a specific TM. For example, the UE may always assume a fallback TM (e.g., TM1 or TM2) as the TM for the random access procedure or derive a fallback TM or a reference TM according to the number of Tx antennas (for example, the number of CRS antenna ports) of the BS, to measure the DQI based on the TM. Further, the BS may directly indicate a reference TM available for DQI measurement to the UE, or the UE may measure the DQI by assuming a TM used in the RRC_CONNECTED state.

The reference TM referred to in the process of deriving DQI in the CBRA and CFRA procedures may be specifically defined according to the number of CRS ports of the BS as follows.

If the number of CRS ports is one, TM1 is assumed as the reference TM.

Otherwise, TM2 is assumed as the reference TM.

F.2 Measurement Report for UL Semi-Persistent Scheduling (SPS)

The BS may configure UL SPS to reduce resources required for UL scheduling of the UE. Because a UL grant for UL scheduling is not transmitted each time, UL SPS may also be effective in reducing power that the UE uses for DL monitoring. UL SPS is a technique of preconfiguring multiple time-domain UL resources for a UE so that the UE may transmit data in the UL SPS resources by its own decision without dynamic UL scheduling of a BS. UL SPS may be similar to SPS already defined in the legacy LTE system or other systems, and independent of the RRC states. That is, in the present proposal, UL SPS refers to a communication procedure and method in which a UE is allowed to perform a UL transmission without the need for UL scheduling of a BS each time.

However, when UL SPS activation/deactivation is supported by DCI or when there may be an HARQ feedback for UL SPS, the UE still needs to receive a DL signal or channel (e.g., (N)PDCCH, MPDCCH, (N)PDSCH, wake-up signal (WUS), or the like). As such, the BS may need to transmit a specific channel to the UE even in the UL SPS situation. For link adaptation, all of the methods proposed in section F.1.1 ('Measurement Report during Contention-Based Random Access (CBRA) Procedure') and section F.1.2 ('Measurement Report during Contention-Free Random Access (CFRA) Procedure') may be used.

However, because UL SPS time/frequency resources may be different from time/frequency resources to be used for Msg2 and/or Msg4 in the general random access procedure (e.g., DL resources to be used for a DL feedback for a UL SPS reception at the BS (i.e., DL resources to be monitored by the UE) may be independent of Msg2/Msg4 of the random access procedure), DQI reference resources for UL SPS may be configured independently. The DQI reference resources for UL SPS may be directly defined in the standard, configured by system information or an RRC message, directly indicated by a channel (e.g., DCI) for activating/deactivating UL SPS, or a channel for HARQ feedback (e.g., (N)PDCCH or WIPDC CH).

Further, DQI reported in the UL SPS procedure may differ from DQI reported in the random access procedure, in terms of definition or a representation range. The DL channel (e.g., specific DCI) used for UL SPS activation/deactivation and/or HARQ feedback may be different from a DL channel (e.g., DCI with a type-2 common search space (CSS)) carrying Msg2 and/or Msg4 in the random access procedure. Herein, DQI may be measured with a DL channel defined for UL SPS as a reference (or reference channel), and then reported.

F.3 Measurement Report According to Receiver Type of UE

When the UE reports DQI during random access, a channel quality may be differently defined according to the receiver type of the UE. The receiver type of the UE may be one of receiver types defined to satisfy a specific performance requirement in the standard. In LTE, for example, the receiver types may include maximal ratio combining (MRC), minimum mean square error-interference rejection and combining (MMSE-IRC), enhanced MMSE-IRC (eMMSE-IRC), maximum likelihood (ML), and successive interference cancellation (SIC). The BS needs to know these receiver types to avoid unnecessary resource waste by predicting the reception performance of the UE in advance during DL scheduling of the BS. Further, the BS needs to know these receiver types because it needs to provide additional information to the UE according to the receiver type of the UE in some cases.

(1) When the UE uses multiple Rx antennas, the UE may report DQI in consideration of the multiple Rx antennas. Information about the multiple Rx antennas of the UE (e.g., information indicating whether an actual number of Rx antennas is indicated or a single reception antenna is assumed) together with the DQI may be included in a measurement report.

(2) The DQI reported by the UE may be derived based on the assumption of a single Rx antenna. When an additional Rx antenna is available for the UE (i.e., multiple Rx antennas), it may be additionally reported. For example, the Rx antenna information may be a representation of an additional gain (e.g., an RSRQ gain, an SNR gain, or reduction of a repetition number expected to receive Msg2 and Msg4 under a specific detection performance requirement (e.g., BLER)) which may be obtained when the multiple Rx antennas are used, or an indication simply indicating that the multiple Rx antennas may be used in Msg2 and/or Msg4.

F.4 Conditions For Not Expecting DL Channel Quality Measurement

The proposed DQI measurement information may be used for DL scheduling and resource allocation (a code rate, a repetition number, and so on) of the BS. Although an additional operation is required for DQI measurement of a low-cost UE, the DQI measurement information may advantageously prevent the loss of power saving, caused by wrong link adaptation of the BS and hence DL reception signal detection failure (e.g., due to too small a repetition number) of the UE. However, when the maximum repetition number of Msg4 is initially smaller than a specific value, link adaptation may not be important, and thus DQI measurement may be skipped to save power of the UE. On the contrary, when the maximum repetition number of Msg4 is set to be larger than the specific value or the RSRP or SNR of the UE is very low (e.g., when the UE has a high CE level or the highest of CE levels configured in the cell), the accuracy of the DQI measurement information of the UE may be very low. Accordingly, there may be a certain condition for not measuring or reporting DQI to prevent unnecessary or meaningless power consumption of the UE, as follows.

(1) The maximum repetition number of the (N)PDCCH/MPDCCH or (N)PDSCH of Msg4 is less than a specific value.

(2) The maximum repetition number of the (N)PDCCH/MPDCCH or (N)PDSCH of Msg4 is larger than a specific value.

(3) The UE successfully receives Msg2 ((N)PDCCH/MPDCCH or (N)PDSCH) with a specific number of or fewer repetitions.

In the above conditions, each specific value may be defined in the standard or may be information broadcast by the BS.

Alternatively, when an Msg3 transmission time indicated by Msg2 is not sufficient for DQI measurement, the UE may be allowed to skip DQI measurement and reporting or to report a specific value (e.g., a value indicating a poorest DL channel quality) as DQI. Herein, the "time that is not sufficient for DQI measurement" may be a relative time interval between Msg2 and Msg3, and may be defined as a UE capability.

F.5 DL Channel Quality and Method of Reporting the DL Channel Quality, When Random Access is Used for Special Purpose When the UE attempts the random access procedure for mobile oriented early data transmission (MO-EDT) (for transmitting UL data during the random access procedure), an information size required for DQI reporting may not be considered in selecting a TBS for Msg3 transmission. When the smallest of TBSs allowed for the UE to use for Msg3 (TBSs larger than the size of data/information that the UE wants to transmit in Msg3) is large enough to cover a size required to report DQI, except for the size of the data/information that the UE actually wants to transmit in Msg3, the UE may additionally include and transmit the DQI in Msg3.

When the BS performs mobile terminated early data transmission (MT-EDT for transmitting DL data during the random access procedure) after the UE starts the random access procedure, the UE may be requested to report DQI on UL even after Msg3 and/or Msg4. This is because in the case of EDT, the UE may complete data transmission/reception with the BS in the RRC_IDLE state without entering the RRC_CONNECTED state and thus may not acquire detailed information for DL measurement as freely as in the RRC_CONNECTED state. That is, the UE may measure and report only DQI at a level allowed for random access, from the viewpoint of DQI measurement. However, it may be configured that DQI to be reported after Msg4 is measured in resources different from DQI reference resources used for DQI reporting in Msg3 in the proposed general random access procedure.

F.6 Reference Resources for DL Channel Quality Information

Figure 13:
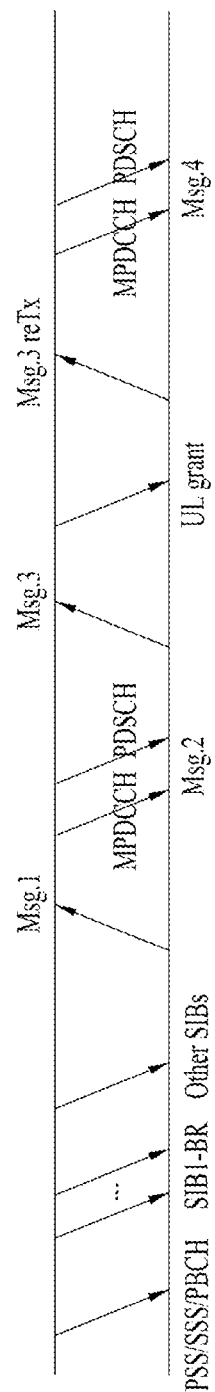
FIG. 13 is a diagram illustrating a time flow of channels and signals transmitted/received by a user equipment (UE) in a random access procedure.

FIG. 13 illustrates a time flow of transmissions and receptions of channels and signals until Msg4 reception at the UE in the random access procedure, and the resource relationship of the channels/signals will be described in terms of frequency. FIG. 13 is based on eMTC, and may correspond to the example of FIG. 1 or FIG. 11. In FIG. 13, a UL grant that the UE receives after Msg3 transmission is scheduling information for Msg3 retransmission, using the same format as the Msg3/4 MPDCCH. In NB-IoT, the NPSS/NSSS/NPBCH is transmitted on an anchor carrier, and SIBs may be transmitted on the anchor carrier in FDD and on an anchor carrier or a non-anchor carrier according to NPBCH information in TDD (e.g., see "D. Narrowband Internet of Things (NB-IoT)"). The Msg2 NPDCCH and NPDSCH, the Msg3/4 NPDSCH, and the Msg4 NPDSCH are all transmitted on the same NB-IoT carrier, which may be an anchor carrier or a non-anchor carrier. In MTC, the DL resource relationship in the frequency domain is more complex, and may be summarized as follows.

PSS/SSS/PBCH

Center 6 RBs of LTE system bandwidth

SIB1-BR

SIB1-BR is transmitted in RBs distributed across the LTE system bandwidth, and the position of a used NB/RB may be different depending on the DL bandwidth and the cell ID.

Other SIBs

The position of an NB/RB is determined according to scheduling information for the SI of SIB1-BR.

MPDCCH of Msg2

It is determined according to information configured in an SIB and a preamble index used for Msg1 transmission, and frequency hopping may be applied according to rar-HoppingConfig.

PDSCH of Msg2

It is indicated by the MPDCCH of Msg2, and frequency hopping may be applied according to rar-HoppingConfig MPDCCH of Msg3/4

It may be transmitted in an NB identical to the MPDCCH NB of Msg2 or an NB shifted from the MPDCCH NB of Msg2 by a specific offset value, and the offset value may be indicated by the UL grant of the RAR.

PDSCH of Msg4

It is indicated by the MPDCCH of Msg4 and frequency hopping may be applied according to rar-HoppingConfig.

As described above, the DL frequency resources used before Msg4 reception are defined in a complex relationship in the MTC system. In some cases, Msg4 DL frequency resources to which DQI may be applied first may be resources that the UE does not need to receive (according to the legacy random access procedure). That is, it may be determined whether the corresponding information may be effectively used for Msg4 scheduling according to how DQI reference resources are defined. In consideration of the above, this section proposes DQI-reference resources (DQI-RS). The proposed method may all be applied unless contradicting with other proposals described in the present disclosure.

The DQI-RS needs to be selected from among resources which may represent the channel quality of resources scheduled for transmission of the Msg3/4 MPDCCH and/or (N)PDSCH and which the UE may receive before transmitting Msg3. When Msg3/4 MPDCCH resources are the same as Msg2 reception resources, the DQI-RS may be defined as part or all of the Msg2 MPDCCH/NPDCCH resources. The following is a method of selecting a DQI-RS, when Msg2 MPDCCH/NPDCCH resources are expected to be different from Msg3/4 MPDCCH/NPDCCH and/or (N)PDSCH resources.

MTC

The center 6 RBs and/or an NB carrying system information and/or an NB carrying the Msg2 PDSCH may be additionally included in the DQI RS.

It may be determined whether an additional DQI RS is actually applied, according to whether frequency hopping is applied to the Msg2 MPDCCH and/or the Msg2 PDSCH.

According to the above method, the DQI RS is basically resources that an MTC UE may expect to receive before Msg3 transmission. When the DQI-RS is selected in this manner, the UE may not need to perform an additional reception operation for DQI measurement.

NB-IoT

RRC_IDLE state (1) The BS may configure N (NB-IoT) carrier sets for the UE. The UE may randomly select a carrier from among the N carrier sets, measure the CQI of the carrier, and report the CQI. Alternatively, the UE may report the average and/or worst and/or best DQI of the N carrier sets.

The CQI may include information about a preferred carrier and/or repetition.

To avoid ambiguity about the CQI states of an existing early CQI report, the above method may be applied only to the DL CQI of a non-anchor carrier.

When the worst DQI and/or the best DQI is included, information about the carrier in which the DQI has been measured may be additionally reported, and directly included in the DQI value.

(2) Method of randomly selecting DQI reference carrier

The DQI reference carrier may be select based on a UE ID, the earliest receivable DQI-RS may be selected, or a carrier with a small/large Msg2 NPDCCH maximum repetition number may be selected first.

For two or more DQI-RS within a specific time, a DQI-RS carrier is selected based on the UE ID.

(3) When the UE acquires DQI for two or more DQI-RS carriers, the DQI-RS carriers may be prioritized as follows, for DQI reporting.

The best DQI, the DQI of a carrier that has been measured for the longest (i.e., a carrier expected to have the highest DQI measurement accuracy), or the DQI of the most recently updated carrier.

(4) When a CQI is selectively measured in a DL carrier or a set of DL carriers indicated by the BS, an NPRACH carrier is selected from among UL carriers associated with the corresponding DL carrier, and Msg1 is transmitted on the NPRACH carrier.

In general, a UL carrier is first selected for Msg1 and then DQI is measured in a DL carrier corresponding to the UL carrier in the random access procedure. In the above method, however, when it is determined to report the DQI of a specific DL carrier (e.g., a DL carrier corresponding to the best DQI) among multiple DL carriers, a UL carrier related to the DL carrier is selected.

(5) The BS may differentiate the configuration of a DQI-RS carrier set for each UL carrier for Msg1

RRC_CONNECTED state (1) When the BS indicates NPDCCH order-based Msg1 transmission, the BS may directly indicate a DQI-RS carrier, and the UE may derive DQI from the DQI-RS carrier.

(2) After Msg3 transmission, the BS may change the DL carrier of the UE to the corresponding carrier.

(3) In the RRC connected mode, the UE may receive an indication indicating a DQI-RS carrier to be used for DQI measurement in the RRC_IDLE state from the BS.

F.7 Method of Indicating DL Quality Information Reporting

Considering a computation time for DQI estimation and a time taken for generating a signal/channel for reporting DQI in Msg3 at the UE, when the UE may obtain an indication of DQI reporting may be an important factor. Particularly when additional information is required for DQI measurement, the UE needs to obtain the information as soon as possible. This section proposes a method of indicating DQI reporting. The proposed method may all be applied unless contradicting with other proposals described in the present disclosure.

Method of using a bit/state of a UL grant included in an RAR

When the index of an Msg3/4 MPDCCH NB is a specific value, this is indirectly recognized as a DQI reporting indication. Characteristically, when a specific number or more Msg3/4 MPDCCH NBs are included in RAR monitoring NBs or when the interval between an RAR monitoring NB and an Msg3/4 MPDCCH NB is less than or equal to a specific value, it is determined that DQI reporting is indicated.

Method of using a reserved bit (s) of an RAR

In the case where (N)PRACH resources are used to request an EDT, when Msg2 indicates that the EDT request of the UE has been accepted by the BS, it is recognized as a DQI reporting indication.

Since the connected mode is generally not entered in EDT, an opportunity to receive DQI/CQI as soon as possible in this manner may be required.

If Msg2 is received for (N)PRACH resources which are not used for an EDT request, a specific reserved bit of the RAR may be interpreted as indicating DQI reporting.

Method of indicating the configuration of DQI to be reported by a UE

A CQI and a repetition number may be selectively indicated in DQI.

(1) In a specific CE mode, a CQI or a repetition number may be fixedly indicated. In a specific example, only the CQI may be reported in a CE mode that supports a relatively small repetition range or no repetition, or only the repetition number may be reported in a CE mode that supports a relatively large repetition range.

A DQI report mode may be indicated.

(1) DQI reporting may be indicated for a wideband and/or a preferred NB and/or an NB of a DQI RS closest to an Msg.3/4 MPDCCH NB and/or a specific NB of the DQI RS and/or an NB used for SIB reception and/or the center 6 RBs.

When it is necessary to divide the method of indicating DQI measurement and reporting into a step of configuring a measurement and a step of indicating reporting, this may be realized in the following manner.

A reserved bit of the RAR may be used to trigger DQI reporting, with the following features.

Whether the BS may receive/support a DQI report or a related configuration may be signaled (semi-)statically by high-layer signaling (e.g., system information or an RRC message), and on/off of DQI reporting may be indicated dynamically by a CSI report field in the UL grant of the RANR (in CE Mode A in eMTC) or the reserved bit of the RAR.

When the RAR is a response to an EDT request, a DQI report configuration indicated by high-layer signaling, not the reserved bit of the RAR may be followed (i.e., when DQI measurement and/or reporting is configured for the UE by higher-layer signaling, a decision as to whether to report DQI may not be based on an indication of a dynamic signal, which may be applied when the RAR does not have a reserved bit or the UL grant of the RAR does not have the CSI report field, as in eMTC CE Mode B).

When the CSI report field of the UL grant in the RAR is used as trigger information for DQI reporting, the reserved bit of the RAR may be used for the purpose of providing additional information related to a DQI report configuration (this is also similarly applicable to a reverse case in which usages of the CSI report field of the UL grant and the reserved bit of the RAR are switched).

This may be used to dynamically change a related configuration, when there are one or more DQI report configurations.

A DQI report configuration may include information indicating whether to report DQI, a DQI value range, the number of DQI bits, CSI resources (e.g., an NB set, a reference TM, and an NB-IoT DL carrier set), and a DQI report mode (e.g., a wideband or subband/NB (selected or preferred by the BS or the UE)).

Although the DQI report configuration may be determined by the CSI report field in the UL grant of the RAR and the reserved bit of the RAR, the DQI report configuration may be determined differently according to the TBS and/or duplex mode of Msg3, indicated by the UL grant of the RAR.

When the TBS of Msg3 is equal to (or smaller than) a specific value, DQI reporting may be disabled.

According to the TBS of Msg3 and/or the contents (e.g., RRC Resume, RRC Reconfiguration Request, or the like) of Msg3, a DQI report mode (e.g., a wideband or subband/NB (selected or preferred by the BS or the UE)), a DQI value range, and the number of DQI bits may be different.

F.8 Interpretation of Msg3/4 MPDCCH NB, when DL Quality Information Reporting is Indicated As described above, the DQI may be used directly for the Msg3/4 MPDCCH. If the DQI-RS is different from the Msg3/4 MPDCCH (frequency) resources, the Msg3/4 MPDCCH resources may be derived based on a reported DQI-RS to more actively use the DQI. That is, when the BS has configured a set of Msg3/4 MPDCCH resources by system information, it is not easy to change the set of Msg3/4 MPDCCH resources. Therefore, when there is no misunderstanding about a DQI-RS between the BS and the UE, the UE may be allowed to interpret the Msg3/4 MPDCCH and/or PDSCH (frequency) resources differently from a value obtained from the system information according to the DQI-RS of the DQI reported by the UE. The proposed method may all be applied, unless contradicting with other proposals described in the present disclosure.

The Msg3/4 MPDCCH and/or PDSCH (frequency) resources may be interpreted as identical to or including some of Msg2 MPDCCH NBs (i.e., the Msg3/4 MPDCCH NB index indicated by the UL grant in the RAR is interpreted differently).

When DQI has been reported, a frequency hopping field may be included in the DCI of the Msg3/4 MPDCCH, or it may be allowed to use the frequency hopping field even in the Msg3/4 reception step.

When information about a preferred NB is included in the DQI, the UE may assume or receive an indication indicating that frequency hopping is off for the Msg3/4 MPDCCH and/or the Msg4 PDSCH.

Characteristically in CE Mode B, a frequency hopping on/off field may be added to the Msg4 DL grant or may be indirectly derived from a combination of other fields.

Characteristically in CE Mode B, the frequency hopping field in the Msg4 DL grant may be used to interpret whether a PDSCH scheduled by the DCI hops in frequency.

F.9 Configuration of DL Quality Information

The MTC UE and the NB-IoT UE support various CE levels and CE modes. The CE levels and CE modes reflect distances (i.e., SNRs) from the BS and mobility, and further, UE processing power. Accordingly, DQI which may be measured or generated by the UE needs to be limited in consideration of such various types of information about the surroundings. This section proposes the configuration and range of information included in DQI. The proposed method may all be applied, unless contradicting with other proposals described in the present disclosure.

Configuration of DQI report information

The DQI report information may include only part of the following DQI configuration information and may be reported to the BS.

Information indicating whether the DQI has been configured based on a CQI or a repetition number may be included.

(1) A DQI table may be made to include CQIs and repetition numbers, and a CQI or a repetition number may be reported according to an index selected in the DQI table by the UE. Characteristically, the lowest CQI in the DQI table may be configured to indicate a state similar to or better than a channel state indicated by the lowest repetition number in the DQI table (e.g., in terms of BLER).

Reporting types may include (a) wideband CQI or repetition, (b) wideband (CQI or repetition) and UE-selected (or BS-selected) NB index and CQI or repetition on the corresponding NB, (c) wideband (CQI or repetition) with PMI, and (d) wideband (CQI or repetition) without PMI.

The number of Rx antenna ports (characteristically, when the number of Rx antenna ports is larger than 1, the CQI (or repetition) is fixed to the highest value (or lowest value)).

The DQI information configuration may be configured differently depending on a CE level and/or whether an Msg2 MPDCCH repetition (e.g., an actual transmission number or a maximum repetition number) and Msg2 MPDCCH hopping are performed and/or depending on the PRACH format and whether PRACH repetition and PRACH hopping are performed.

When Msg1 has been transmitted in response to an EDT request or when the random access procedure is in progress as a part of the EDT process, it may be configured that a CQI is selected and reported.

Although the DQI UE may directly select a repetition number assumed for CQI measurement and indicate the repetition number together with a CQI in DQI to the BS, the repetition number may be configured directly by the BS or derived by a specific parameter. That is, the repetition number that the UE assumes for CQI measurement may be a specific predetermined value, not a value that may be directly selected by the UE. The value may be broadcast directly from the BS or defined by a relationship determined according to a CE level and a parameter of a channel to be monitored or used as a reference for CQI calculation by the UE.

DQI range

N sets of CQI (or repetition) value ranges are configured in an SIB, and a specific one of the N sets is indicated by the RAR.

(1) For each set, R_TM and/or R_DQI and/or R_CQI and/or R_Rep that the UE may assume in the DQI derivation process may be defined differently.

R_TM, R_DQI, R_CQI, and R_Rep represent a reference TM, a reference DQI-RS, a reference CQI, and a reference repetition number, respectively. Only when the UE has part of the information, the UE may estimate information suitable for DQI configuration information. Herein, a reference is a parameter that may be assumed to be used for hypothetical DL channel transmission in deriving the reception performance of a hypothetical DL channel that DQI is intended to represent.

A different DQI set may be available according to the number of Rx antenna ports. In this case, the UE needs to additionally notify the number of Rx antenna ports or information about a used set.

The DQI range configuration and the number of sets may be different depending on a CE level and/or whether Msg2 MPDCCH repetition (e.g., an actual transmission number or a maximum repetition number) and Msg2 MPDCCH hopping are performed and/or a PRACH format and whether PRACH repetition and PRACH hopping are performed.

A corresponding specific value may be set as follows, when a different specific DQI reporting operation is performed according to whether the number of repetitions or subframes of an MPDCCH (or NPDCCH) and/or an (N)PDSCH received until the UE successfully demodulates/detects the MPDCCH (or NPDCCH) and/or (N)PDSCH of Msg2 is greater or less than a specific value (e.g., when the UE reports the repetition number of a hypothetical MPDCCH (or NPDCCH) and/or (N)PDSCH or a value corresponding to subframes or repetitions or an AL received until the UE successfully detects the MPDCCH (or NPDCCH) and/or (N)PDSCH).

The specific value may be set by the BS or predetermined to be a specific ratio of the maximum repetition number of a channel (e.g., MPDCCH (or NPDCCH) and/or (N)PDSCH) related to the RAR. (e.g., The predetermined value may be configurable by the BS or fixed in the standard, and the range/value of the ratio may also be different according to the maximum repetition number and/or frequency hopping or non-frequency hopping of the channel related to the RAR (e.g., MPDCCH (or NPDCCH) and/or (N)PDSCH).)

When the UE reports the value corresponding to the subframes or repetitions or AL received until successful MPDCCH (or NPDCCH) and/or (N) PDSCH detection as DQI, the corresponding value is specifically determined as follows.

When DQI is predefined/given as a plurality of repetition numbers, a DQI value is the smallest of values equal to or greater than an actual number of received subframes or repetitions among the predefined/given values.

F.10 DL Quality Information Report Mode

In this section, various modes for reporting DQI are proposed. As described above, the MTC and NB-IoT systems support various CE levels and CE modes, particularly, MTC has even the feature of frequency hopping of DL NB resources and thus there is a need for supporting a proper DQI report mode for each configuration in consideration of its features. The proposed method may be applied to all the other proposals, unless contradicting with the other proposals described in the present disclosure.

In CE Mode A, CQI-based DQI is reported.

If frequency hopping is enabled (rar-HoppingConfig is set), the following operations are performed.

(1) UE-selected subband feedback (aperiodic CSI report, Mode 2-0)

Legacy CSI reporting behavior wideband CQI on all narrowband(s) in the CSI reference resource preferred narrowband index within the set of narrowband(s) in which MPDCCH is monitored CQI value reflecting transmission only over the preferred narrowband, CQI will be encoded differentially relative to wideband CQI here CSI reference resource is:

In the time domain and for a BL/CE UE, the CSI reference resource is defined by a set of BL/CE downlink or special subframes where the last subframe $n-n_{CQI\_ref}$, where for periodic CSI reporting $n_{CQI\_ref}$ is $\geq 4$:

where for aperiodic CSI reporting $n_{CQI\_ref}$ is $\geq 4$:

where each subframe in the CSI reference resource is a valid downlink or valid special subframe:

where for wideband CSI reports:

The set of BL/CE downlink or special subframes is the set of the last $\text{ceil}(R^{CSI}/N_{NB,hop}^{ch,DL})$ subframes before $n-n_{CQI\_ref}$ used for MPDCCH monitoring by the BL/CE UE in each of the narrowbands where the BL/CE UE monitors MPDCCH. where $N_{NB,hop}^{ch,DL}$ is the number of narrowbands where the BL/CE UE monitors MPDCCH.

where for subband CSI reports:

The set of BL/CE downlink or special subframes is the set of the last $R^{CSI}$ subframes used for MPDCCH monitoring by the BL/CE UE in the corresponding narrowband before $n-n_{CQI\_ref}$.

where $R^{CSI}$ is given by the higher layer parameter csi-NumRepetitionCE.

In the frequency domain, the CSI reference resource includes all downlink physical resource blocks for any of the narrowband to which the derived CQI value relates Proposed Method The UE follows a method similar to CSI report mode 2-0 for legacy BL/CE UEs, and the following modifications and additions are required.

$R^{CSI}$: $R^{CSI}$ lot may be defined cell-commonly, $R^{CSI}$ may be defined per each CE level, or $\text{Rest}^{CSI}$ may be defined as a value dependent on an RAR MPDCCH repetition number (an actual MPDCCH repetition number or a maximum repetition number mpdcch-NumRepetition-RA). This value may be signaled by RRC signaling such as an SIB or by Msg2.

Preferred NB: An NB may be selected from among CSI reference resources in the frequency domain, which is closest to an NB used to monitor the Msg3/4 MPDCCH derived from an Msg3/4 MPDSCH NB index in the information received from the UL grant included in the RAR. The UE may calculate DQI (CSI) based on the CRS in only up to a specific step during MPDCCH monitoring for Msg2 reception, and completely calculate wideband CSI and the DQI (CQI) of the preferred NB after interpreting the RAR.

CSI reference resource: It may be replaced with the DQI-RS of the disclosure.

(2) Wideband CQI without PMI (periodic CSI report, mode 1-0)

Legacy CSI reporting behavior

One wideband CQI conditioned on transmission rank 1

Proposed method

The UE follows a method similar to CSI report mode 1-0 for legacy BL/CE UEs, and the following modifications and additions are required.

$R^{CSI}$: $R_{CSI}$ may be defined cell-commonly, $R^{CSI}$ may be defined per each CE level, or $R^{CSI}$ may be defined as a value dependent on an RAR MPDCCH repetition number (an actual MPDCCH repetition number or a maximum repetition number mpdcch-NumRepetition-RA). This value may be signaled by RRC signaling such as an SIB or by Msg2.

(3) Wideband CQI with PMI (periodic CSI report, mode 1-1)

Legacy CSI reporting behavior

One wideband CQI and PMI within restricted subset of PMI if configured

Proposed method

The UE follows a method similar to CSI report mode 1-1 for legacy BL/CE UEs, and the following modifications and additions are required.

$R^{CSI}$: It may be defined cell-commonly, on a CE level basis, or as a value dependent on an RAR MPDCCH repetition number (an actual MPDCCH repetition number or a maximum repetition number mpdcch-NumRepetition-RA). This value may be signaled by RRC signaling such as an SIB or by Msg2.

R_TM: A reference TM may be defined. The reference TM may be signaled by RRC signaling such as an SIB or by Msg2 from the BS or determined according to the number of CRS ports of the BS. Further, the BS may indicate the reference TM to the UE in consideration of a PDSCH TM to be used after receiving Msg3.

PMI subset: It may be defined cell-commonly, on a CE level basis, or according to an RTM.

If frequency hopping is disabled, the following operations are performed.

(1) UE-selected subband feedback (aperiodic CSI report, mode 2-0)

Legacy CSI reporting behavior

Wideband CQI on all narrowband(s) in the CSI reference resource

Preferred narrowband index

Differential CQI value=0

Proposed method

The UE follows a method similar to CSI report mode 2-0 for legacy BL/CE UEs, and the following modifications and additions are required.

$R^{CSI}$: It may be defined cell-commonly, on a CE level basis, or as a value dependent on an RAR MPDCCH repetition number (an actual MPDCCH repetition number or a maximum repetition number mpdcch-NumRepetition-RA). This value may be signaled by RRC signaling such as an SIB or by Msg2.

CSI reference resource: Since an Msg3/4 MPDCCH NB may have different frequency-domain resources from the Msg2 MPDCCH, the UE may be configured to additionally use a channel to which frequency hopping is applied in the CSI reference resource. For example, there may be SIB1-BR and other SIBs.

Preferred NB: An NB may be selected from among CSI reference resources in the frequency domain, which is closest to an NB used to monitor the Msg3/4 MPDCCH derived from an Msg3/4 MPDSCH NB index in the information received from the UL grant included in the RAR. The UE may calculate DQI (CSI) based on the CRS in only up to a specific step during MPDCCH monitoring for Msg2 reception, and completely calculate wideband CSI and the DQI (CQI) of the preferred NB after interpreting the RAR.

In CE Mode B, DQI based on a required repetition number is reported.

If frequency hopping is enabled (rar-HoppingConfig is set), the following operations are performed.

(1) Operations in CE Mode B are the same as the aforementioned operations in CE Mode A, but repetition (or a repetition number) instead of a CQI is reported as DQI. In this case, DQI report may be measured/reported based on DQI instead of a CQI in the method described in relation to CE Mode A. For example, the DQI report may include only wideband DQI, or further include NB DQI measured in a preferred NB and information about the position of the preferred NB (e.g., preferred NB index) as well as the wideband DQI. In addition, for example, the wideband DQI and/or the NB DQI may be measured according to the method described in section F.1, and may include the information (the repetition number R and/or the AL) described in section F.1. In a more specific example, the wideband DQI and/or the NB DQI may include an RSRP/RSRQ value and/or reception information about the (N)PDCCH/MPDCCH or (N)PDSCH of Msg2 and/or information about the reception performance of the (N)PDCCH/MPDCCH of Msg4 and/or information about the reception performance of the (N)PDSCH of Msg4.

(2) $R^{CQI}$: A CQI value available as a reference needs to be defined. This value may be defined as a reference MCS used to report a repetition number satisfying a specific target reception performance (e.g., BER) by an MCS (a code rate, the number of layers, and a modulation order). The CQI value may be defined cell-commonly, on a CE level basis, or as a value dependent on an RAR MPDCCH repetition number (e.g., an actual MPDCCH repetition number or a maximum repetition number mpdcch-NumRepetition-RA). It may also be a value derived indirectly from the Msg2 MPDCCH. This CQI value may be signaled by RRC signaling such as an SIB or by Msg2. Alternatively, for example, the modulation order and TBS (or the number of bits derived from a corresponding fixed DCI format) of the Msg2 MPDCCH may be used as parameters for the CQI value, and a reference AL may be independently given to the UE.

R_AL may be defined in all of the above methods.

R_AL refers to a reference AL for the MPDCCH. Information suitable for DQI configuration information may be estimated from R_AL. Herein, reference means a parameter that may be assumed for transmission of a hypothetical DL channel in deriving the reception performance of the hypothetical DL channel (e.g., MPDCCH) that DQI is intended to represent.

When there are various DQI report modes (e.g., wideband or subband/narrowband selected or preferred (by the BS or the UE)), a DCI report mode may be determined as follows.

The DQI report mode may be determined by the NB (or NB-IoT carrier) relationship between Msg2 and Msg3/Msg4.

For example, when the NB (or NB-IoT carrier) of Msg2 and the NB (or NB-IoT carrier) of Msg3/Msg4 are different, wideband DQI may be reported. When the NB (or NB-IoT carriers) of Msg2 and the NB (or NB-IoT carrier) of Msg3/Msg4 are the same, NB DQI may be reported.

Depending on whether the NBs (or NB-IoT carriers) of Msg2 and Msg3/Msg4 are different, DQI may be selectively defined as a CQI or a repetition number/AL, and a DQI value range may also be defined differently.

In the above description, a wideband may be based only on actual NBs used for Msg2 transmission by the BS. That is, even when the BS enables frequency hopping for a reference resource (e.g., a Type2 CSS) serving as a reference for DQI measurement, only some frequency resources (NB) may be used for the transmission. For example, when a repetition number is small, the BS may not use all of NBs available for frequency hopping.

F.11 DL Quality Information Report for Non-BL UE

A non-BL UE operating in a CE mode may use two or more Rx antennas, and measure and report DQI based on the Rx antennas. The BS may not have accurate knowledge of the number of Rx antennas of the non-BL UE, and a suitable DQI value range may be different according to the number of Rx antennas used for DQI measurement. In this regard, DQI measurement and reporting of the non-BL UE may have the following features.

The BS may set the number of Rx antennas available for DQI measurement of the UE.

When the UE measures DQI, the UE may measure the DQI based on a single antenna to reduce power consumption. However, if the DQI is a specific value or represents a worse quality, the UE may be forced or configured to measure/report DQI using two or more Rx antennas.

F.12 Method Of Measuring and Reporting DL Quality Information in One or More NB-IoT DL Carriers The UE may be instructed to measure DQI in on one or more NB-IoT DL carriers and report the DQI. Particularly, the network may indicate/configure the DQI measurement and reporting to use the DQI as auxiliary information for DL carrier redirection.

The carrier set may be configured by higher-layer signaling (e.g., system information or an RRC message) or carrier(s) to be measured and reported by the UE in the carrier set configured by the higher-layer signaling may be indicated by DCI (e.g., DCI triggering an (N)PDCCH order-based (N)PRACH).

The carrier set (that the UE should measure) may include a combination of an anchor carrier and one non-anchor carrier (an anchor carrier that may be expected to have been received by the UE in a CE level selection process to reduce additional power consumption caused by measurement of the UE may be added to measurement carriers because the addition of the anchor carrier may not have a significant effect on the reception complexity and power consumption of the UE.)

The measurement period of the anchor carrier may be limited to an (N)PRSRP period for CE level selection.

The measurement period of the non-anchor carrier may be limited to a time period after Msg2 reception.

An additional measurement gap or time may be given to perform the above additional measurement.

If carrier(s) is given to an (N)PDCCH order-based (N)PRACH, an additional time for the UE to transmit Msg3 after the DCI (e.g., the interpretation of a scheduling delay may be extended or different) may be set.

The UE may be allowed not to expect DL scheduling for a specific time before the random access procedure, which may be different according to the position of an NB-IoT DL carrier to be additionally measured by the UE, an operation mode, and a carrier type (e.g., anchor carrier or non-anchor carrier) (i.e., the UE may be allowed not to receive any or part of a specific search space).

The UE may report the measurement result of carrier(s) other than a carrier on which Msg2 associated with Msg1 has been received.

The UE may be configured to select a preferred NB-IoT DL carrier based on the measurement result and report only corresponding information (because there may be a limit on the configuration of a field for measurement reporting).

When the DL channel quality of the carrier is to be reported together with the above information, and when the specific interpretation of the DL channel quality information is changed according to the configuration of Msg2 (e.g., the maximum repetition number of the Msg2 NPDCCH), the DL channel quality information may be determined/interpreted based on the Msg2 configuration of a DL carrier associated with the Msg1 transmission or based on the Msg2 configuration of a DL carrier selected (or reported) based on a measurement.

If there is no Msg2 configuration for the selected carrier, the Msg2 configuration of a DL carrier associated with the existing Msg1 transmission may be followed, or an Msg2 configuration to be referred to may be defined or given separately.

The UE may be allowed to select a preferred NB-IoT DL carrier based on the measurement result and transmit Msg1 on a UL carrier corresponding to a DL carrier in which Msg2 may be expected.

When the preferred NB-IoT DL carrier has been reported, the UE may be configured to perform NPDCCH monitoring related to Msg2 and/or Msg3/4 on the carrier.

The BS may present a reference value for selecting a preferred NB-IoT DL carrier. For example, the BS may limit a repetition number estimated by the UE (which the UE needs to decode a hypothetical NPDCCH in a Type2-CSS with a BLER of 1% upon the NB-IoT DL carrier) not to exceed a specific value.

If only a specific DL carrier is measured (other than an Msg2 carrier associated with Msg1), the UE may measure/report the DQI of the indicated carrier.

If DQI is interpreted/determined based on an Msg2 configuration, Msg2 configuration information may still be based on the carrier of Msg2 associated with Msg1 or the Msg2 configuration of the indicated (measured) carrier.

The preferred carrier may be the most UE-preferred carrier or the least UE-preferred carrier in terms of reception performance.

A preferred carrier is a carrier predicted to have the best DL reception performance, and a non-preferred carrier is a carrier predicted to have the worst DL reception performance. When the least preferred carrier information is reported, the DQI may not include a repetition number or may include a conservative value (e.g., the largest of the repetition numbers of carriers except for the least preferred carrier) out of DQI (repetition numbers) about other carriers. The reason for reporting non-preferred carrier information is that when the BS redirects the DL carrier of the UE, the non-preferred carrier information may be used as information indicating that the UE does not want the carrier to be configured as a DL carrier.

The DQI report may include DQI measured in two or more NB-IoT DL carriers.

The DQI may be transmitted at the same time or may be transmitted at a different time or in different resources.

When the DQI is reported at the same time, the value range and/or representation interval of the DQI may be smaller or narrower than the DQI of one NB-IoT DL carrier.

When there are multiple carriers on which reception of Msg2 may be expected, corresponding to a carrier available for Msg1 transmission, the UE may select a DL carrier with the best DL channel quality (e.g., satisfying a specific reception performance of a specific channel with the smallest repetition number) among the multiple DL carriers and then attempt to transmit Msg1 on a UL carrier corresponding to the selected DL carrier.

The UE may then indicate that Msg1 is transmitted on the UL carrier because of the best DL channel quality of the DL channel corresponding to the UL carrier during the CQI transmission (e.g., in Msg3). This information may be reported together with the CQI required for the selected DL carrier (e.g., the smallest repetition number with which reception of a specific channel may be expected, while satisfying a specific reception performance).

This may be used as indirect information requesting the BS not to allocate the other DL carriers to the UE after the random access procedure.

F.13 Physical UL Channel for DL Quality Information Report

When a CQI is transmitted in Msg3, corresponding information may be transmitted on the (N)PUSCH largely by rate-matching or puncturing. Rate-matching is to allocate data to be transmitted in Msg3 to REs except for REs carrying the CQI in the (N)PUSCH. In this case, there is a need to avoid a mismatch in the number of REs to be used for data transmission between the UE and the BS. For example, when there is a mismatch in the number of REs, the BS may determine a wrong code rate to be referred to for data decoding, thereby failing in the decoding. Puncturing is a scheme of performing data mapping without taking into account the number and positions of REs required for CQI transmission while determining the number of REs available for the data to be transmitted in Msg3. Puncturing is advantageous in that the BS does not determine a wrong code rate for data decoding of Msg3 in spite of no knowledge of whether the UE will transmit a CQI. The above-described rate-matching and puncturing may be selectively applied depending on whether the BS may be aware whether the UE transmits a CQI before the BS attempts to decode data. For example, when a CQI is transmitted in Msg3 in the initial random access procedure, the CQI may be transmitted by puncturing. When a CQI is transmitted in Msg3 in the RRC connected mode by a BS request, rate-matching may be used. Further, when the UE transmits a CQI in BS-preconfigured UL resources (PUR) in the RRC idle mode, rate-matching may be applied. If the PUR is configured in the RRC idle mode, not in the RRC connected mode, the BS may not have information about the UE capability of supporting CQI measurement and reporting. Therefore, puncturing may be applied.

F.14 CQI Reporting in RRC Connected Mode

The BS may redirect the NB-IoT UE to a non-anchor carrier in the random access procedure. That is, a non-anchor carrier other than the DL carrier on which the UE has received Msg2 and Msg4 (i.e., other than a DL carrier from which the CQI has been derived and reported in Msg3 by the UE) may be allocated to the UE, and then the UE may be requested to perform a subsequent operation on the configured non-anchor carrier. In this case, since the BS has no knowledge of the CQI of the non-anchor carrier of the UE, the BS may need to request the UE to measure a CQI in the configured carrier and report the CQI, apart from the CQI reported by the UE in the random access procedure. This may be performed based on the procedure of reporting a CQI on an (N)PUSCH (hereinafter referred to as Msg3) indicated by Msg2 in an (N)PDCCH order-based random access procedure. In this case, whether to report a CQI in Msg3 may be indicated using a reserved bit ('R' bit) unused in the MAC RAR of Msg2. However, since there may not be enough time to measure the CQI after successful detection of Msg2, whether to report the CQI in Msg3 may be indicated by a specific state or bit that is not used or is always set to a specific value in DCI that triggers Msg1 transmission (e.g., DCI requesting (N)PDCCH order-based Msg1 transmission).

The CQI measured by the UE may be defined differently from the CQI reported in the random access procedure. For example, since there is no information about a USS in the initial random access procedure, a CQI may be defined based on a parameter related to a resource configuration for detecting Msg2 (e.g., a maximum repetition number for a type-2 CSS), whereas when CQI measurement and reporting are requested in the RRC connected mode as described above, a CQI may be defined based on an already configured USS-related parameter (e.g., a maximum repetition number). For example, the CQI may be defined as an actual repetition number with which a PDCCH (e.g., MPDCCH or (N)PDCCH) related to Msg2 has been successfully detected or a repetition number required to decode a (hypothetical) PDCCH (e.g., MPDCCH or (N)PDCCH). In this case, the CQI may be defined based on a maximum repetition number. In a more specific example, the CQI may be defined as a ratio to the maximum repetition number Rmax. When the actual repetition number with which the PDCCH (e.g., MPDCCH or (N)PDCCH) related to Msg2 has been successfully detected or the repetition number required to decode the (hypothetical) PDCCH (e.g., MPDCCH or (N)PDCCH) is reported as one of {1, 2, 4, 8, ... }, the CQI may be defined as one of {Rmax, Rmax/2, Rmax/4, Rmax/8, ... }.

Further, the CQI may be defined based on a CSS or a USS which has a larger or smaller maximum repetition number, or one of the CSS and the USS may be selected by specific signaling from the BS. Even when the CQI is defined based on the USS, an NRS received for CQI measurement by the UE may be included in CSS Type 2 because the NRS may always be expected in a type 2 CSS on the non-anchor carrier. When the BS indicates an NPDCCH order-based NPDCCH transmission, the BS may configure the CE level of Msg1 resources to be different from an actual CE level of the UE. However, the UE may derive a CQI based on its DL CE level, not the CE level related to Msg1, indicated by the BS.

F.15 Method of Reporting CQI in PUR in RRC Idle Mode

When the UE transmits an (N)PUSCH in a PUR configured by the BS in the RRC idle mode, and when the UE is to monitor a DL channel for such as reason as reception of feedback information for the PUR transmission, the BS may need a CQI from the UE. That is, the BS may use the DL CQI of the UE to configure a repetition number and/or an AL and/or a code rate (which may be determined by a resource size and an MCS), for an (N)PDCCH/MPDCCH and/or an (N)PDSCH. The BS needs the CQI for a similar reason to a reason for which the BS needs a CQI of the UE in the initial random access procedure. However, since a used UL channel structure is different from that in the initial random access procedure in terms of PUR transmission, the following features may be needed additionally.

1) CQI definition

A. Since the DL feedback channel structure may be different according to a PUR type, the CQI definition may be related to the PUR type.

① There are a PUR type in which time/frequency resources are UE-dedicated, a PUR type in which time/frequency resources are sharable among multiple UEs, with spatial and/or code resources configured in a UE-dedicated manner, (e.g., collision may occur but with no contention), and a PUR type in which all resources are sharable among multiple UEs (e.g., contention may occur).

② Depending on a PUR type, the structure of a DL channel monitored by the UE may be different. For example, the DL channel to be monitored may be shared among multiple users (e.g., a structure similar to the RAR of Msg2) or a DL channel to be monitored may be configured for each user (e.g., an (N)PDCCH/MPDCCH of a USS). When a DL channel is defined independently for each user, a CQI is reported on a user basis. On the contrary, in the case where multiple users share and decode a DL channel, when user information exists for each individual user or for each group, only a specific user may be configured to report a CQI. This is because the channel should be scheduled based on the reception performance of a UE with the worst of the DL channel qualities of users sharing the DL channel. Further, the BS may configure a CQI to be reported only when a specific condition is or is not satisfied. The specific condition may mean, for example, that a CQI measured by a UE is less than a specific value. The CQI may be different from a CQI for the initial access procedure. A reference channel required to derive a CQI may be defined according to a PUR type and/or a DL channel. Further, when a PUR is configured for the UE in the RRC connected mode, the UE may be configured to report a CQI in a PUR in the RRC idle mode only as a delta value from the existing CQI based on some attribute of DL channel parameters because the BS may have already had DL channel quality information and thus have configured DL channel parameters based on the DL channel quality information.

③ In the case of CQI transmission in a PUR, the CQI may be defined as the repetition number and/or AL of the (N)PDCCH or MPDCCH, rather than it is defined based on the PDSCH regardless of the CE mode.

2) CQI measurement time

A. CQI measurement and reporting may be performed only when DL reception is required to determine whether to continue PUR transmission, not in every PUR transmission unit. That is, only when an operation of determining whether a configured PUR is still valid in consideration of a change in an ambient environment of the UE is performed, such an operation may be restrictively required.

F.16 Method of Reporting CQI of Control Channel in RRC Connected Mode

The present disclosure proposes a method of reporting the CQI of a DL control channel (e.g., MPDCCH, NPDCCH, or PDSCH) by a UE, which may be applied irrespective of the RRC states. However, a control channel that the UE attempts to detect in the RRC connected mode may be different from a control channel that the UE attempts to detect in the RRC idle mode. Accordingly, a CQI may be measured and reported in different methods in the RRC connected mode and the RRC idle mode. In this section, a series of procedures related to the method of reporting the CQI of a DL control channel in the RRC_CONNECTED mode are proposed. While the proposed method is described in the context of an MPDCCH in an eMTC system for the convenience of explanation, it may also be applied to other communication systems such as NB-IoT, LTE, and NR. Specific examples and channel/signal names in the proposed method may be interpreted as examples and channel/signal names intended to serve the same/similar purpose in the corresponding other systems.

1) Reference MPDCCH format for measuring CQI

A. Unlike the RRC idle mode, the UE may monitor an MPDCCH in a USS configured on a UE basis in the RRC connected mode. Considering that even though each UE monitors the same DCI format (e.g., DCI formats 6-0A and 6-1A or DCI formats 6-0B and 6-1B), the DCI size of a USS may be different according to a UE capability (e.g., sub-PRB, 64 QAM, or wideband support or non-support), a CQI may be measured/calculated in a different reference channel (e.g., hypothetical MPDCCH). Further, because a UE in CE Mode A may monitor not only a USS but also a TypeO-CSS in the RRC connected mode, a reference format for CQI measurement (and/or a search space type-only for CE mode A) may be configured by the BS or defined by a specific agreement. That is, even for the same UE, the size of the reference format may be changed according to parameter information configured for the USS with reference to the capability of the UE by the BS.

B. An ECCE is an MPDCCH allocation unit. A minimum number of ECCEs included in an MPDCCH may be different in each subframe carrying the MPDCCH, and thus the reference for a CQI may vary. That is, when the CQI is a value representing the repetition number and/or AL of the MPDCCH (e.g., a value that may satisfy a specific criterion for hypothetical MPDCCH reception detection performance), a reference MPDCCH format from which the CQI is derived (e.g., see TS36.211 Table 6.8B.1-2) may be "indicated by the BS", "fixed in the standard", or "fixed and signaled at a time when an MPDCCH triggering CQI reporting (an MPDCCH indicating CQI reporting in an aperiodic CQI triggering manner) is received or at a relative time from the time.

2) CQI information configuration

A. When a "maximum repetition number Rmax configured for the search space of a reference MPDCCH format (a maximum number of times an MPDCCH may be repeated in the search space) or a maximum value which may be reported in a CQI (e.g., an MPDCCH repetition number required for the UE to detect a hypothetical MPDCCH with performance equal to or higher than specific reference performance) (referred to as B) is less than "the number of hopping NBs used for MPDCCH transmission x an available repetition number for an MPDCCH subframe in each hop)" (referred to as A), as much resources as A may be divided into resource parts each corresponding to a size B, a CQI may be derived for each resource part, and the worst (or best) CQI (e.g., lowest (or highest) in terms of efficiency) may be selected as a representative CQI. Information about the resource part based on which the CQI has been derived may also be included in the CQI.

B. Since a USS may be configured on a UE basis, each UE may include, in a CQI, its preferred MPDCCH or USS configuration (e.g., a configuration by which MPDCCH detection performance satisfies specific reference performance by using minimum resources) among various available MPDCCH or USS configurations, and report the CQI to the BS. The BS may change MPDCCH configuration information of the UE by reflecting the CQI. The following information may be included in the preferred MPDCCH or USS configuration.

① MPDCCH resource mapping scheme (e.g., distributed mapping or localized mapping)

② MPDCCH hopping enable/disable information (characteristically, this information may be restrictively included in the CQI, only when the MPDCCH hopping configuration is enabled at a time of triggering MPDCCH CQI reporting).

③ When there are two or more MPDCCH PRB sets (e.g., see TS36.213 Table 9.1.5-1a, Table 9.1.5-1b, Table 9.1.5-2a, and Table 9.1.5-2b), information about an assumed PRB set or a UE-preferred MPDCCH PRB set in deriving a CQI.

3) Additional features when the relationship between a CRS port and an MPDCCH DMRS port is used The MPDCCH is transmitted by the same precoding as used for a DMRS port related to an ECCE included in the MPDCCH. Precoding information applied to a corresponding DMRS based on a CRS is generally not provided to the UE. If all or some of the above information may be additionally provided for the purpose of, for example, improvement of MPDCCH detection performance, the UE may additionally report related information (e.g., the relationship between an MPDCCH DMRS port and a CRS port) to the BS, together with or separately from the CQI.

A. When precoder information about the CRS and DMRS ports may be fixed to a specific value or cycled in every specific time/frequency unit, the UE may report UE-preferred precoding information (e.g., which may include information indicating that cycling is preferred or information requesting use of a specific precoder or cycling in a specific way). Further, the BS may indicate a precoder relationship between assumed CRS and DMRS ports, when the UE derives an MPDCCH CQI. Obviously, the information may be for indicating assumption of a specific precoder, or may indicate that it is not necessary to assume a specific precoder combination.

B. The UE may be configured to assume precoder information (e.g, a PMI) included in the most recent CSI report for a PDSCH (or the most recent CSI report for the PDSCH before a specific time) as precoder information to be assumed when the UE calculates an MPDCCH CQI (e.g., the repetition number and/or AL of the hypothetical MPDCCH).

Figure 14:
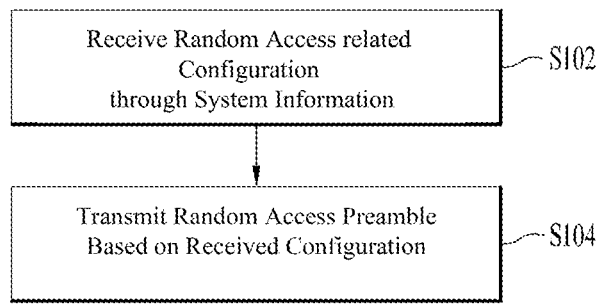
FIGS. 14 to 17 are flowcharts illustrating methods performed in a UE and a base station (BS) according to proposals of the present disclosure.

F.17 Flowcharts of Operations According to the Proposals of the Present Disclosure FIG. 14 is a flowchart illustrating a method of transmitting (or reporting) information regarding DQI in Msg1 to a BS by a UE. The example of FIG. 14 may be performed by the UE in the RRC_IDLE state or the RRC CONNECTED state. In the description of FIG. 14, (RA-0) to (RA-4) refer to the random access procedure described in section F. As described before, the term UE may be replaced with the terms user equipment, MS, UT, SS, MT, and wireless device.

In step S102, the UE may receive random access related configuration information through system information (or an SIB) from the BS. For example, step S102 may correspond to step (RA-0). Accordingly, the UE may receive the system information (or SIB) including the random access related configuration information according to the operation described in relation to step (RA-0) and/or the operation proposed in the present disclosure (e.g., see section F.1 to section F.16).

In step S104, the UE may transmit a random access preamble (or Msg1) to the BS based on the received configuration information. For example, step S104 may correspond to step (RA-1). In step S104, the UE may further transmit information regarding DQI through the random access preamble to the BS according to the present disclosure. To transmit the information regarding DQI through the random access preamble, the operation described in section F.1, and/or the operation proposed in the present disclosure (e.g., see section F.2 to section F.16).

After step S104, the UE may perform the same operations as steps (RA-2), (RA-3), and (RA-4).

Figure 15:
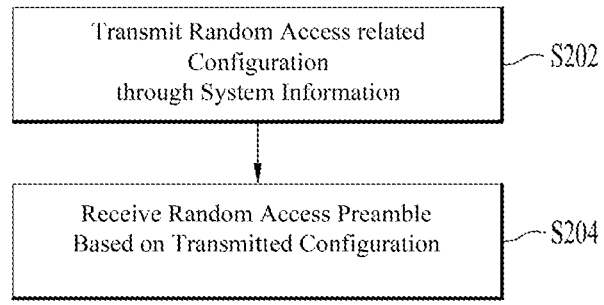

FIG. 15 is a flowchart illustrating a method of receiving (or receiving a report of) information regarding DQI in Msg1 from a UE by a BS. In the example of FIG. 15, the BS may perform the method with a UE in an RRC_IDLE state or an RRC CONNECTED state. In the description of FIG.

15, step (RA-0) to step (RA-4) refer to the random access procedure described in section F. As described above, a BS is a wireless device that communicates with a UE and the term BS is interchangeably used with other terms such as eNB, gNB, BTS, and AP.

In step S202, the BS may transmit random access related configuration information through system information (or an SIB) to the UE. For example, step S202 may correspond to step (RA-0). Accordingly, the BS may transmit to the UE the system information (or SIB) including the random access related configuration information according to the operation described in relation to step (RA-0) and/or the operation proposed in the present disclosure (e.g., see section F.1 to section F.16).

In step S204, the BS may receive a random access preamble (or Msg1) from the UE based on the transmitted configuration information. For example, step S204 may correspond to step (RA-1). In step S204, the BS may further receive information regarding DQI through the random access preamble from the UE according to the present disclosure. To receive the information regarding DQI through the random access preamble, the BS may perform the operation described in relation to step (RA-1), the operation described in section F.1, and/or the operation proposed in the present disclosure (e.g., see section F.2 to section F.16).

After step S204, the BS may perform the same processes as steps (RA-2), (RA-3), and (RA-4).

As described above, the UE may provide the DQI in step (RA-3) so that the BS may use the DQI for DL scheduling in step (RA-4).

Figure 16:
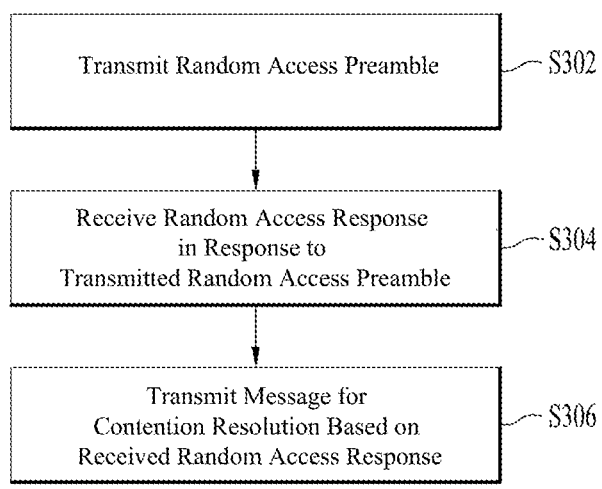

FIG. 16 is a flowchart illustrating a method of transmitting (or reporting) information regarding DQI in Msg3 to a BS by a UE. The example of FIG. 16 may be performed by a UE in an RRC_IDLE state or an RRC_CONNECTED state. In the description of FIG. 16, step (RA-0) to step (RA-4) refer to the random access procedure described in section F. As described above, the term UE is interchangeably used with other terms such as user equipment, MS, UT, SS, MT, and wireless device.

In step S302, the UE may transmit a random access preamble (or Msg1) to the BS. For example, step S302 may correspond to step (RA-1). Accordingly, the UE may transmit the random access preamble to the BS according to the operation of step (RA-1) and/or the operation proposed in the present disclosure. A configuration for the random access preamble transmission may be preset according to the operation of step (RA-0) and/or the operation proposed in the present disclosure (e.g., see section F.1 to section F.16). For example, an operation corresponding to step (RA-0) may be performed before step S302 (not shown), and reporting of information regarding DCI through Msg3 may be enabled based on system information broadcast by the BS.

In step S304, the UE may receive an RAR (or Msg2) from the BS in response to the transmitted random access preamble (or Msg1). For example, step S304 may correspond to step (RA-2), and the RAR may include information described herein and/or information proposed by the present disclosure. The UE may receive the RAR from the BS according to the operation of step (RA-2) and/or the operation proposed in the present disclosure (e.g., see section F.1 to section F.16). For example, the RAR may include an indication (or information) indicating the UE to report information regarding the DQI through Msg3.

In step S306, the UE may transmit a message for contention resolution (or Msg3) to the BS on a physical UL channel (e.g., PUSCH or NPUSCH) based on the received RAR (or Msg2). For example, step S306 may correspond to step (RA-3). In step S306, the UE may further transmit the information regarding DQI through the physical UL channel (e.g., PUSCH or NPUSCH) (or through the message for contention resolution) to the BS according to the present disclosure. To this end, the physical UL channel (e.g., PUSCH or NPUSCH) (or the message for contention resolution) may include information described herein and/or information proposed by the present disclosure. The UE may transmit information regarding the DQI through the physical uplink channel (e.g., PUSCH or NPUSCH) (or through the message for contention resolution) according to the operation of step (RA-3) and/or the operation proposed in the present disclosure (e.g., see section F.1 to section F.16). For example, information regarding the DQI may be transmitted to the BS through a higher-layer signal (e.g., a MAC message or an RRC message).

After step S306, the UE may perform the same process as in step (RA-4).

Figure 17:
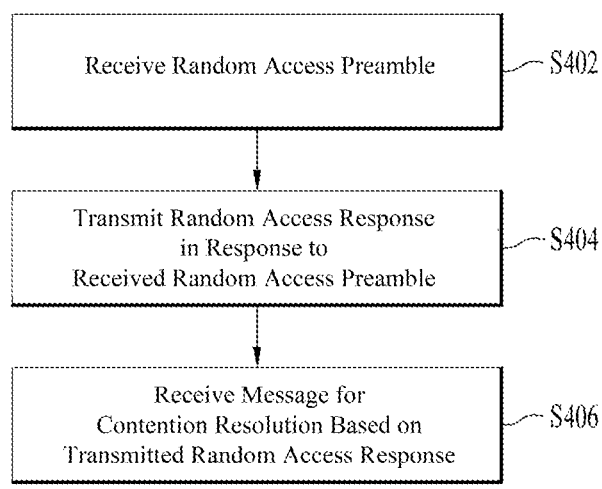

FIG. 17 is a flowchart illustrating a method of receiving (a report of) information regarding DQI through Msg 3 from a UE. In the example of FIG. 17, the BS may perform the method with the UE in an RRC_IDLE state or an RRC_CONNECTED state. In the description of FIG. 17, step (RA-0) to step (RA-4) refer to the random access procedure described in section F. As described above, a BS is a wireless device that communicates with a UE, and the term BS is interchangeably used with other terms such as eNB, gNB, BTS, and AP.

In step S402, the BS may receive a random access preamble (or Msg1) from the UE. For example, step S402 may correspond to step (RA-1). Accordingly, the BS may receive the random access preamble from the UE according to the operation of step (RA-1) and/or the operation proposed in the present disclosure. A configuration for the random access preamble transmission may be preset according to the operation of step (RA-0) and/or the operation proposed in the present disclosure (e.g., see section F.1 to section F.16).

In step S404, the BS may transmit an RAR (or Msg2) to the UE in response to the received random access preamble (or Msg1). For example, step S404 may correspond to step (RA-2), and the RAR may include information described herein and/or information proposed in the present disclosure. The BS may transmit the RAR to the UE according to the operation of step (RA-2) and/or the operation proposed in the present disclosure (e.g., see section F.1 to section F.16).

In step S406, the BS receives a message for contention resolution (or Msg3) through a physical UL channel (e.g., PUSCH or NPUSCH) from the UE in response to the transmitted RAR (or Msg2). For example, step S406 may correspond to step (RA-3). In step S406, the BS may further receive information regarding the DQI through the physical UL channel (e.g., PUSCH or NPUSCH) (or through the message for contention resolution) from the UE according to the present disclosure. To this end, the physical UL channel (e.g., PUSCH or NPUSCH) (or the message for contention resolution) may include information described herein and/or information proposed in the present disclosure. The BS may receive the information regarding DQI through the physical UL channel (e.g., PUSCH or NPUSCH) (or through the message for contention resolution) from the UE according to the operation of step (RA-3) and/or the operation proposed in the present disclosure (e.g., see section F.1 to section F.16).

After step S406, the BS may perform the same process as in step (RA-4).

In the examples of FIGS. 14 to 17, the operations described herein and/or the operations proposed in the present disclosure (e.g., see section F.1 to section F.16) may be performed in combination with the UE operations or the BS operations without limitation. All of the contents of "F. Proposed Methods of the Present Disclosure" are incorporated by reference in the descriptions of FIGS. 14 to 17.

By way of a non-limiting example, as proposed in the present disclosure, DQI may include RSRP and/or RSRQ information, a repetition number R and/or an AL related to actual PDCCH (MPDCCH or NPDCCH) decoding, a repetition number R and/or an AL related to hypothetical PDCCH (MPDCCH or NPDCCH) decoding, a repetition number R related to actual PDSCH (or NPDSCH) decoding, a repetition number R related to hypothetical PDSCH (or NPDSCH) decoding, a CQI, or a combination of at least two thereof (e.g., see sections F.1.1, F.6, F.7, F.9, and F.10).

In a more specific example, as proposed in the present disclosure, the DQI may include information representing the repetition number of a physical DL control channel (e.g., PDCCH, 1VIPDCCH, or NPDCCH) related to an RAR at a time of detecting the physical DL control channel. In this example, the DQI may further include information representing the AL of the physical DL control channel (e.g., PDCCH, MPDCCH, or NPDCCH) related to the RAR at the time of detecting the physical DL control channel. Alternatively, when the repetition number of the physical DL control channel has a value satisfying a specific performance requirement, the DQI may be transmitted on the assumption that the AL of the physical DL control channel related to the RAR is a reference AL (e.g., 24), and the specific performance requirement may include the repetition number of the physical DL control channel being 1.

In another specific example, as proposed in the present disclosure, the DQI may include information about a repetition number required to detect a hypothetical physical DL control channel at a specific BLER, and the specific BLER may be, for example, 1%. In this example, the DQI may further include information about an AL required to detect the hypothetical physical DL control channel at the specific BLER. Alternatively, when the repetition number required to detect the hypothetical physical DL control channel satisfies a specific performance requirement, the DQI may be transmitted on the assumption that the AL of the hypothetical physical DL control channel is a reference AL (e.g., 24), and the specific performance requirement may include the repetition number required to detect the hypothetical physical DL control channel being 1.

As described before, the random access procedures illustrated in FIGS. 14 to 17 may be performed when the UE is in the RRC_IDLE state or the RRC_CONNECTED state. By way of a non-limiting example, in the RRC_IDLE state, the EE may perform a random access procedure for initial access or for EDT (see sections F.1, F.4, F.5, F.6, F.7, F.9, F.13, F.15 and F. 16). In this example, when a random access preamble is transmitted in the RRC_IDLE state, DQI may be measured based on a CC (e.g., Type 2 CSS) for receiving an RAR (or Msg2). More specifically, the DQI may be determined based on a maximum repetition number Rmax configured for the CC (e.g., Type 2 CSS) for receiving the RAR (or Msg2). Alternatively, by way of a non-limiting example, in the RRC CONNECTED state, the UE may perform a random access procedure based on an (N)PDCCH order or for requesting resource scheduling (see sections F.1, F.5, F.6, F.7, F.13, F.14, F.15 and F. 16). In this example, when a random access preamble is transmitted based on an (N)PDCCH order or for requesting resource scheduling in the RRC CONNECTED state, DQI may be measured based on a USS configured in the RRC CONNECTED state (e.g., a maximum repetition number Rmax configured for the USS) or based on a repetition number required to detect a hypothetical physical DL control channel at a specific BLER (e.g., 1%).

While the present disclosure has been described above in relation to the random access procedures, the present disclosure may also be applied in the same/similar manner when DQI is measured/reported in an RRC_CONNECTED state, not limited to the random access procedures.

G. Communication System and Devices to Which the Present Disclosure is Applied

Various descriptions, functions, procedures, proposals, methods, and/or operation flowcharts of the present disclosure described herein may be applied to, but not limited to, various fields requiring wireless communication/connection (e.g., 5G) between devices.

The communication system and devices will be described in detail with reference to the drawings. Unless otherwise specified, like reference numerals denote the same or corresponding hardware blocks, software blocks, or functional blocks in the drawings/description.

Figure 18:
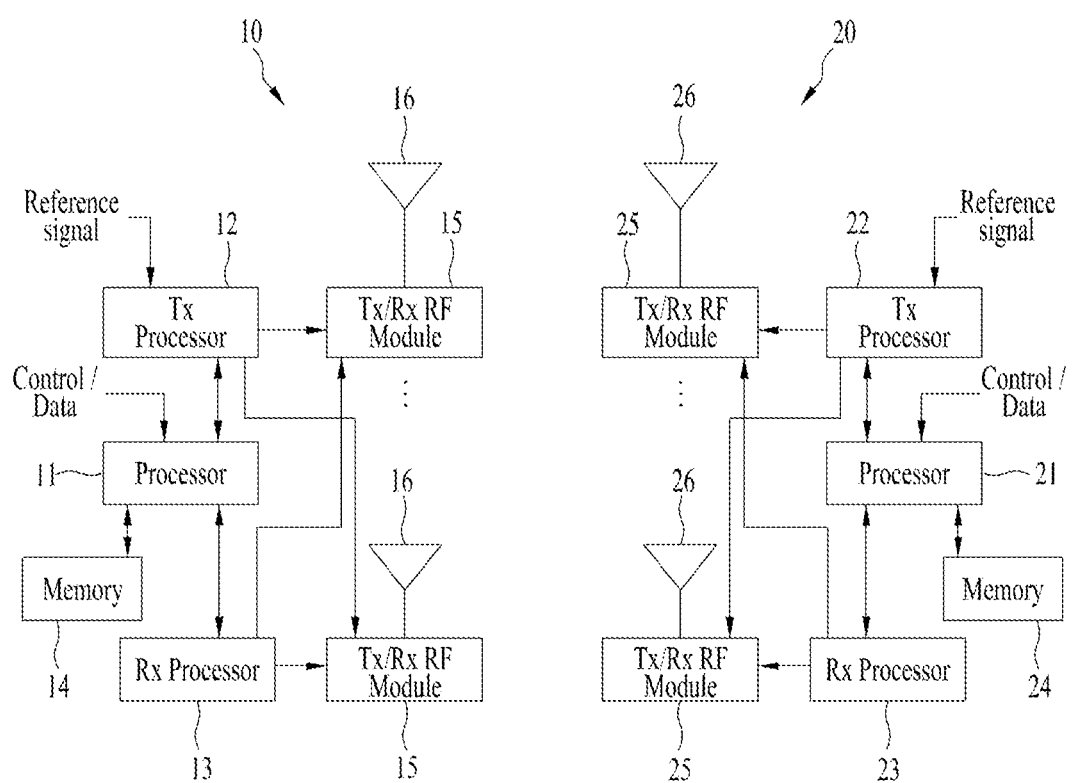
FIGS. 18 to 23 are block diagrams illustrating a system and communication devices to which proposed methods of the present disclosure are applicable.

FIG. 18 illustrates a block diagram of a wireless communication apparatus to which the methods proposed in the present disclosure are applicable.

Referring to FIG. 18, a wireless communication system includes a BS 10 and multiple UEs 20 located within coverage of the BS 10. The BS 10 and the UE may be referred to as a transmitter and a receiver, respectively, and vice versa. The BS 10 includes a processor 11, a memory 14, at least one Tx/Rx radio frequency (RF) module (or RF transceiver) 15, a Tx processor 12, an Rx processor 13, and an antenna 16. The UE 20 includes a processor 21, a memory 24, at least one Tx/Rx RF module (or RF transceiver) 25, a Tx processor 22, an Rx processor 23, and an antenna 26. The processors are configured to implement the above-described functions, processes and/or methods. Specifically, the processor 11 provides a higher layer packet from a core network for DL transmission (communication from the BS to the UE). The processor implements the functionality of layer 2 (L2). In DL, the processor provides the UE 20 with multiplexing between logical and transmission channels and radio resource allocation. That is, the processor is in charge of signaling to the UE. The Tx processor 12 implements various signal processing functions of layer 1 (L1) (i.e., physical layers). The signal processing functions include facilitating the UE to perform forward error correction (FEC) and performing coding and interleaving. Coded and modulated symbols may be divided into parallel streams. Each stream may be mapped to an OFDM subcarrier, multiplexed with an RS in the time and/or frequency domain, and then combined together using an inverse fast Fourier transform (IFFT) to create a physical channel carrying a time domain OFDMA symbol stream. The OFDM stream is spatially precoded to produce multiple spatial streams. Each spatial stream may be provided to a different antenna 16 through the Tx/Rx module (or transceiver) 15. Each Tx/Rx module may modulate an RF carrier with each spatial stream for transmission. At the UE, each Tx/Rx module (or transceiver) 25 receives a signal through each antenna 26 thereof. Each Tx/Rx module recovers information modulated on the RF carrier and provides the information to the RX processor 23. The Rx processor implements various signal processing functions of layer 1. The Rx processor may perform spatial processing on the information to recover any spatial streams toward the UE. If multiple spatial streams are destined for the UE, the multiple spatial streams may be combined by multiple Rx processors into a single OFDMA symbol stream. The RX processor converts the OFDMA symbol stream from the time domain to the frequency domain using a fast Fourier transform (FFT). A frequency-domain signal includes a separate OFDMA symbol stream for each subcarrier of an OFDM signal. The symbols and the reference signal on each subcarrier are recovered and demodulated by determining the most probable signal constellation points transmitted by the BS. Such soft decisions may be based on channel estimation values. The soft decisions are decoded and deinterleaved to recover data and control signals originally transmitted by the BS over the physical channel. The corresponding data and control signals are provided to the processor 21.

UL transmission (communication from the UE to the BS) is processed by the BS10 in a similar way to that described in regard to the receiver functions of the UE 20. Each Tx/Rx module (or transceiver) 25 receives a signal through each antenna 26. Each Tx/Rx module provides an RF carrier and information to the Rx processor 23. The processor 21 may be connected to the memory 24 storing program codes and data. The memory may be referred to as a computer-readable medium.

The present disclosure described above may be carried out by the BS 10 and the UE 20 which are wireless communication devices illustrated in FIG. 18.

Figure 19:
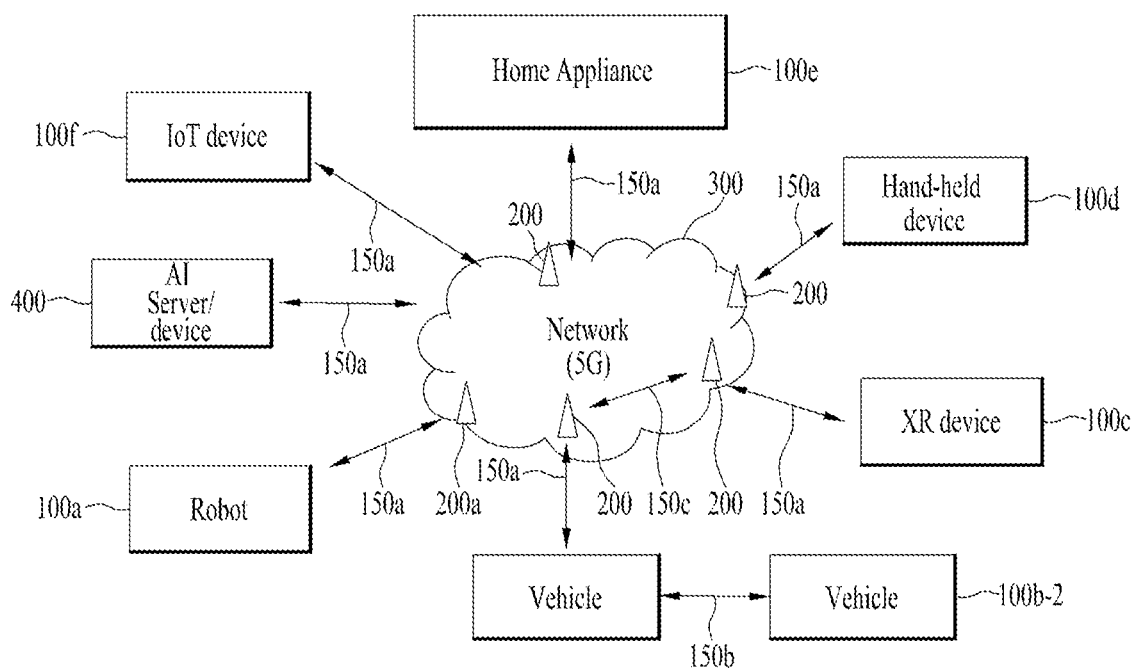

FIG. 19 illustrates a communication system 1 applied to the present disclosure.

Referring to FIG. 19, the communication system 1 applied to the present disclosure includes wireless devices, BSs, and a network. The wireless devices refer to devices performing communication by radio access technology (RAT) (e.g., 5G New RAT (NR) or LTE), which may also be called communication/radio/5G devices. The wireless devices may include, but no limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle equipped with a wireless communication function, an autonomous driving vehicle, and a vehicle capable of performing vehicle-to-vehicle (V2V) communication. The vehicles may include an unmanned aerial vehicle (UAV) (e.g., a drone). The XR device may include an augmented reality (AR)/virtual reality (VR)/mixed reality (MR) device, and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smart glasses), and a computer (e.g., a laptop). The home appliance may include a TV, a refrigerator, and a washing machine. The IoT device may include a sensor and a smart meter. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured by using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f and the BSs 200, or between the BSs 200. Herein, the wireless communication/connections may be established through various RATs (e.g., 5G NR) such as UL/DL communication 150a, sidelink communication 150b (or, D2D communication), or inter-BS communication 150c (e.g. relay, integrated access backhaul (IAB)). A wireless device and a BS/a wireless devices, and BSs may transmit/receive radio signals to/from each other through the wireless communication/connections 150a, 150b, and 150c. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
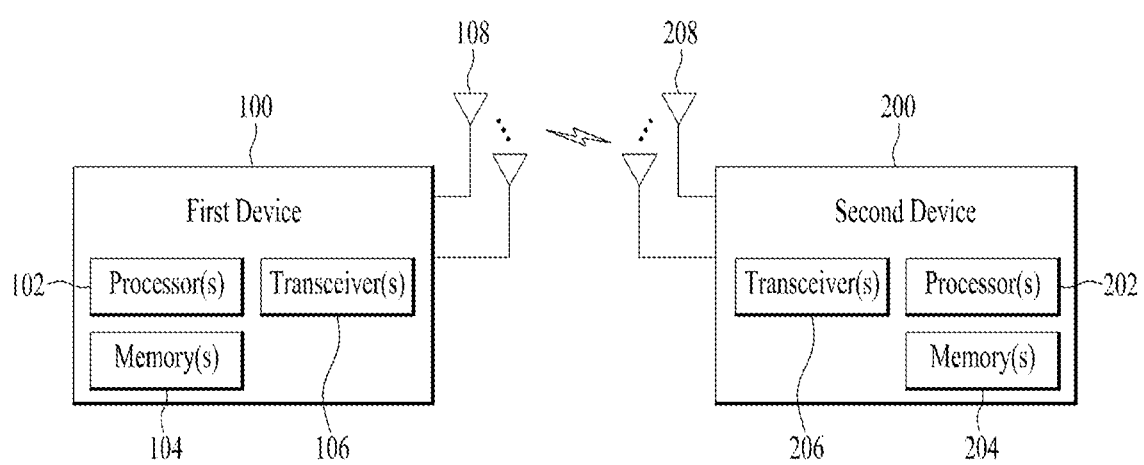

FIG. 20 illustrates wireless devices applicable to the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless devices 100a to 100f and the BSs 200} and/or {the wireless devices 100a to 100f and the wireless devices 100a to 100f} of FIG. 19.

The first wireless device 100 may include at least one processor 102 and at least one memory 104, and may further include at least one transceiver 106 and/or at least one antenna 108. The processor 102 may control the memory 104 and/or the transceiver 106 and may be configured to implement the descriptions, functions, procedures, proposals, methods, and/or operational flowcharts disclosed in this document. For example, the processor 102 may process information within the memory 104 to generate first information/signal and then transmit a radio signal including the first information/signal through the transceiver 106. The processor 102 may receive a radio signal including second information/signal through the transceiver 106 and then store information obtained by processing the second information/signal in the memory 104. The memory 104 may be coupled to the processor 102 and store various types of information related to operations of the processor 102. For example, the memory 104 may store software code including commands for performing a part or all of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement an RAT (e.g., LTE or NR). The transceiver 106 may be coupled to the processor 102 and transmit and/or receive radio signals through the at least one antenna 108. The transceiver 106 may include a transmitter and/or a receiver. The transceiver 106 may be interchangeably used with an RF unit. In the present disclosure, a wireless device may refer to a communication modem/circuit/chip.

The second wireless device 200 may include at least one processor 202 and at least one memory 204, and may further include at least one transceiver 206 and/or at least one antenna 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signal and then transmit a radio signal including the third information/signal through the transceiver 206. The processor 202 may receive a radio signal including fourth information/signal through the transceiver 206 and then store information obtained by processing the fourth information/signal in the memory 204. The memory 204 may be coupled to the processor 202 and store various types of information related to operations of the processor 202. For example, the memory 204 may store software code including commands for performing a part or all of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement an RAT (e.g., LTE or NR). The transceiver 206 may be coupled to the processor 202 and transmit and/or receive radio signals through the at least one antenna 208. The transceiver 206 may include a transmitter and/or a receiver. The transceiver 206 may be interchangeably used with an RF unit. In the present disclosure, a wireless device may refer to a communication modem/circuit/chip.

Hereinafter, hardware elements of the wireless devices 100 and 200 will be described in greater detail. One or more protocol layers may be implemented by, but not limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented in hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented in firmware or software, which may be configured to include modules, procedures, or functions. Firmware or software configured to perform the descriptions, functions, procedures, proposals, methods, and/or operational flowcharts disclosed in this document may be included in the one or more processors 102 and 202, or may be stored in the one or more memories 104 and 204 and executed by the one or more processors 102 and 202. The descriptions, functions, procedures, proposals, methods, and/or operational flowcharts disclosed in this document may be implemented as code, instructions, and/or a set of instructions in firmware or software.

The one or more memories 104 and 204 may be coupled to the one or more processors 102 and 202 and store various types of data, signals, messages, information, programs, code, instructions, and/or commands. The one or more memories 104 and 204 may be configured as read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be coupled to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be coupled to the one or more processors 102 and 202 and transmit and receive radio signals. For example, the one or more processors 102 and 202 may control the one or more transceivers 106 and 206 to transmit user data, control information, or radio signals to one or more other devices. The one or more processors 102 and 202 may control the one or more transceivers 106 and 206 to receive user data, control information, or radio signals from one or more other devices. The one or more transceivers 106 and 206 may be coupled to the one or more antennas 108 and 208 and configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 21:
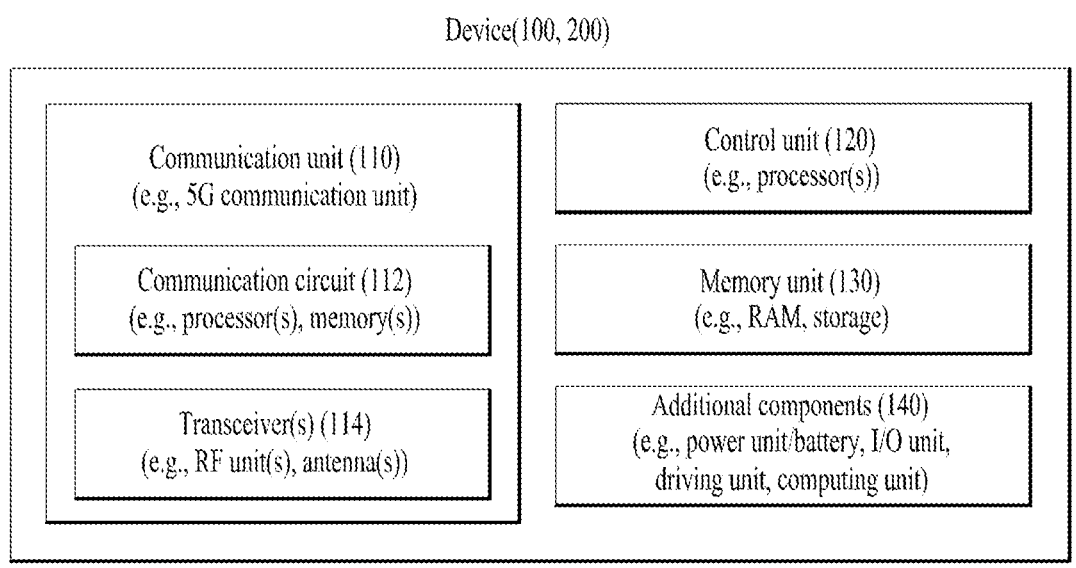

FIG. 21 illustrates another example of wireless devices applied to the present disclosure. The wireless devices may be implemented in various forms according to use-cases/services (refer to FIG. 19).

Referring to FIG. 21, wireless devices 100 and 200 may correspond to the wireless devices 100 and 200 of FIG. 20 and may be configured as various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically coupled to the communication unit 110, the memory unit 130, and the additional components 140 and provides overall control to operations of the wireless devices. For example, the control unit 120 may control an electric/mechanical operation of the wireless device based on programs/code/commands/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to the types of wireless devices. For example, the additional components 140 may include at least one of a power unit/battery, an input/output (I/O) unit, a driver, and a computing unit. The wireless device may be configured as, but not limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcasting terminal, a hologram device, a public safety device, an MTC device, a medicine device, a FinTech device (or a finance device), a security device, a climate/environment device, the AI server/device (400 of FIG. 19), the BSs (200 of FIG. 19), a network node, etc. The wireless device may be mobile or fixed according to a use-case/service.

In FIG. 21, all of the various elements, components, units/portions, and/or modules in the wireless devices 100 and 200 may be coupled to each other through a wired interface or at least a part thereof may be wirelessly coupled to each other through the communication unit 110. For example, in each of the wireless devices 100 and 200, the control unit 120 and the communication unit 110 may be coupled wiredly, and the control unit 120 and first units (e.g., 130 and 140) may be wirelessly coupled through the communication unit 110. Each element, component, unit/portion, and/or module within the wireless devices 100 and 200 may further include one or more elements. For example, the control unit 120 may be configured as a set of one or more processors. For example, the control unit 120 may be configured as a set of a communication control processor, an application processor, an electronic control unit (ECU), a graphical processing unit, and a memory control processor. In another example, the memory unit 130 may be configured as a random access memory (RAM), a dynamic RAM (DRAM), a read only memory (ROM), a flash memory, a volatile memory, a non-volatile memory, and/or a combination thereof.

An implementation example of FIG. 21 will be described in detail with reference to the drawings.

Figure 22:
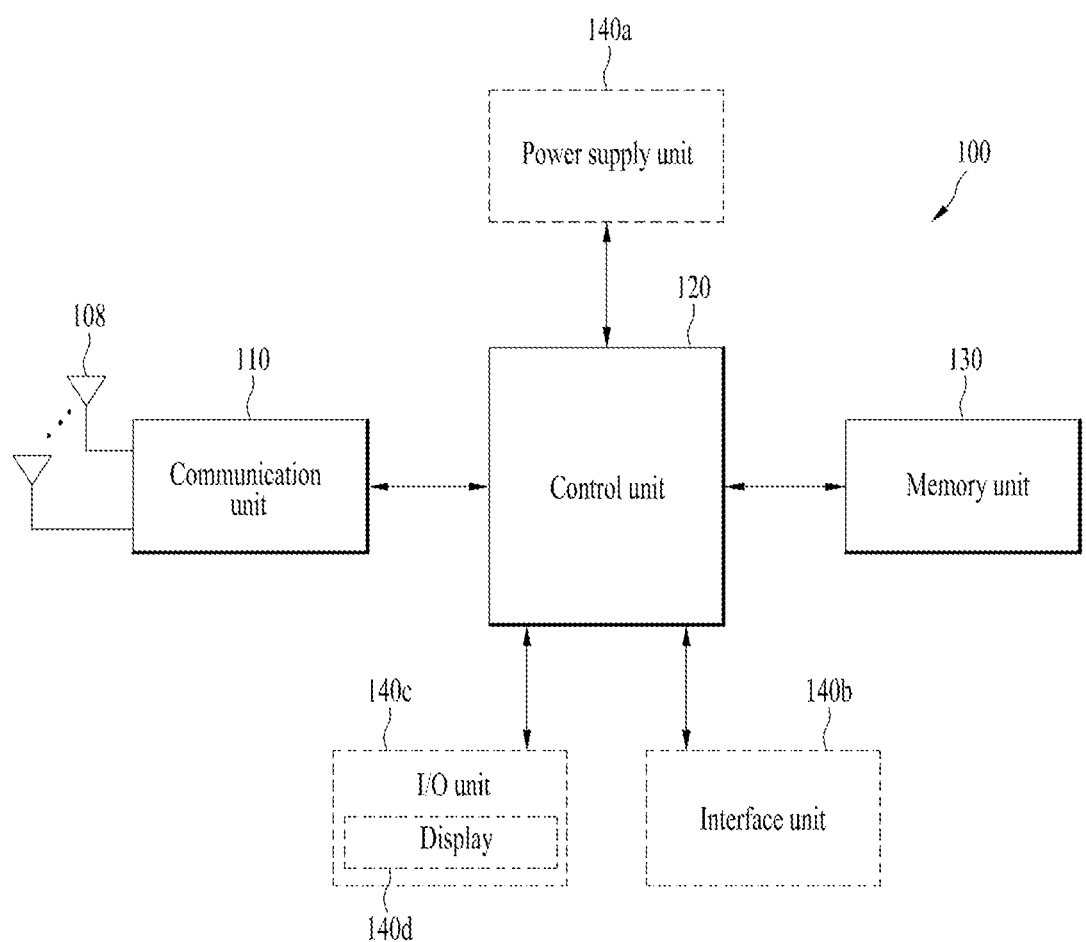

FIG. 22 illustrates a portable device applied to the present disclosure. The portable device may include a smartphone, a smartpad, a wearable device (e.g., a smart watch and smart glasses), and a portable computer (e.g., a laptop). The portable device may be referred to as a mobile station (MS), a user terminal (UT), a mobile subscriber station (MSS), a subscriber station (SS), an advanced mobile station (AMS), or a wireless terminal (WT).

Referring to FIG. 22, a portable device 100 may include an antenna unit 108, a communication unit 110, a control unit 120, a power supply unit 140a, an interface unit 140b, and an I/O unit 140c. The antenna unit 108 may be configured as a part of the communication unit 110. The blocks 110 to 130/140a to 140c correspond to the blocks 110 to 130/140 of FIG. 21, respectively.

The communication unit 110 may transmit and receive signals (e.g., data and control signals) to and from another wireless device and a BS. The control unit 120 may perform various operations by controlling elements of the portable device 100. The control unit 120 may include an application processor (AP). The memory unit 130 may store data/parameters/programs/code/commands required for operation of the portable device 100. Further, the memory unit 130 may store input/output data/information. The power supply unit 140a may supply power to the portable device 100, and include a wired/wireless charging circuit and a battery. The interface unit 140b may include various ports (e.g., an audio I/O port and a video I/O port) for connectivity to external devices The I/O unit 140c may acquire information/signals (e.g., touch, text, voice, images, and video) input by a user, and store the acquired information/signals in the memory unit 130. The communication unit 110 may receive or output video information/signal, audio information/signal, data, and/or information input by the user. The I/O unit 140c may include a camera, a microphone, a user input unit, a display 140d, a speaker, and/or a haptic module.

For example, for data communication, the I/O unit 140c may acquire information/signals (e.g., touch, text, voice, images, and video) received from the user and store the acquired information/signal sin the memory unit 130. The communication unit 110 may convert the information/signals to radio signals and transmit the radio signals directly to another device or to a BS. Further, the communication unit 110 may receive a radio signal from another device or a BS and then restore the received radio signal to original information/signal. The restored information/signal may be stored in the memory unit 130 and output in various forms (e.g., text, voice, an image, video, and a haptic effect) through the I/O unit 140c.

Figure 23:
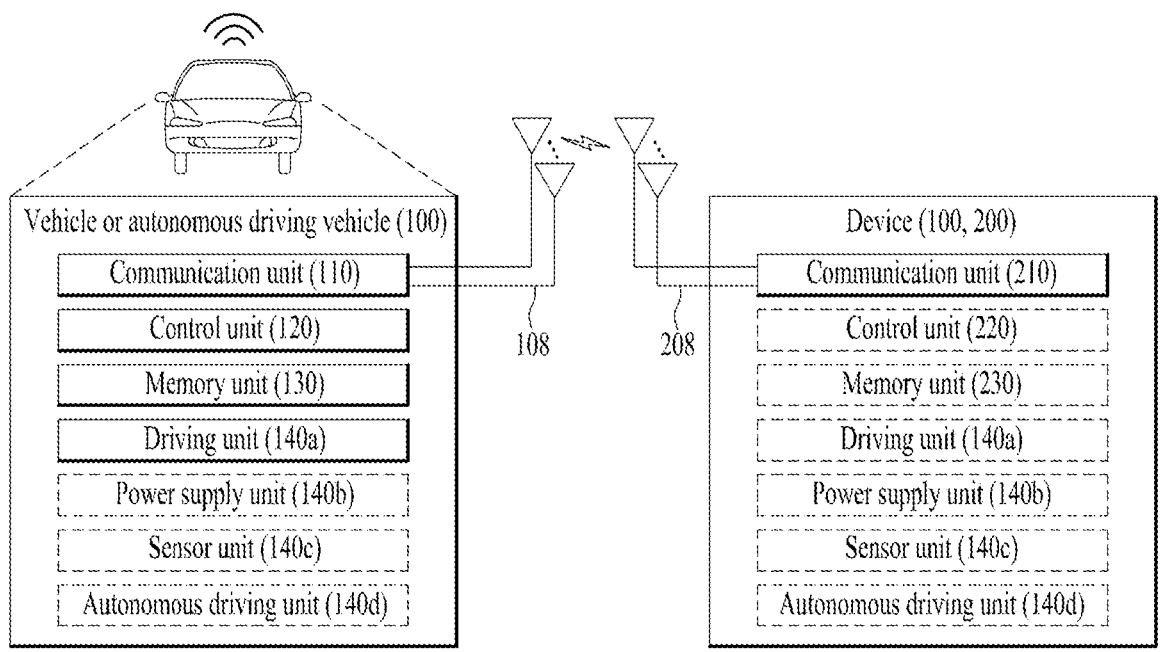

FIG. 23 illustrates a vehicle or an autonomous driving vehicle applied to the present disclosure. The vehicle or autonomous driving vehicle may be configured as a mobile robot, a car, a train, a manned/unmanned aerial vehicle (AV), a ship, or the like.

Referring to FIG. 23, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140*a* to 140*d* correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to travel on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire vehicle state information, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement a technology for maintaining a lane on which a vehicle is driving, a technology for automatically adjusting speed, such as adaptive cruise control, a technology for autonomously traveling along a determined path, a technology for traveling by automatically setting a path, when a destination is set, and the like.

For example, the communication unit 110 may receive map data, traffic information data, and so on from an external server. The autonomous driving unit 140*d* may generate an autonomous driving path and a driving plan from the obtained data. The control unit 120 may control the driving unit 140*a* such that the vehicle or autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain vehicle state information and/or ambient environment information. The autonomous driving unit 140*d* may update the autonomous driving path and the driving plan based on the newly obtained data/information. The communication unit 110 may transmit information about a vehicle position, the autonomous driving path, and/or the driving plan to the external server. The external server may predict traffic information data using AI technology or the like, based on the information collected from vehicles or autonomous driving vehicles and provide the predicted traffic information data to the vehicles or the autonomous driving vehicles.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to wireless communication devices such as a user equipment (UE) and a BS (BS) operating in various wireless communication systems including 3GPP LTE/LTE-A/5G (or New RAT (NR)).

The invention claimed is:

1. A method of transmitting channel quality information to a base station (BS) by a user equipment (UE) in a wireless communication system supporting narrowband Internet of things (NB-IoT), the method comprising:
    transmitting a random access preamble to the BS;
    receiving a random access response from the BS; and
    transmitting the channel quality information to the BS through a narrowband physical uplink shared channel (NPUSCH) based on the random access response,
    wherein the channel quality information is related to a repetition number required to detect a hypothetical narrowband physical downlink control channel (NPDCCH) at a 1% block error rate (BLER),
    wherein the required repetition number is represented based on a maximum NPDCCH repetition number '$R_{max}$' for the random access response reception, and
    wherein a maximum value which can be used as the required repetition number for the hypothetical NPDCCH, is K times larger than the maximum NPDCCH repetition number '$R_{max}$' for the random access response reception.

2. The method according to claim 1, wherein the maximum NPDCCH repetition number '$R_{max}$' is configured in the UE through system information transmitted by the BS.

3. The method according to claim 1, wherein the random access preamble is transmitted in an RRC idle state, and the channel quality information is measured based on a common search space (CSS) used to receive the random access response.

4. The method according to claim 1, wherein a first value is available for the UE as the required repetition number for the hypothetical NPDCCH, where the first value is larger than '$R_{max}$', but not exceeding the maximum value.

5. The method according to claim 1, wherein the channel quality information is measured for a non-anchor carrier.

6. A non-transitory computer readable medium recorded thereon instructions for performing the method of claim 1.

7. A user equipment (UE) configured to transmit channel quality information to a base station (BS) in a wireless communication system supporting narrowband Internet of things (NB-IoT), the UE comprising:
    a radio frequency (RF) transceiver; and
    a processor operatively coupled to the RF transceiver,
    wherein the processor is configured to transmit a random access preamble to the BS, receive a random access response from the BS, and transmit the channel quality information to the BS through a narrowband physical uplink shared channel (NPUSCH) based on the random access response, by controlling the RF transceiver, and wherein the channel quality information is related to a repetition number required to detect a narrowband physical downlink control channel (NPDCCH) at a 1% block error rate (BLER), wherein the required repetition number is represented based on a maximum NPDCCH repetition number '$R_{max}$' for the random access response reception, and wherein a maximum value which can be used as the required repetition number for the hypothetical NPDCCH, is K times larger than the maximum NPDCCH repetition number '$R_{max}$' for the random access response reception.

8. The UE according to claim 7, wherein the maximum NPDCCH repetition number '$R_{max}$' is configured in the UE through system information transmitted by the BS.

9. The UE according to claim 7, wherein the random access preamble is transmitted in an RRC idle state, and the channel quality information is measured based on a common search space (CSS) used to receive the random access response.

10. The UE according to claim 7, wherein a first value is available for the UE as the required repetition number for the hypothetical NPDCCH, where the first value is larger than '$R_{max}$', but not exceeding the maximum value.

11. The UE according to claim 7, wherein the channel quality information is measured for a non-anchor carrier.

12. An apparatus for a user equipment (UE) configured to operate in a wireless communication system supporting narrowband Internet of things (NB-IoT), the apparatus comprising:

a memory including instructions; and
a processor operatively coupled to the memory,
wherein the processor is configured to perform specific operations by executing the instructions,
wherein the specific operations include:
transmitting a random access preamble to a base station (BS);
receiving a random access response from the BS; and
transmitting channel quality information to the BS on a narrowband physical uplink shared channel (NPUSCH) based on the random access response, and
wherein the channel quality information is related to a repetition number required to detect a hypothetical narrowband physical downlink control channel (NPDCCH) at a 1% block error rate (BLER),
wherein the required repetition number is represented based on a maximum NPDCCH repetition number '$R_{max}$' for the random access response reception, and
wherein a maximum value which can be used as the required repetition number for the hypothetical NPDCCH, is K times larger than the maximum NPDCCH repetition number '$R_{max}$' for the random access response reception.

13. A method of receiving channel quality information by a base station (BS) in a wireless communication system supporting narrowband Internet of things (NB-IoT), the method comprising:

receiving a random access preamble from a user equipment (UE);
transmitting a random access response to the UE; and
receiving the channel quality information from the UE through a narrowband physical uplink shared channel (NPUSCH) based on the random access response,
wherein the channel quality information is related to a repetition number required for transmitting a hypothetical narrowband physical downlink control channel (NPDCCH) at a 1% block error rate (BLER),
wherein the required repetition number is represented based on a maximum NPDCCH repetition number '$R_{max}$' for the random access response transmission, and
wherein a maximum value which can be used as the required repetition number for the hypothetical NPDCCH, is K times larger than the maximum NPDCCH repetition number '$R_{max}$' for the random access response transmission.

14. A base station (BS) comprising:
a radio frequency (RF) transceiver; and
a processor operatively coupled to the RF transceiver,
wherein the processor is configured to receive a random access preamble from a user equipment (UE), to transmit a random access response to the UE, and to receive channel quality information from the UE through a narrowband physical uplink shared channel (NPUSCH) based on the random access response, and
wherein the channel quality information is related to a repetition number required for transmitting a hypothetical narrowband physical downlink control channel (NPDCCH) at a 1% block error rate (BLER),
wherein the required repetition number is represented based on a maximum NPDCCH repetition number '$R_{max}$' for the random access response transmission, and
wherein a maximum value which can be used as the required repetition number for the hypothetical NPDCCH, is K times larger than the maximum NPDCCH repetition number '$R_{max}$' for the random access response transmission.

* * * * *